United States Patent
Barenbrugge et al.

(10) Patent No.: US 10,371,316 B2
(45) Date of Patent: Aug. 6, 2019

(54) GOAL SECUREMENT SYSTEM AND METHOD

(71) Applicant: RTC Industries, Inc., Rolling Meadows, IL (US)

(72) Inventors: Joel Barenbrugge, Naperville, IL (US); Gregory Dempsey, Glen Ellyn, IL (US); Michael James Fuchs, Grayslake, IL (US)

(73) Assignee: RTC Industries, Inc., Rolling Meadows, IL (US)

( * ) Notice: Subject to any disclaimer, the term of this patent is extended or adjusted under 35 U.S.C. 154(b) by 0 days.

(21) Appl. No.: 16/034,990

(22) Filed: Jul. 13, 2018

(65) Prior Publication Data

US 2018/0320816 A1    Nov. 8, 2018

Related U.S. Application Data

(63) Continuation of application No. 14/019,231, filed on Sep. 5, 2013, now Pat. No. 10,024,487.
(Continued)

(51) Int. Cl.
*F16M 13/02* (2006.01)
*A63B 63/00* (2006.01)
(Continued)

(52) U.S. Cl.
CPC ........... *F16M 13/02* (2013.01); *A63B 63/004* (2013.01); *A63B 71/0054* (2013.01);
(Continued)

(58) Field of Classification Search
CPC ................. F16M 13/02; A63B 63/004; A63B 2071/024; A63B 71/003; F41J 1/10; E02D 5/80; E02D 5/801; E02D 5/803

USPC .......... 248/542, 545, 500, 530, 534; 52/155, 52/157, 173; 116/200; 473/407, 476, 473/478

See application file for complete search history.

(56) References Cited

U.S. PATENT DOCUMENTS 309,038 A    12/1884  Flach
557,501 A     3/1896  Ennis
(Continued)

FOREIGN PATENT DOCUMENTS

CA      2626979 A1    9/2009
CH       620009 A5   10/1980
(Continued)

OTHER PUBLICATIONS

Auger Soccer Goal Anchors, Anthem Sports, retrieved from the internet: http://www.anthem-sports.com/Auger-Soccer-Goal-Anchors p 877.html?gdftrk=gdfV2853 . . . Jul. 8, 2011.
(Continued)

*Primary Examiner* — Tan Le
(74) *Attorney, Agent, or Firm* — Banner & Witcoff, Ltd.

(57) ABSTRACT

A goal securement device includes a ground engagement system, a ground securement system, a goal securement system, and a goal securement monitoring system. In an embodiment, the systems work cooperatively to secure a goal to the ground and monitor the status of such securement. Embodiments of each system and embodiments of various components, aspects, or features of each system are described.

20 Claims, 58 Drawing Sheets

Related U.S. Application Data

(60) Provisional application No. 61/698,419, filed on Sep. 7, 2012.

(51) Int. Cl.

| | | |
|---|---|---|
| *E02D 5/80* | (2006.01) | |
| *A63B 71/02* | (2006.01) | |
| *A63B 71/00* | (2006.01) | |
| *A63B 71/06* | (2006.01) | |
| *A63B 102/14* | (2015.01) | |
| *A63B 102/22* | (2015.01) | |

(52) U.S. Cl.
CPC ........ *A63B 71/023* (2013.01); *A63B 71/0622* (2013.01); *A63B 2071/024* (2013.01); *A63B 2071/0625* (2013.01); *A63B 2102/14* (2015.10); *A63B 2102/22* (2015.10); *A63B 2209/14* (2013.01); *A63B 2210/50* (2013.01); *A63B 2220/56* (2013.01); *A63B 2220/80* (2013.01); *A63B 2220/833* (2013.01); *A63B 2243/0025* (2013.01); *E02D 5/80* (2013.01); *E02D 5/801* (2013.01)

(56) References Cited

U.S. PATENT DOCUMENTS

| | | | |
|---|---|---|---|
| 729,508 A | 5/1903 | Phillips | |
| 855,158 A | 5/1907 | Brown | |
| 902,470 A | 10/1908 | Belloni | |
| 949,066 A | 2/1910 | Fowler | |
| 970,565 A | 9/1910 | Smith | |
| 1,055,923 A | 3/1913 | Landes | |
| 1,063,703 A | 6/1913 | Levorsen | |
| 1,064,400 A | 6/1913 | Timmins | |
| 1,120,041 A | 12/1914 | Dunn | |
| 1,139,878 A | 5/1915 | McElroy | |
| 1,258,699 A * | 3/1918 | Neumaier | B25B 27/023 29/259 |
| 1,303,354 A | 5/1919 | Miller | |
| 1,334,987 A | 3/1920 | Carpenter | |
| 1,347,809 A | 7/1920 | Frisz et al. | |
| 1,431,378 A | 10/1922 | Derry | |
| 1,504,037 A | 8/1924 | Furman et al. | |
| 1,604,590 A | 10/1926 | McNulty | |
| 1,635,923 A | 7/1927 | Bray | |
| 1,661,938 A | 3/1928 | Follingstad | |
| 1,783,509 A | 12/1930 | Lahey | |
| 2,165,221 A | 7/1939 | Burton | |
| 2,784,692 A | 3/1957 | Ballesteros | |
| 2,821,776 A | 2/1958 | Keister | |
| 2,821,777 A | 2/1958 | Keister | |
| 2,860,595 A | 11/1958 | Androsiglio | |
| 2,894,773 A | 7/1959 | Noe | |
| 2,923,509 A | 2/1960 | Kolodin | |
| 3,022,898 A | 2/1962 | Loeb | |
| 3,051,424 A | 8/1962 | Duhamel | |
| 3,076,532 A | 2/1963 | Frye | |
| 3,100,472 A | 8/1963 | Jackson | |
| 3,107,932 A | 10/1963 | Johnson | |
| 3,494,587 A | 2/1970 | Kuhn | |
| 3,500,791 A | 3/1970 | Jackson et al. | |
| 3,517,469 A | 6/1970 | Brown | |
| 3,525,187 A | 8/1970 | Vincent | |
| 3,641,693 A | 2/1972 | Pinnow | |
| 3,786,778 A | 1/1974 | Palmer et al. | |
| 3,837,109 A | 9/1974 | DeJulio | |
| 3,897,646 A | 8/1975 | Sheets | |
| 3,911,857 A | 10/1975 | Manuel | |
| 4,032,246 A | 6/1977 | Waara | |
| 4,188,742 A | 2/1980 | Oulman | |
| 4,316,575 A | 2/1982 | VanDarwarka | |
| 4,492,014 A | 1/1985 | Alexander | |
| 4,492,493 A * | 1/1985 | Webb | F16L 1/201 405/172 |
| 4,570,835 A | 2/1986 | Criqui et al. | |
| 4,593,500 A * | 6/1986 | Watson | E02D 5/803 52/155 |
| 4,626,616 A | 12/1986 | Masters | |
| 4,697,394 A * | 10/1987 | Lu | E02D 5/803 411/432 |
| 4,923,165 A | 5/1990 | Cockman | |
| 4,969,398 A | 11/1990 | Lundwall | |
| 5,035,406 A | 7/1991 | Sellers et al. | |
| 5,094,423 A | 3/1992 | Almquist et al. | |
| 5,170,850 A | 12/1992 | Sassak, II | |
| 5,273,292 A | 12/1993 | Pardi et al. | |
| 5,457,918 A | 10/1995 | Plourde | |
| 5,482,246 A | 1/1996 | Derkoski | |
| 5,501,086 A | 3/1996 | Sherlock | |
| 5,599,024 A | 2/1997 | Acuff et al. | |
| 5,657,716 A | 8/1997 | Beasley | |
| 5,661,933 A | 9/1997 | DeJonghe | |
| 5,813,259 A | 9/1998 | Martin | |
| 5,820,497 A | 10/1998 | Pena | |
| 5,832,755 A | 11/1998 | Crilly | |
| 5,855,129 A | 1/1999 | Warren et al. | |
| 6,082,697 A | 7/2000 | Grunfeld | |
| 6,272,798 B1 | 8/2001 | Cockman | |
| 6,334,281 B1 | 1/2002 | Oliver et al. | |
| 6,481,364 B2 | 11/2002 | Woyjeck | |
| 6,629,389 B1 | 10/2003 | Rust | |
| 6,641,332 B1 | 11/2003 | Alvarado | |
| 6,886,376 B2 | 5/2005 | Kuo | |
| 6,962,126 B1 | 11/2005 | Payson | |
| 7,188,684 B2 | 3/2007 | Nolan | |
| 7,331,880 B2 | 2/2008 | Rogers | |
| 7,341,531 B2 | 3/2008 | Caruso | |
| 7,409,842 B2 | 8/2008 | Kuo | |
| 7,409,915 B2 | 8/2008 | Hagar | |
| 7,527,569 B2 | 5/2009 | Rogers | |
| 7,559,218 B2 | 7/2009 | Soudan, Jr. | |
| 7,621,098 B2 * | 11/2009 | Reinert, Sr. | E02D 5/803 405/229 |
| 7,712,763 B2 | 5/2010 | Lovenberg | |
| 7,828,678 B1 | 11/2010 | Caruso | |
| 8,172,705 B2 | 5/2012 | Rogers | |
| 8,220,209 B2 | 7/2012 | Roy et al. | |
| 8,234,995 B2 | 8/2012 | Dempsey | |
| 8,480,043 B2 | 7/2013 | Ventura | |
| 8,534,219 B2 | 9/2013 | Dempsey | |
| 8,561,362 B2 | 10/2013 | Dempsey | |
| 8,627,774 B2 | 1/2014 | Pearce | |
| 8,656,651 B1 | 2/2014 | Scarano, Jr. et al. | |
| 9,434,210 B2 * | 9/2016 | Brown, Jr. | B66F 5/025 |
| 2006/0199674 A1 | 9/2006 | Rogers | |
| 2006/0202426 A1 | 9/2006 | Tennett | |
| 2006/0264274 A1 | 11/2006 | Bryant et al. | |
| 2007/0000187 A1 | 1/2007 | St. Onge et al. | |
| 2007/0144081 A1 | 6/2007 | Caruso | |
| 2007/0194534 A1 | 8/2007 | Caruso | |
| 2007/0283732 A1 | 12/2007 | Soudan | |
| 2008/0006756 A1 | 1/2008 | Mitchell et al. | |
| 2008/0207361 A1 | 8/2008 | Rogers | |
| 2008/0264119 A1 | 10/2008 | Thomas | |
| 2009/0007502 A1 | 1/2009 | Roy et al. | |
| 2009/0152419 A1 | 6/2009 | Wallace | |
| 2009/0197709 A1 | 8/2009 | Rogers | |
| 2010/0147207 A1 | 6/2010 | Dempsey | |
| 2011/0005148 A1 | 1/2011 | Foster | |
| 2011/0098139 A1 | 4/2011 | Query, Jr. et al. | |
| 2011/0098140 A1 | 4/2011 | Query, Jr. | |
| 2011/0131895 A1 | 6/2011 | Dempsey | |
| 2012/0036797 A1 | 2/2012 | Ardern | |
| 2012/0160139 A1 | 6/2012 | Pearce | |
| 2012/0244963 A1 | 9/2012 | Rogers | |
| 2012/0252606 A1 | 10/2012 | Ennis | |
| 2013/0014691 A1 | 1/2013 | Dempsey | |
| 2014/0014025 A1 | 1/2014 | Dempsey | |

FOREIGN PATENT DOCUMENTS

| | | |
|---|---|---|
| DE | 19738657 C1 | 9/1998 |
| DE | 19844268 A1 | 3/2000 |

(56) References Cited

FOREIGN PATENT DOCUMENTS

| EP | 653227 A1 | 5/1995 |
|---|---|---|
| FR | 2714296 A1 | 6/1995 |
| FR | 2715686 A1 | 8/1995 |
| FR | 2715858 A1 | 8/1995 |
| FR | 2819193 A1 | 7/2002 |
| GB | 2268950 A | 1/1994 |
| GB | 2381278 A | 4/2003 |
| JP | 2003144595 A | 5/2003 |
| WO | 2010074928 A1 | 7/2010 |

OTHER PUBLICATIONS

Anchor Augers—Lowest Prices & Best Deals on Anchor Augers—Pronto.com, retrieved from the internet: http://www.pronto.com/shop/anchor-augers, Feb. 26, 2013.

*RTC Industries, Inc.* v. *Gregory S. Dempsey* "Verified Answer to Second Amended Complaint for Permanent Injunction and Other Relief and Verified Counterclaims" (Case No. 12 CH 05329) filed Nov. 2, 2012.

*RTC Industries, Inc.* v. *Gregory S. Dempsey* "Third Amended Complaint for Permanent Injunction & Other Relief" (Case No. 12 CH 05329) filed Jan. 12, 2015.

*RTC Industries, Inc.* v. *Gregory S. Dempsey* "Answer to Third Amended Complaint for Permanent Injunction and Other Relief" (Case No. 12 CH 05329) filed prior to today's date.

*RTC Industries, Inc.* v. *Gregory S. Dempsey* "Gregory S. Dempsey's Objections and Responses to Plaintiff's First Set of Interrogatories to Defendant/Counterclaim Plaintiff Gregory S. Dempsey" (Case No. 12 CH 05329) filed Sep. 26, 2012.

*RTC Industries, Inc.* v. *Gregory S. Dempsey* "Gregory S. Dempsey's Objections and Supplemental Responses to Plaintiff's Interrogatories Nos. 7 and 8 to Defendant/Counterclaim Plaintiff Gregory S. Dempsey" (Case No. 12 CH 05329) filed Jun. 25, 2013.

*RTC Industries, Inc.* v. *Gregory S. Dempsey* "Goal Alerts, LLC's Answer to Plaintiff's Second Set of Interrogatories" (Case No. 12 CH 05329) filed Apr. 15, 2014.

*RTC Industries, Inc.* v. *Gregory S. Dempsey* "Goal Alerts, LLC's Objections and Responses to Plaintiff's First Set of Interrogatories to Defendant/Counterclaim Plaintiff Goal Alert, LLC" (Case No. 12 CH 05329) filed Sep. 26, 2012.

*RTC Industries, Inc.* v. *Gregory S. Dempsey* "Goal Alerts, LLC's Objections and Supplemental Responses to Plaintiff's Interrogatories Nos. 7, 9, 10, and 11 to Defendant/Counterclaim Plaintiff Goal Alert, LLC" (Case No. 12 CH 05329) filed Jun. 25, 2013.

*RTC Industries, Inc.* v. *Gregory S. Dempsey* "Gregory S. Dempsey's Answer to Plaintiff's Second Set of Interrogatories" (Case No. 12 CH 05329) filed Apr. 15, 2014.

*RTC Industries, Inc.* v. *Gregory S. Dempsey* "Goal Alert, LLC's Answer to Plaintiff's Third Set of Interrogatories" (Case No. 12 CH 05329) filed Apr. 15 2014.

*RTC Industries, Inc.* v. *Gregory S. Dempsey* "Gregory S. Dempsey's Answer to Plaintiff's Third Set of Interrogatories" (Case No. 12 CH 05329) filed Apr. 15, 2014.

*RTC Industries, Inc.* v. *Gregory S. Dempsey* "Gregory S. Dempsey's Supplemental Answer to Plaintiff's Second Set of Interrogatories" (Case No. 12 CH 05329) filed Jun. 25, 2014.

*RTC Industries, Inc.* v. *Gregory S. Dempsey* "Goal Alerts, LLC's Supplemental Answer to Plaintiff's Second Set of Interrogatories" (Case No. 12 CH 05329) filed Jun. 25, 2014.

*RTC Industries, Inc.* v. *Gregory S. Dempsey* "Gregory S. Dempsey's Second Supplemental Answer to Plaintiff's Interrogatories" (Case No. 12 CH 05329) filed Jul. 2, 2014.

*RTC Industries, Inc.* v. *Gregory S. Dempsey* "Goal Alert, LLC's Second Supplemental Answer to Plaintiffl's Interrogatories" (Case No. 12 CH 05329) filed Jul. 2, 2014.

Jul. 5, 2017—U.S. Notice of Allowance—U.S. Appl. No. 14/019,231.

*RTC Industries, Inc.* v. *Gregory S. Dempsey* "Plaintiff's Motion for Partial Summary Judgment of Declaratory Judgment of Intellectual Property Rights, Implied License, and Shop-Rights" (Case No. 12 CH 05329) filed Aug. 25, 2017.

\* cited by examiner

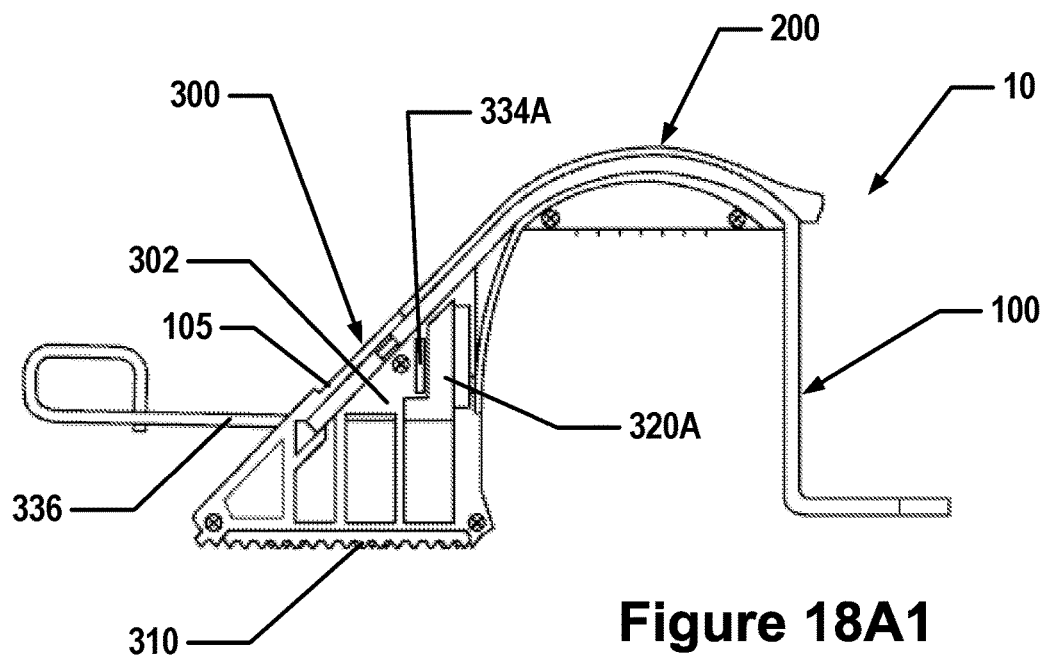
Figure 18A1
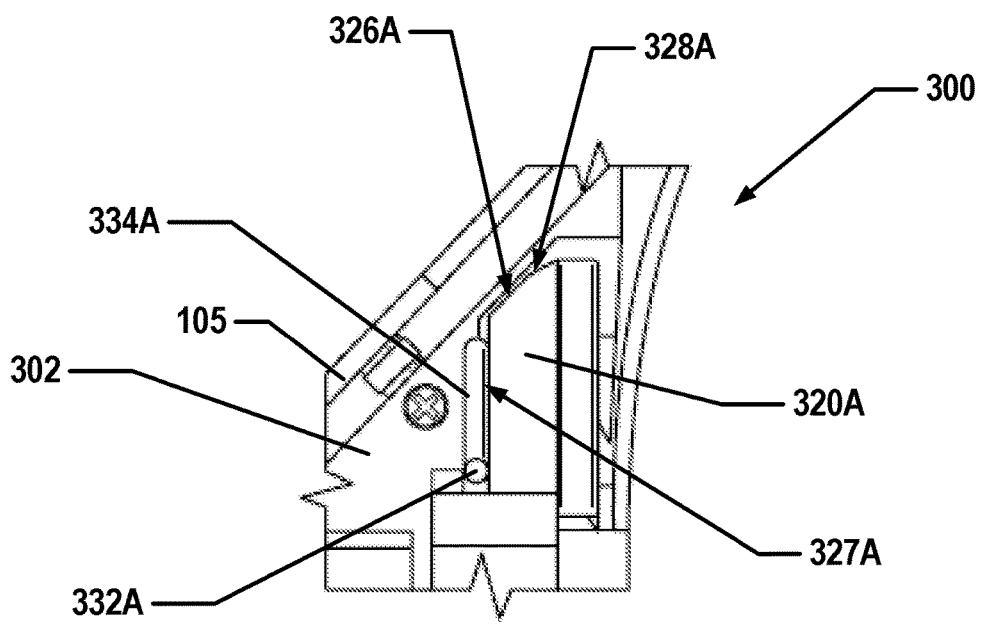
Figure 18A2

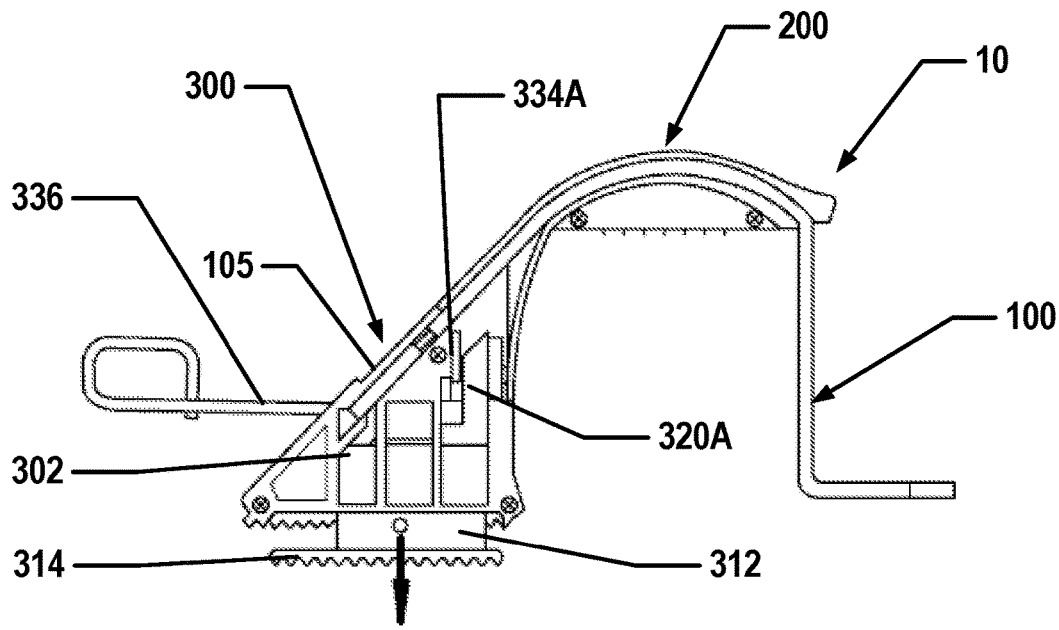
Figure 18B1
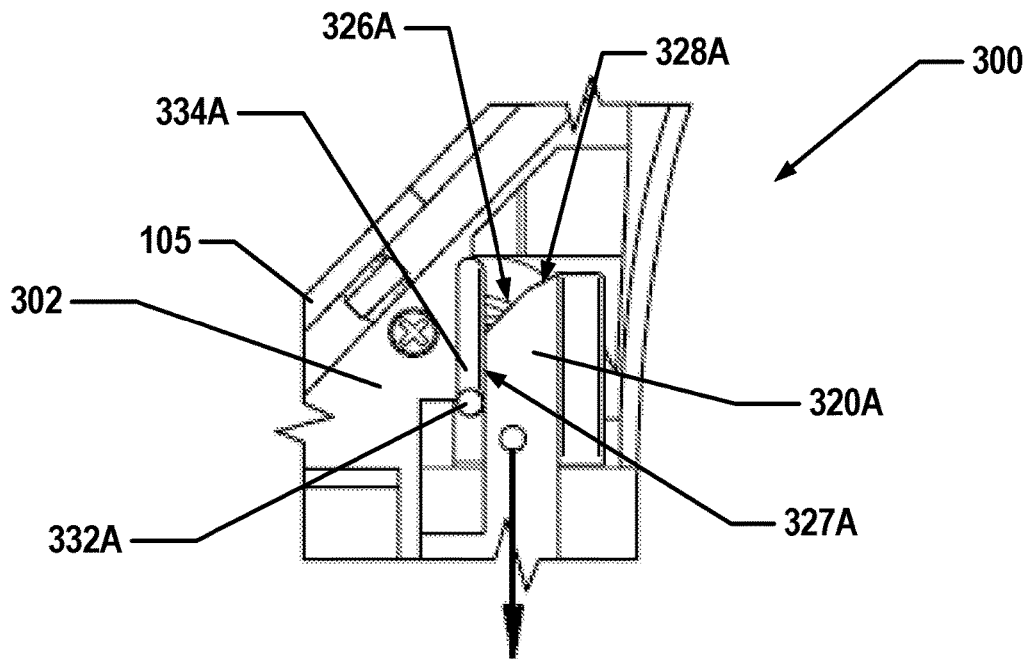
Figure 18B2

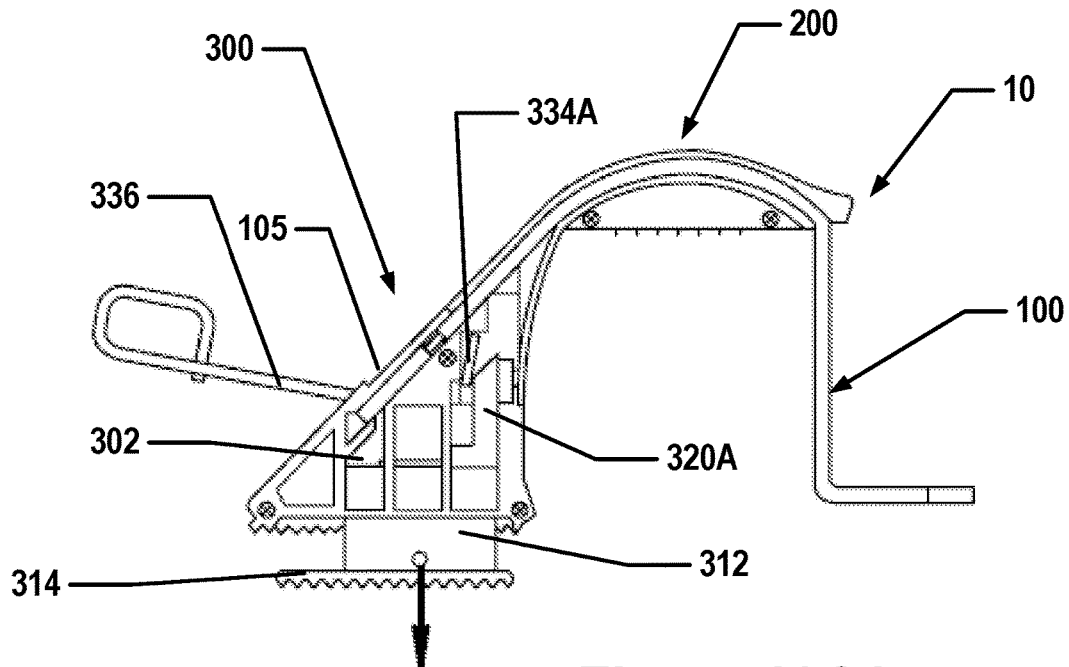
Figure 18C1
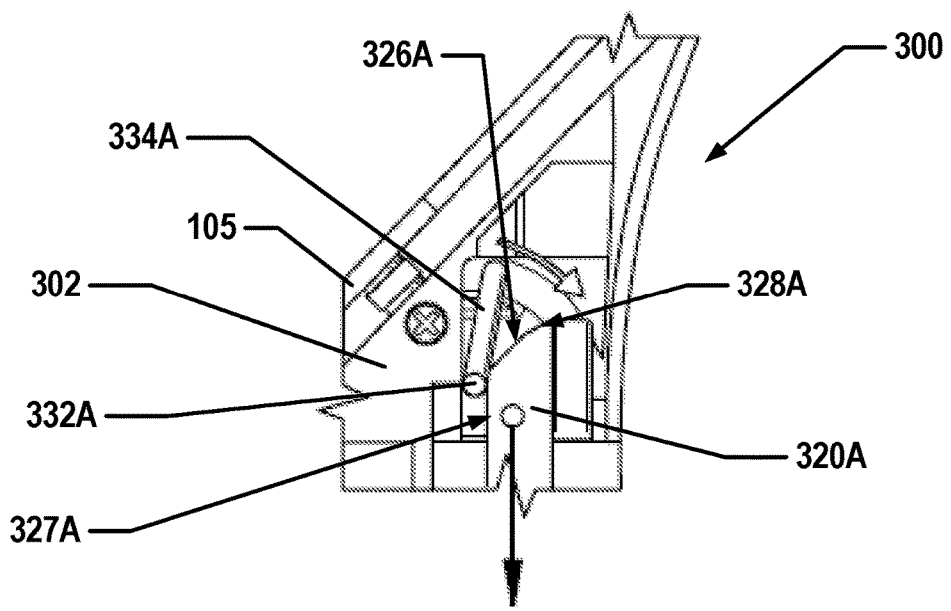
Figure 18C2

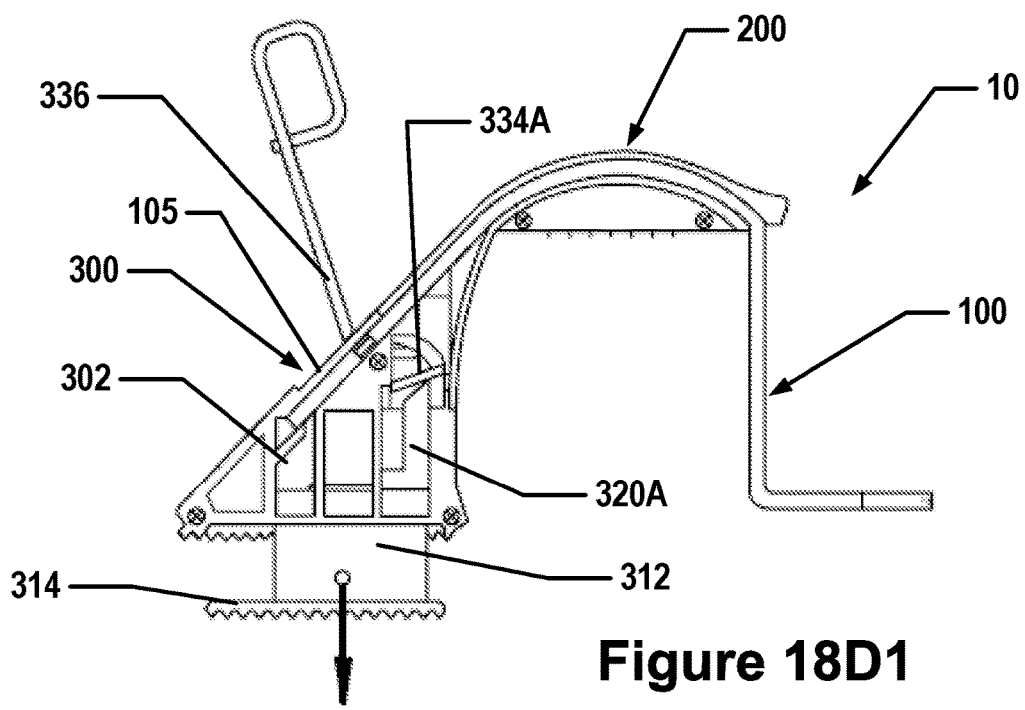
Figure 18D1
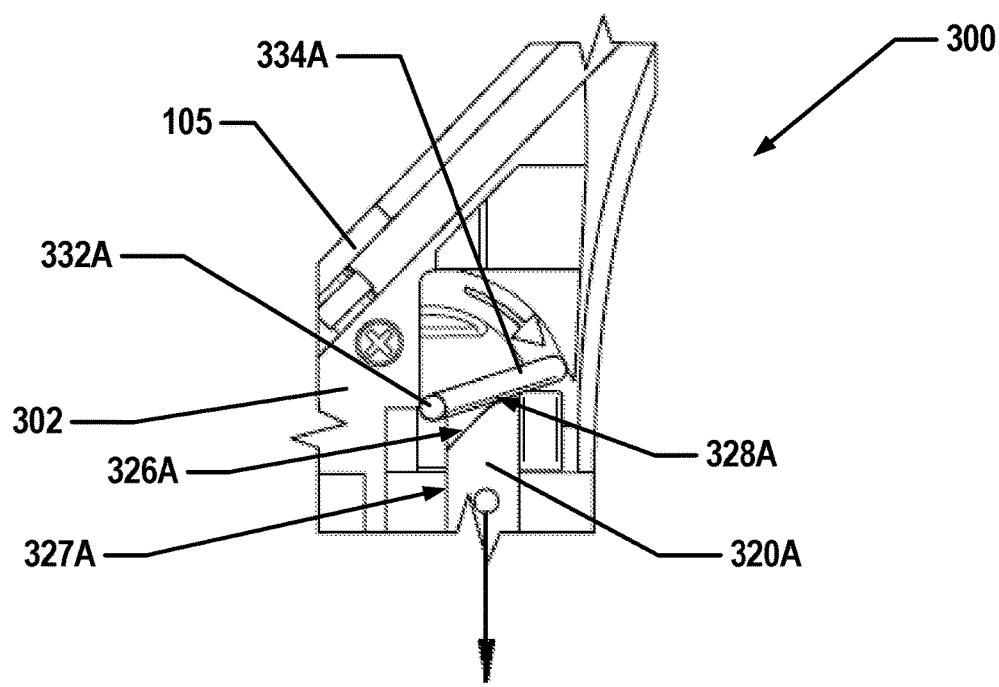
Figure 18D2

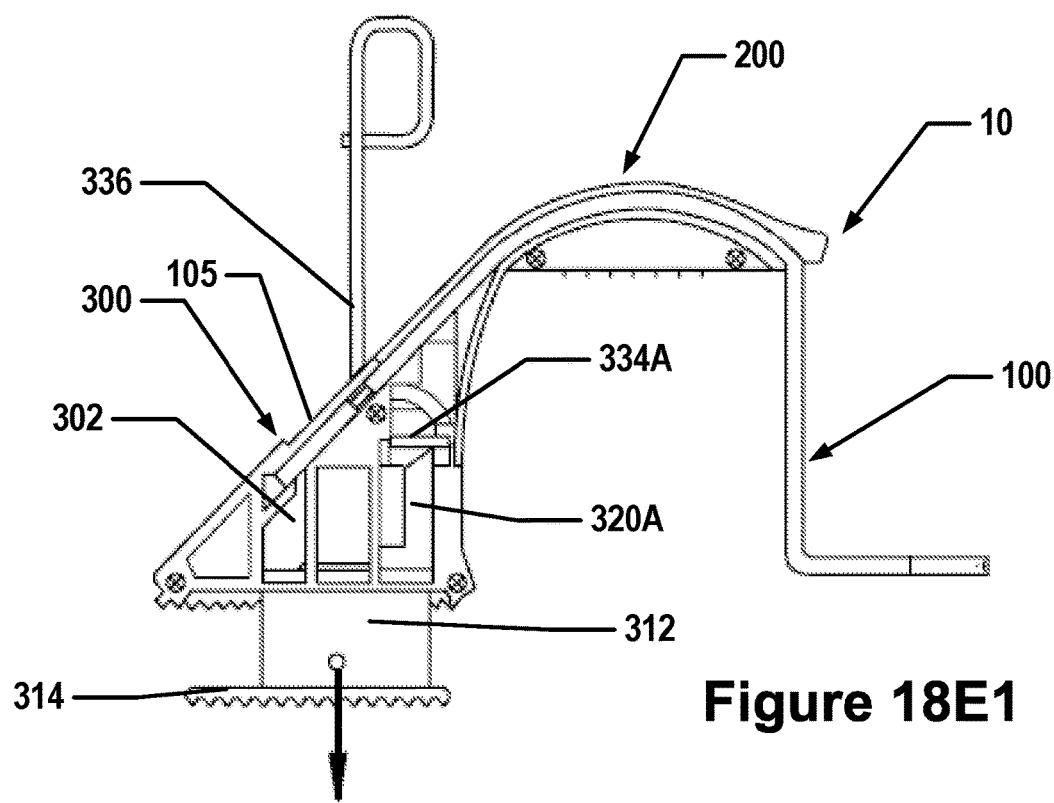
Figure 18E1
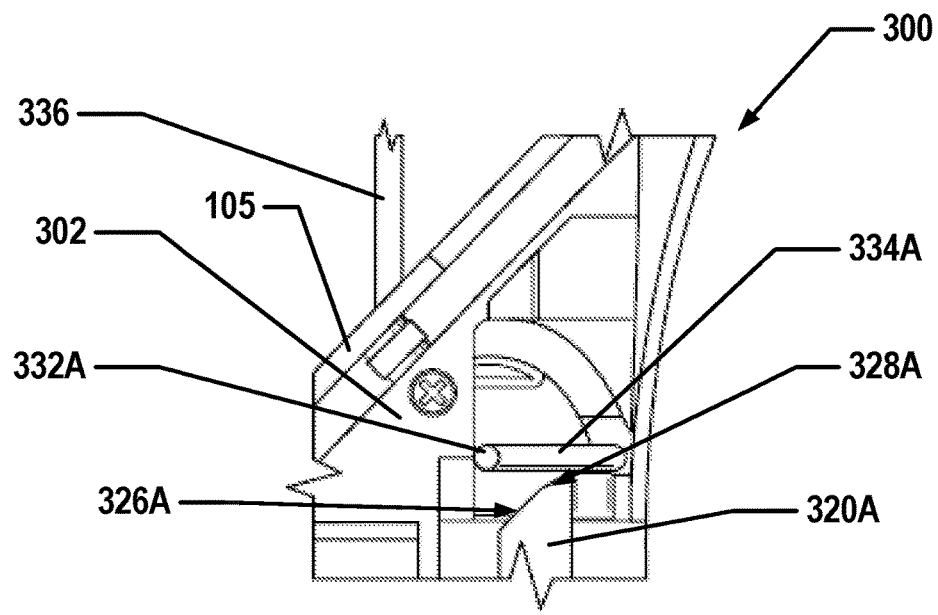
Figure 18E2

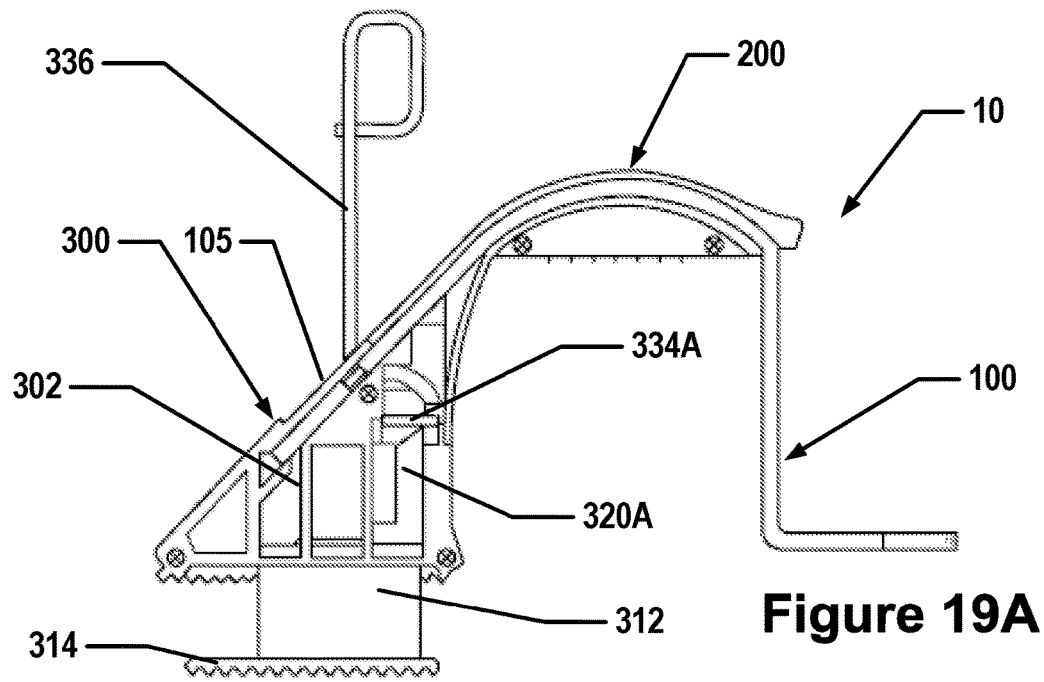
Figure 19A1
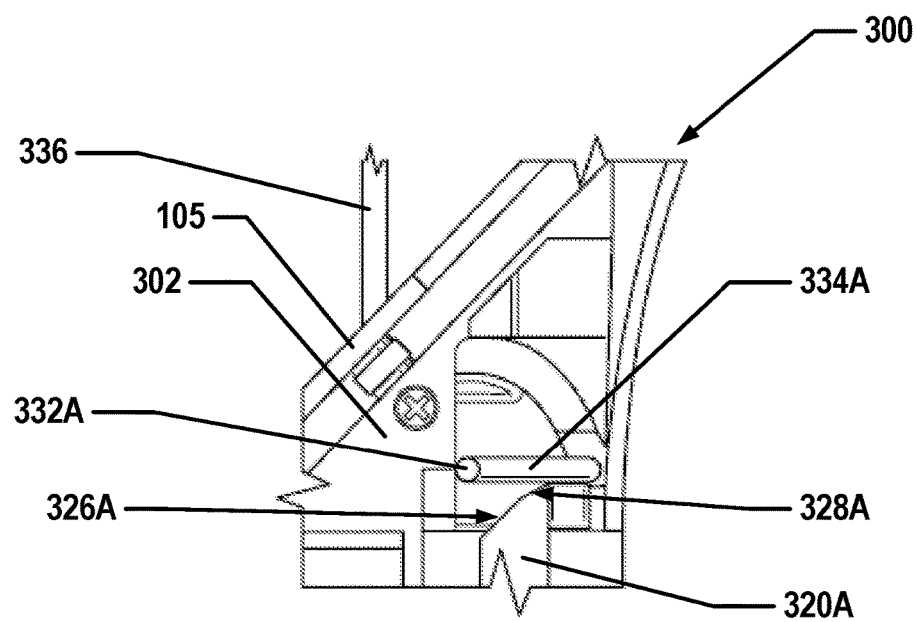
Figure 19A2

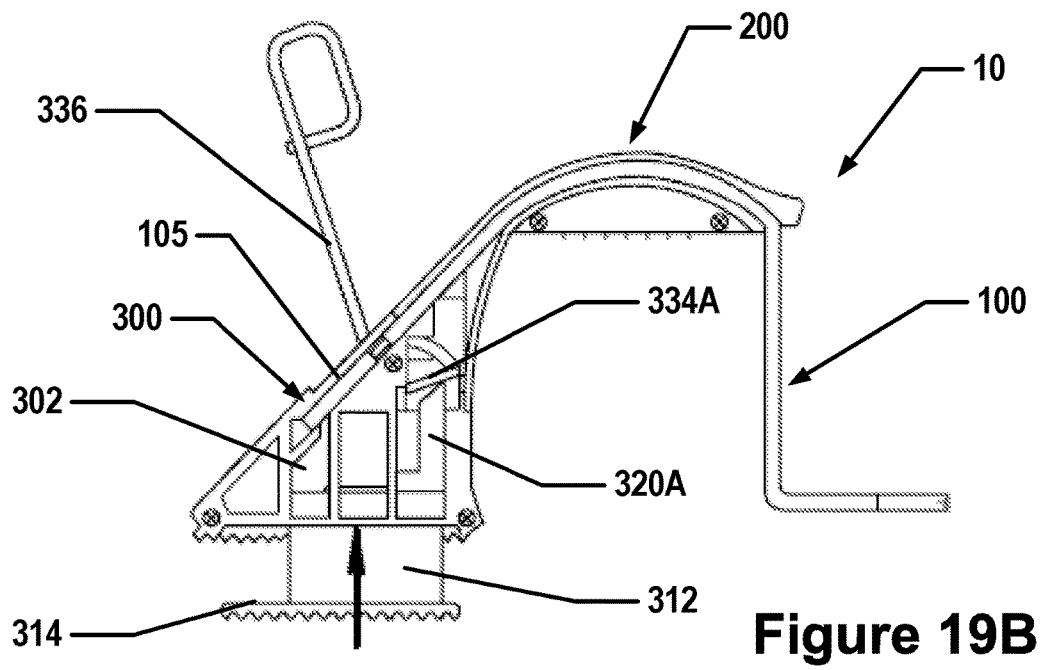
Figure 19B1
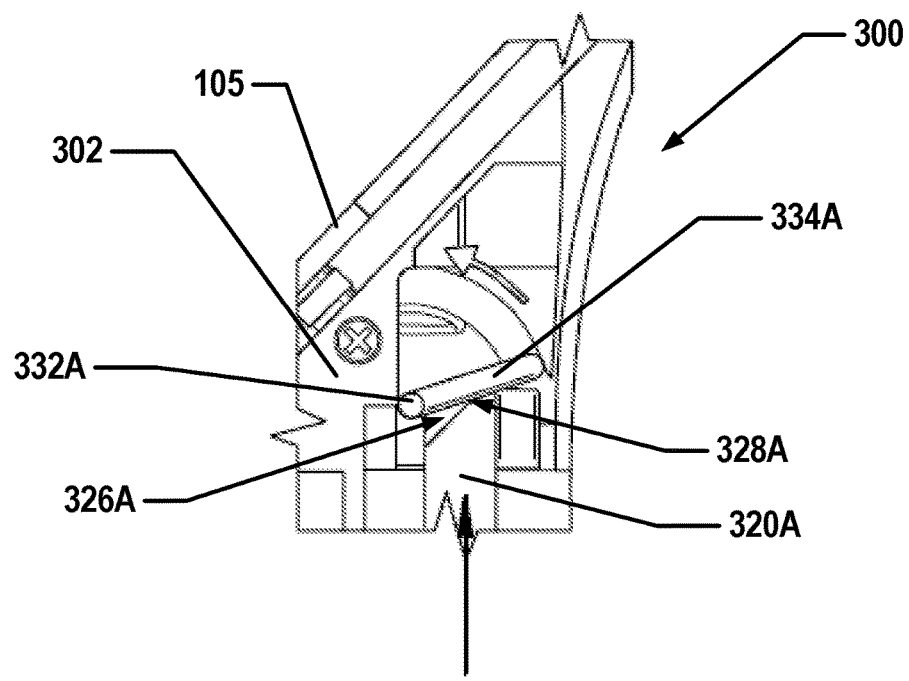
Figure 19B2

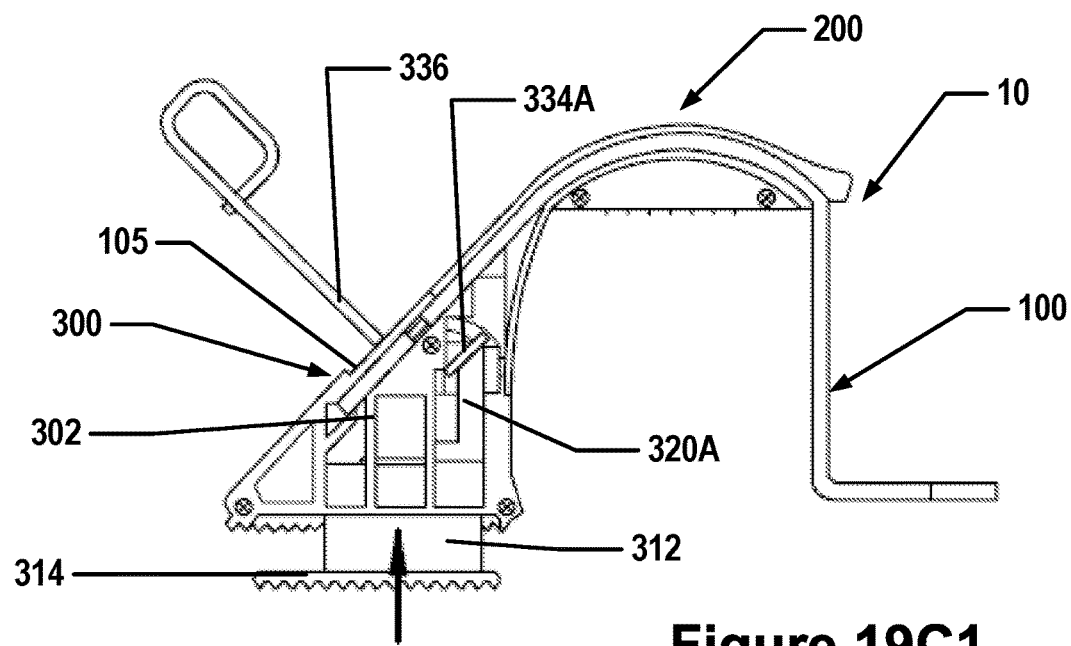
Figure 19C1
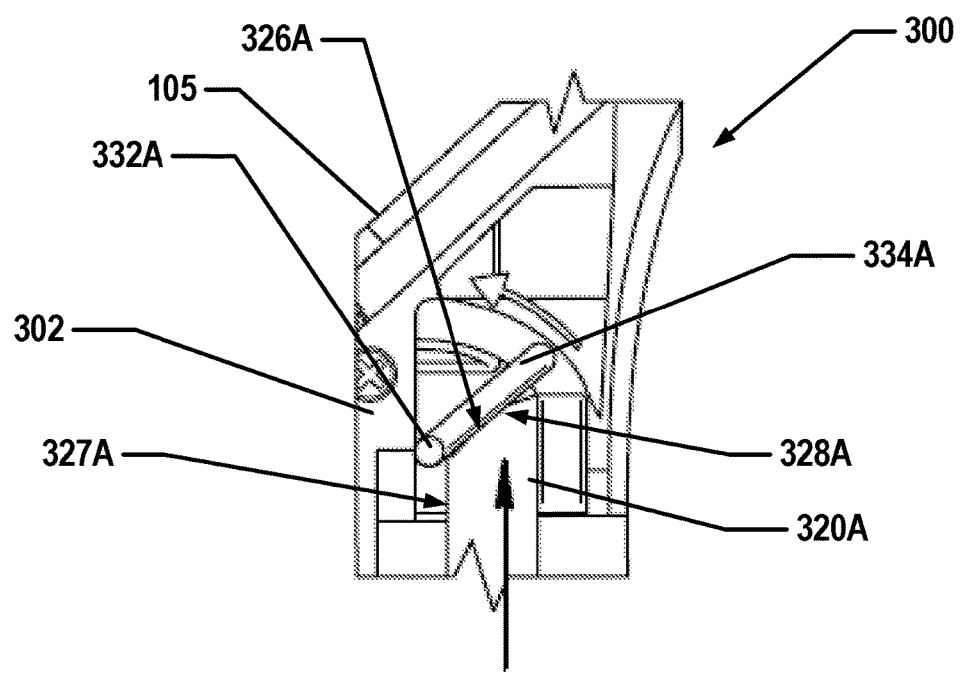
Figure 19C2

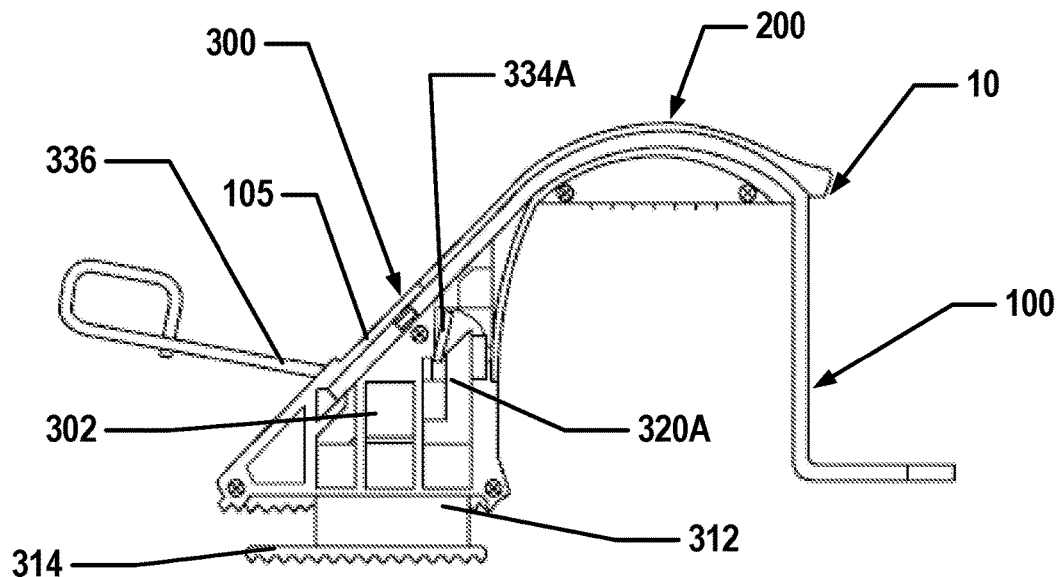
Figure 19D1
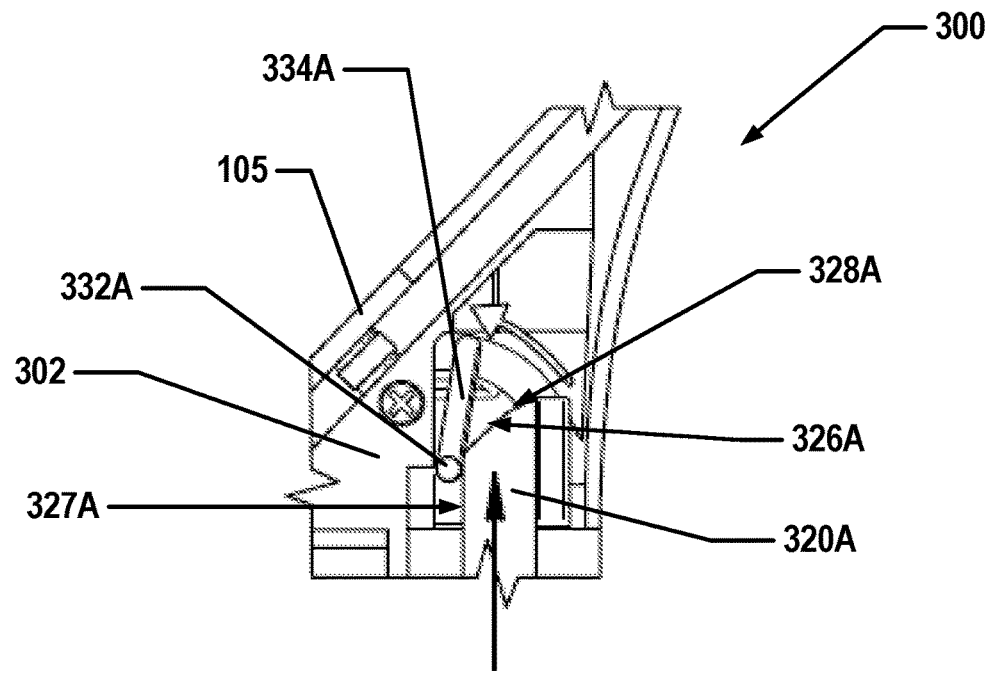
Figure 19D2

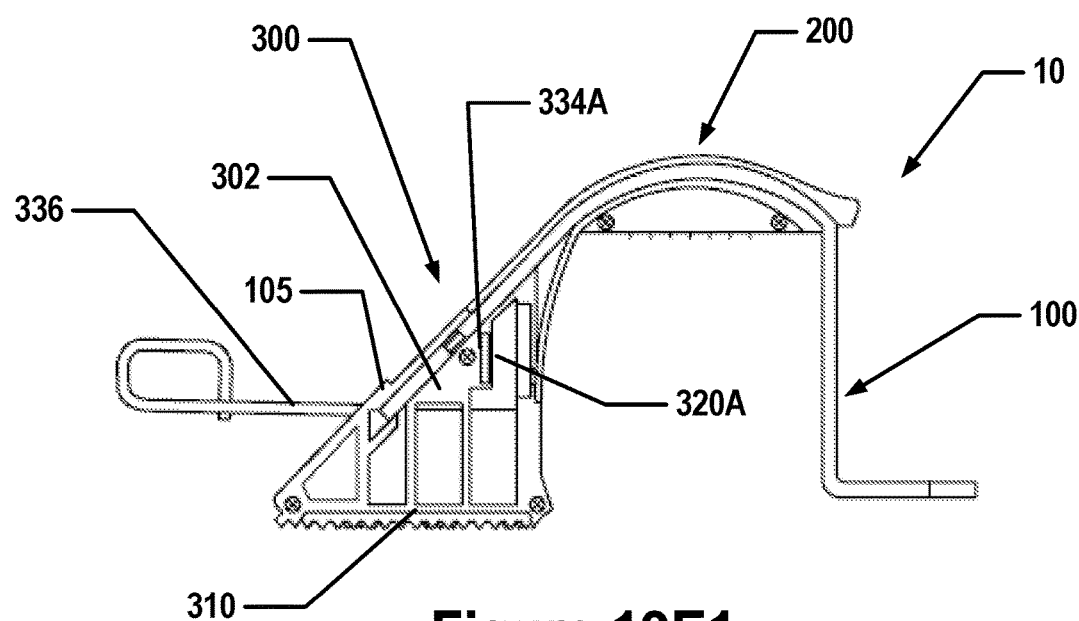
Figure 19E1
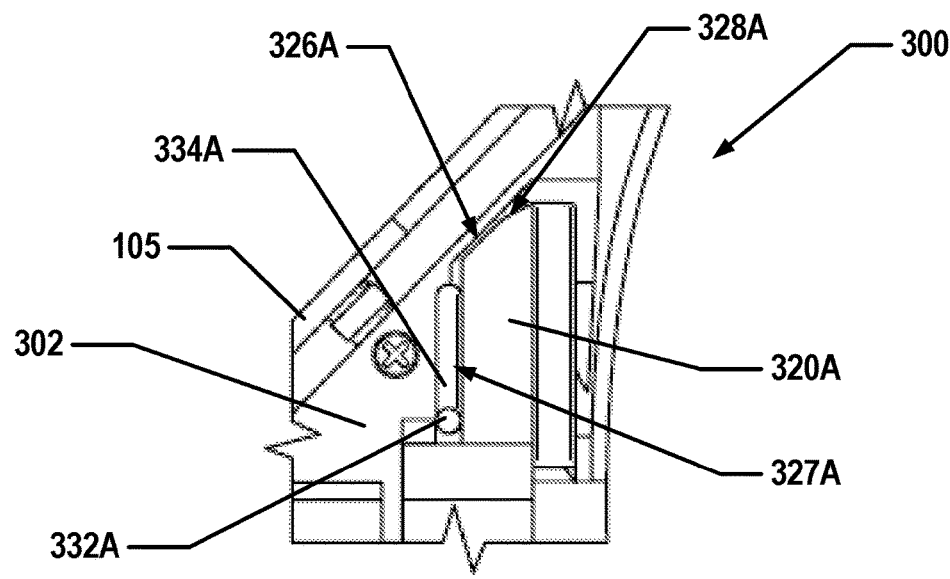
Figure 19E2

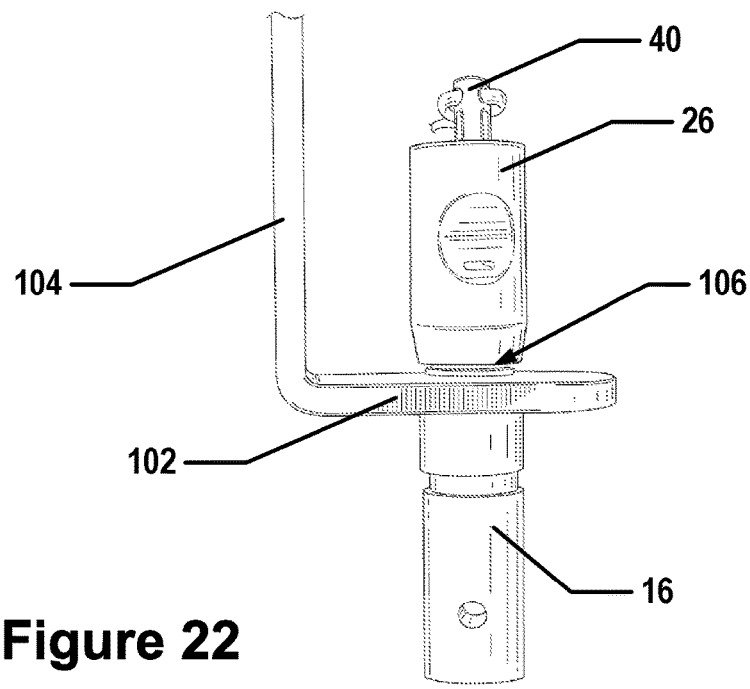
Figure 22
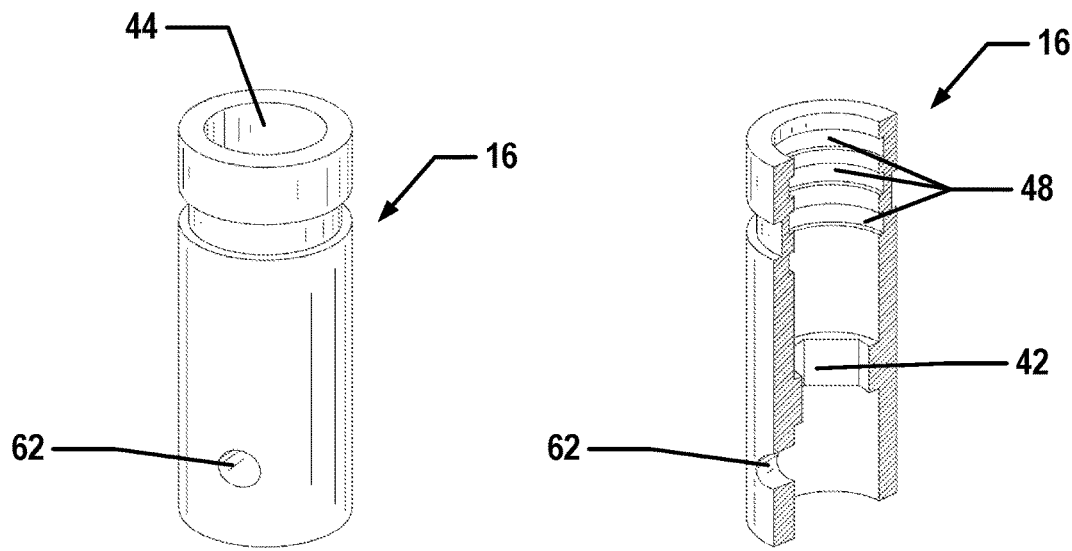
Figure 23  Figure 24

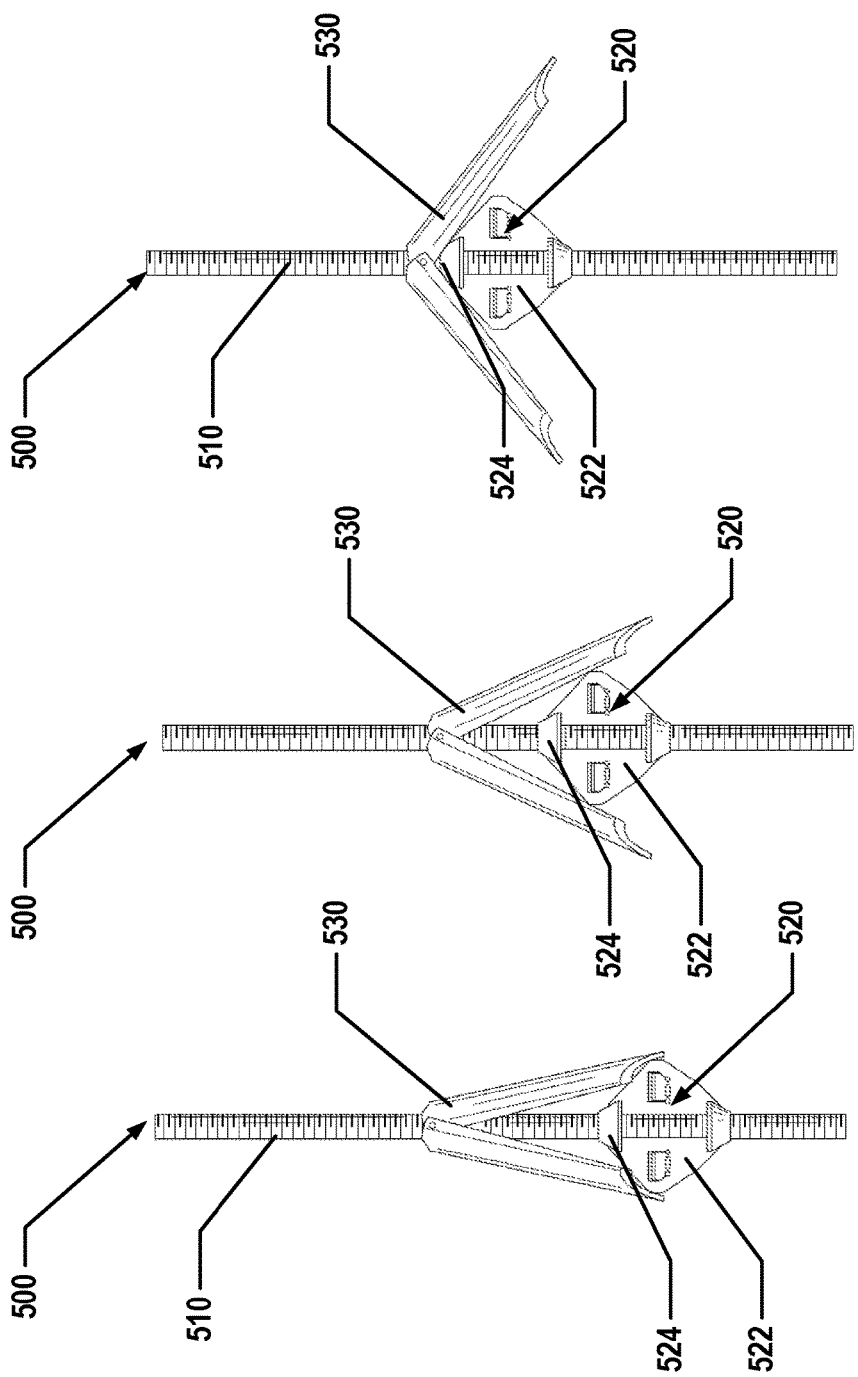

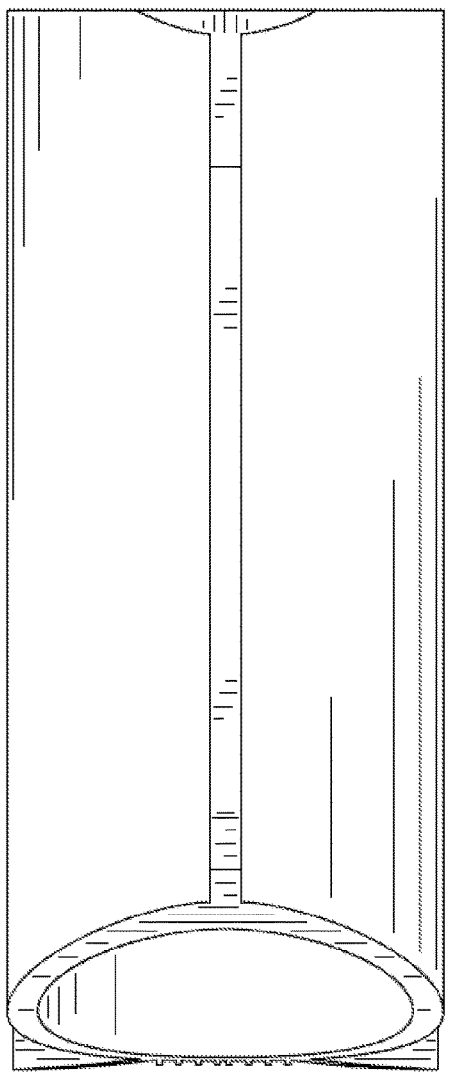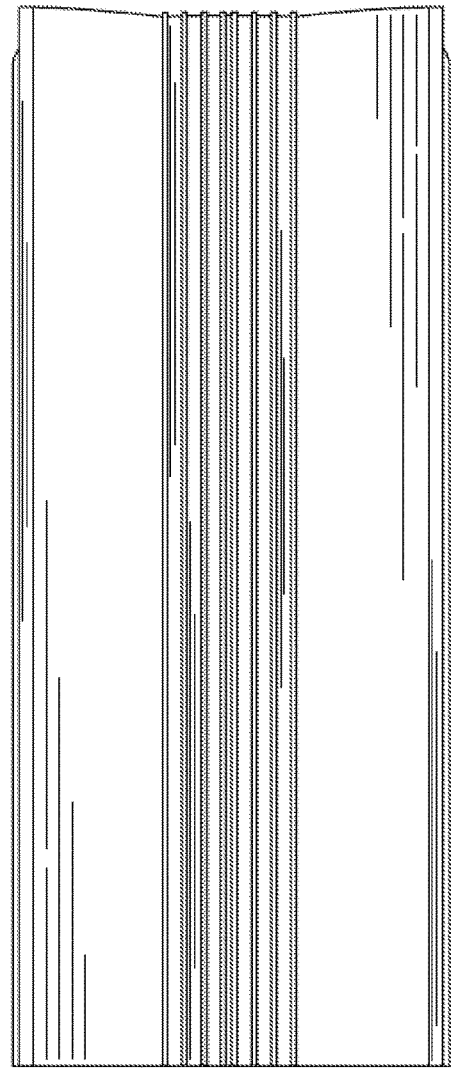
Figure 29F                    Figure 29G

GOAL SECUREMENT SYSTEM AND METHOD

This application is a continuation of U.S. application Ser. No. 14/019,231, filed Sep. 5, 2013, which claims benefit to U.S. Provisional Application Ser. No. 61/698,419, filed Sep. 7, 2012 which is entirely incorporated herein by reference.

FIELD OF THE INVENTION

This application relates generally to securement and monitoring devices, and specifically related to securement and monitoring systems, devices, and methods for goals.

BACKGROUND

Sports that use goals, such as soccer or lacrosse, are becoming increasingly popular. These goals can be placed in various locations, such as parks, fields, and playgrounds, so that children and adults can play these sports and enjoy these sports. These goals need to be installed and secured properly or they can become a safety hazard for not only the players, but also anyone else who uses the parks, fields, or playgrounds. Accordingly, it would be advantageous to provide a securement and monitoring system and device for these goals to not only safely and properly secure the goals, but also to monitor the securement of the goals after they have been safely and properly secured.

SUMMARY

The following presents a general summary of aspects of the invention in order to provide a basic understanding of at least some of its aspects. This summary is not intended as an extensive overview of the invention. It is not intended to identify key or critical elements of the invention or to delineate the scope of the invention. The following summary merely presents some concepts of the invention in a general form as a prelude to the more detailed description provided below.

Aspects of this invention relate to a goal securement and monitoring device that includes a securement member, a securement housing, and a pressure pad assembly. The securement member may be configured to secure a ground bar of a goal to the ground. The securement member may include a ground base member and an arm member extending from the ground base member. The ground base member may be configured to be secured to the ground. The arm member may define a channel in which the ground bar of the goal can be positioned in between the arm member and the ground when the ground base member is secured to the ground. The securement member may further include at least one of a gusset or a set of press ribs configured to resist deformation of the securement member.

The securement housing may enclosing a portion of the arm member such that the ground bar of the goal can be positioned in between the securement housing and the ground when the ground base member is secured to the ground. The securement housing may include a first and second opposing halves, wherein the first and second opposing halves are joined by a clip joint. The securement housing may further include at least one groove that is complimentary with an edge of the securement member such that the edge of the securement member fits within the groove. The securement housing may include a set of crush ribs defined with the groove, wherein the crush ribs are configured to deform and conform to the shape of the edge of the securement member to establish a friction fit between the securement housing and the securement member.

The pressure pad assembly may be configured to indicate whether the ground base member is secured to the ground. The pressure pad assembly may include a pressure pad housing, a pressure pad base, a pressure pad biasing element, and an indicator. The pressure pad may enclose a distal portion of the arm member. The pressure pad base may be slidably coupled to the pressure pad housing such that a portion of the pressure pad base is positioned within the pressure pad housing when the pressure pad assembly is in a set position and the portion of the pressure pad base extends from the pressure pad housing when the pressure pad assembly is in an extended position. The pressure pad biasing element may bias the pressure pad housing and the pressure pad base into the extended position. The pressure pad assembly may be configured to be in the set position when the ground member is secured to the ground and is configured to be in the extended position when the ground base member is not secured to the ground. The indicator may be configured to indicate at least one of: 1) that the ground base member is not secured to the ground when the pressure pad assembly is in the extended position or 2) that the ground base member is secured to the ground when the pressure pad assembly is in the set position.

Additional aspects of this invention relate to a goal securement and monitoring device that includes a securement member configured to secure a ground bar of a goal to the ground. The securement member may include a ground base member and an arm member extending from the ground base member. The ground base member may be configured to be secured to the ground. The arm member may define a channel in which the ground bar of the goal can be positioned in between the arm member and the ground when the ground base member is secured to the ground.

The goal securement and monitoring device may also include a securement housing enclosing a portion of the arm member. The securement housing may be configured such that the ground bar of the goal can be positioned in between the securement housing and the ground when the ground base member is secured to the ground.

The goal securement and monitoring device may also include a pressure pad assembly that may be configured to indicate whether the ground base member is secured to the ground. The pressure pad assembly may have a pressure pad base and a pressure pad biasing element. The pressure pad base may be operably connected to a distal portion of the arm member with the pressure pad biasing element operably connected to the distal portion of the arm member and the pressure pad base. The pressure pad assembly may be configured to move from a set position when the ground base member is secured to the ground to an extended position when the ground base member is not secured to the ground. The pressure pad biasing element may bias the pressure pad assembly to the extended position.

BRIEF DESCRIPTION OF THE DRAWINGS

A more complete understanding of the present disclosure and certain advantages thereof may be acquired by referring to the following detailed description in consideration with the accompanying drawings, in which:

FIGS. 18A1 through 19E2 illustrate the operation of an embodiment of a goal securement device in cross-sectional and expanded views;

FIGS. 22 through 24 illustrate embodiments of components of an embodiment of a goal securement device;

FIGS. 25 through 27 illustrate embodiments of a component of an embodiment of a goal securement device;

FIG. 29F is a top view of the device of FIG. 29A;
and
FIG. 29G is a bottom view of the device of FIG. 29A.

The reader is advised that the attached drawings are not necessarily drawn to scale.

DETAILED DESCRIPTION

In the following description of various example embodiments of the invention, reference is made to the accompanying drawings, which form a part hereof, and in which are shown by way of illustration various example structures, devices, systems, and environments in which aspects of the invention may be practiced. It is to be understood that other specific arrangements of parts, structures, example devices, systems, and environments may be utilized and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three dimensional orientation of structures in order to fall within the scope of this invention.

Figure 1:
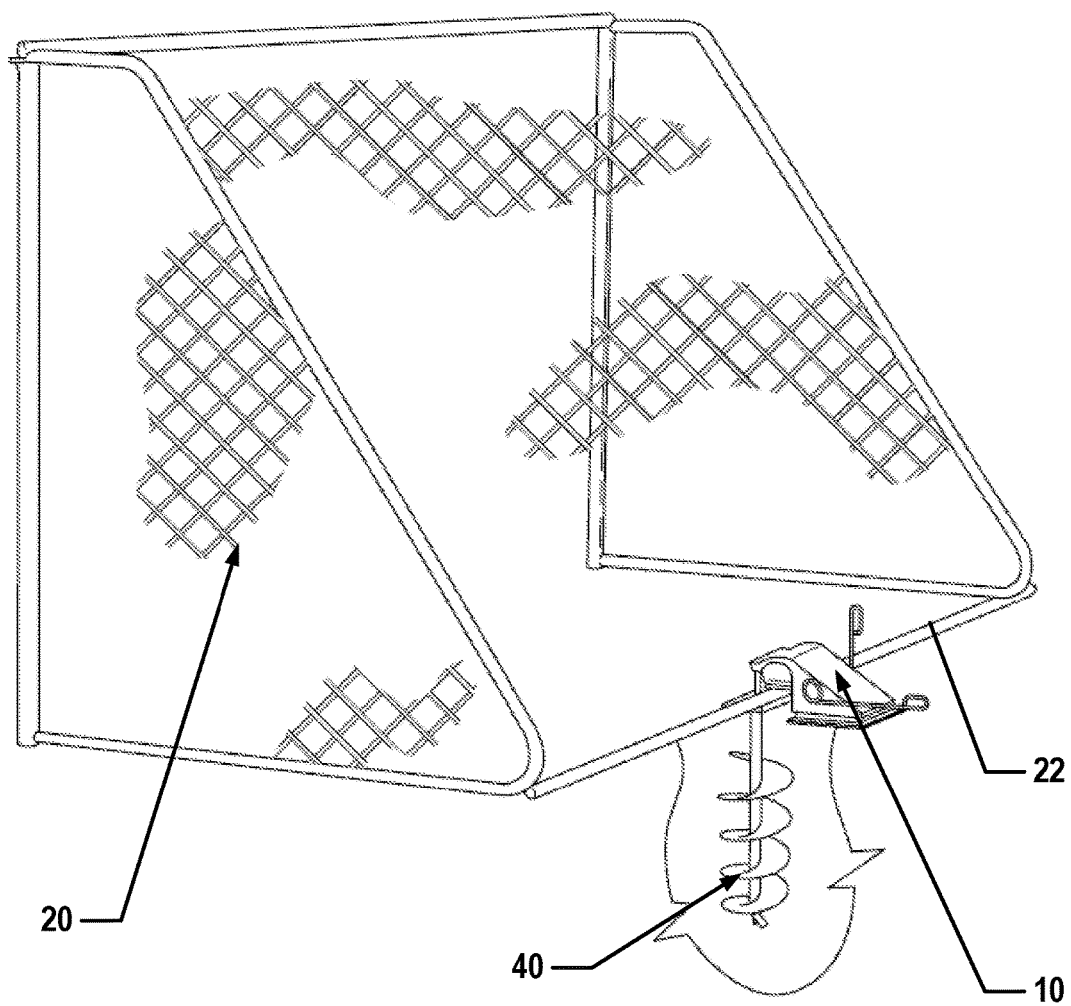
FIGS. 1 and 1A illustrate embodiments of a goal securement device installed on a ground bar of a soccer goal.
Figure 1A:
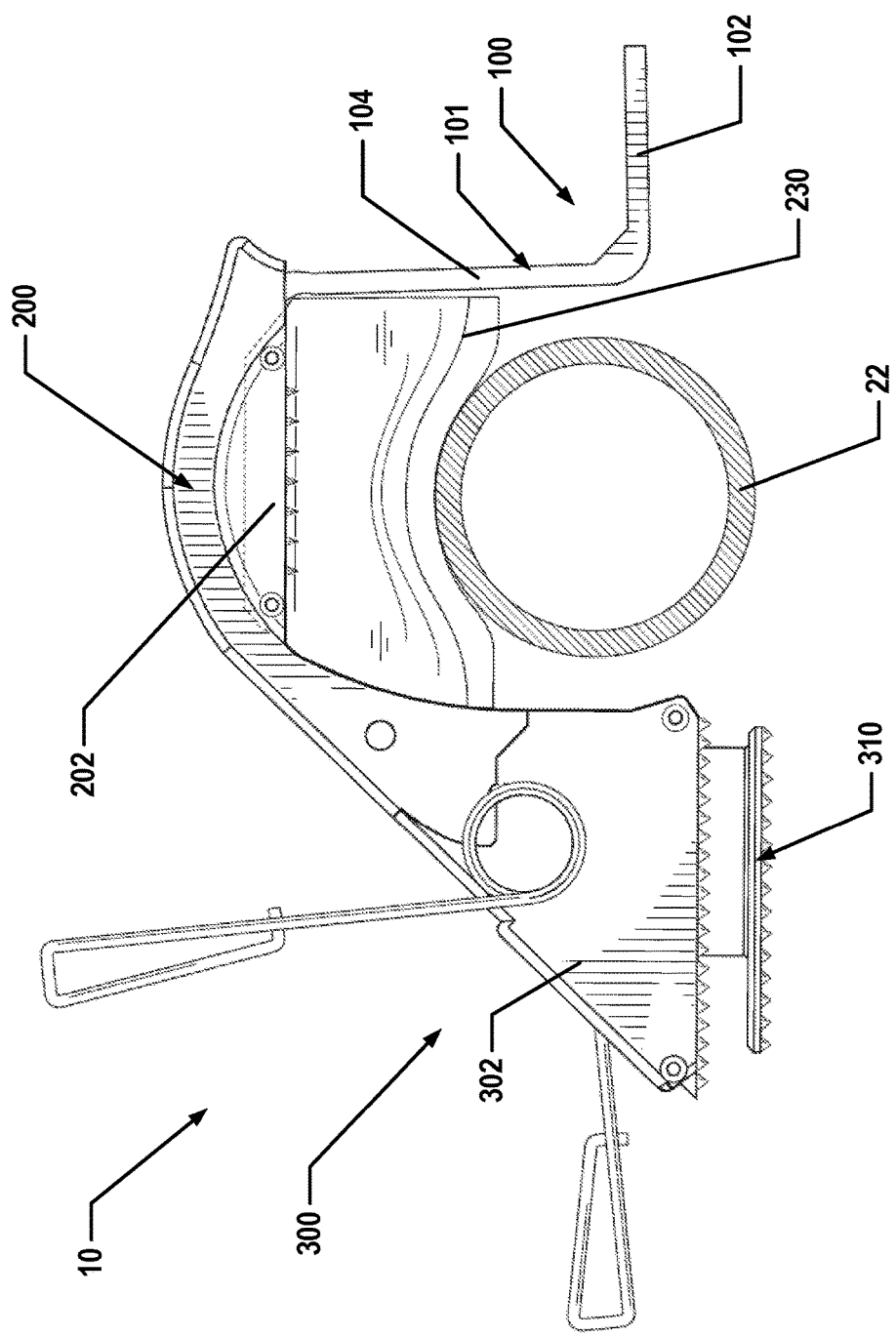

Referring to FIGS. 1 and 1A, an embodiment of a goal securement device 10 is installed on a ground bar 22 of a soccer goal 20. For purposes of the present disclosure, reference to ground bar or rear ground bar means any bar that forms part of a goal structure 20 and rests on the ground, whether such bar is along a side or along the rear of the goal 20, such as the rear ground bar 22 shown in FIG. 1. The goal securement device of the present disclosure may be used on various sporting goals that typically include ground bars, including but not limited to soccer goals, lacrosse goals, field hockey goals, and the like.

Referring to FIGS. 1 through 6, in an embodiment, a goal securement device 10 may include a ground engagement system 40, a ground securement system 100, a goal securement system 200, and a goal securement monitoring system 300. In an embodiment, the systems work cooperatively to secure a goal to the ground and monitor the status of such securement. Embodiments of each system and embodiments of various components, aspects, or features of each system are described by example below. FIGS. 28A through 28H illustrate another embodiment of a goal securement device as described below.

In an embodiment, the ground securement system 100 may include a securement member 101. In an embodiment, the securement member 101 can include a ground base member 102 and an arm member 104. The ground base member 102 can be configured to extend substantially horizontal relative to the ground, such that the bottom surface of the ground base member 102 can be substantially parallel with the ground when the goal securement device 10 is installed on a goal. The arm member 104 can be configured such that at least a portion of the arm member extends substantially perpendicular to the ground base member 101 so that the portion of the arm member 104 extends away from the ground when the goal securement device 10 is installed on a goal. The securement member 101 may include a connection element for connecting the securement member 101 to the ground engagement system 40. In one embodiment, the connection element can be a hole 106 defined in the ground base member 102 through which the ground securement system 100 is attached or secured to the ground engagement system 40. Various methods and structures may be used to secure the ground securement system 100 to the ground engagement system 40, including but not limited to example methods and structures disclosed herein.

Figure 14A:
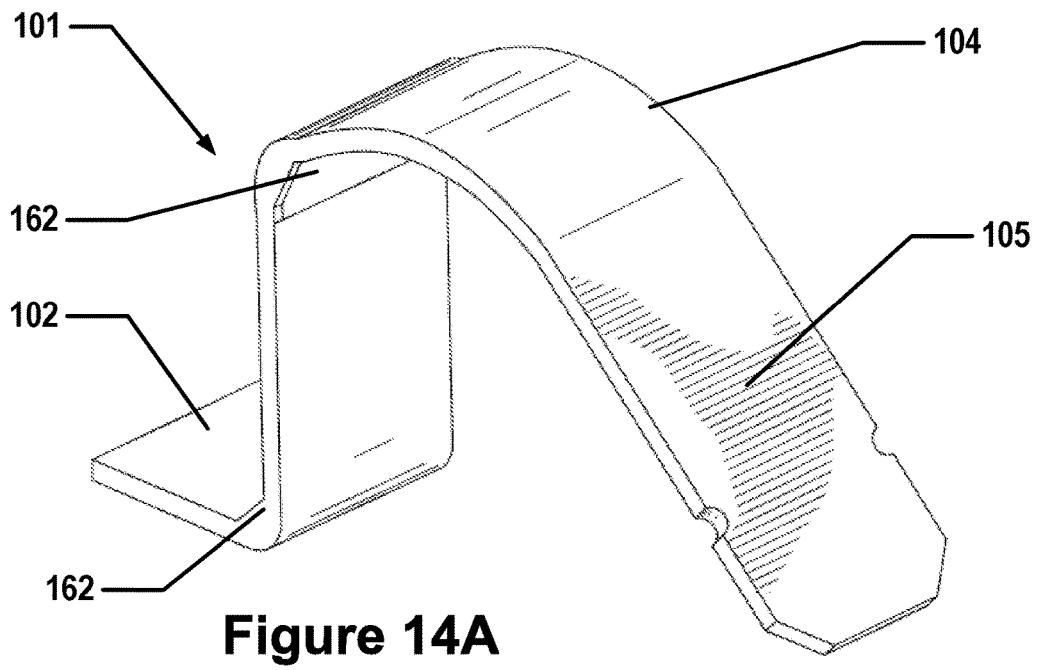
Figure 14B:
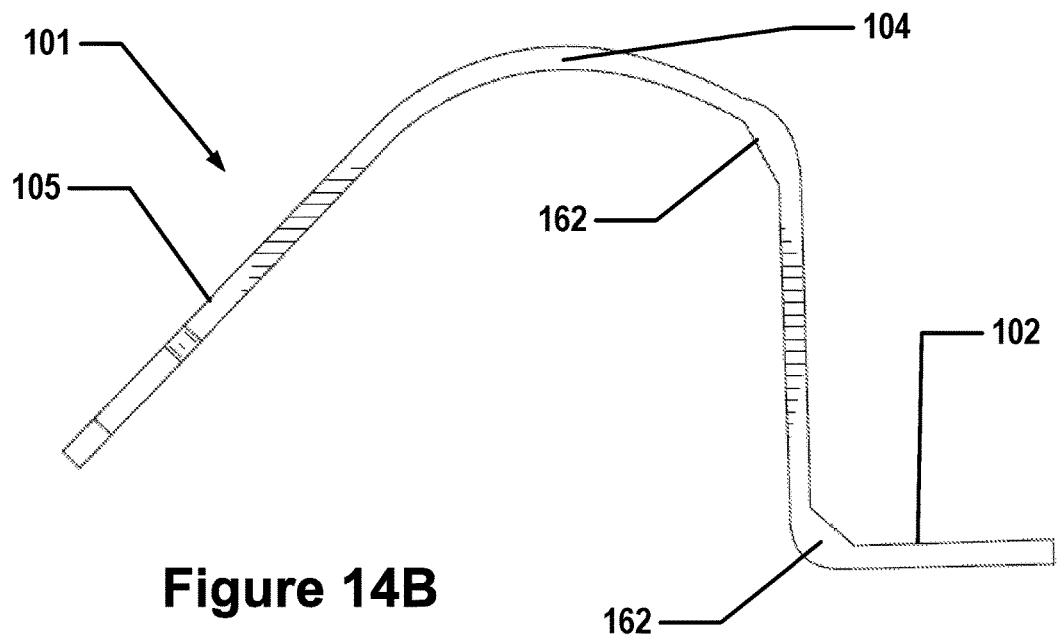
Figure 14C:
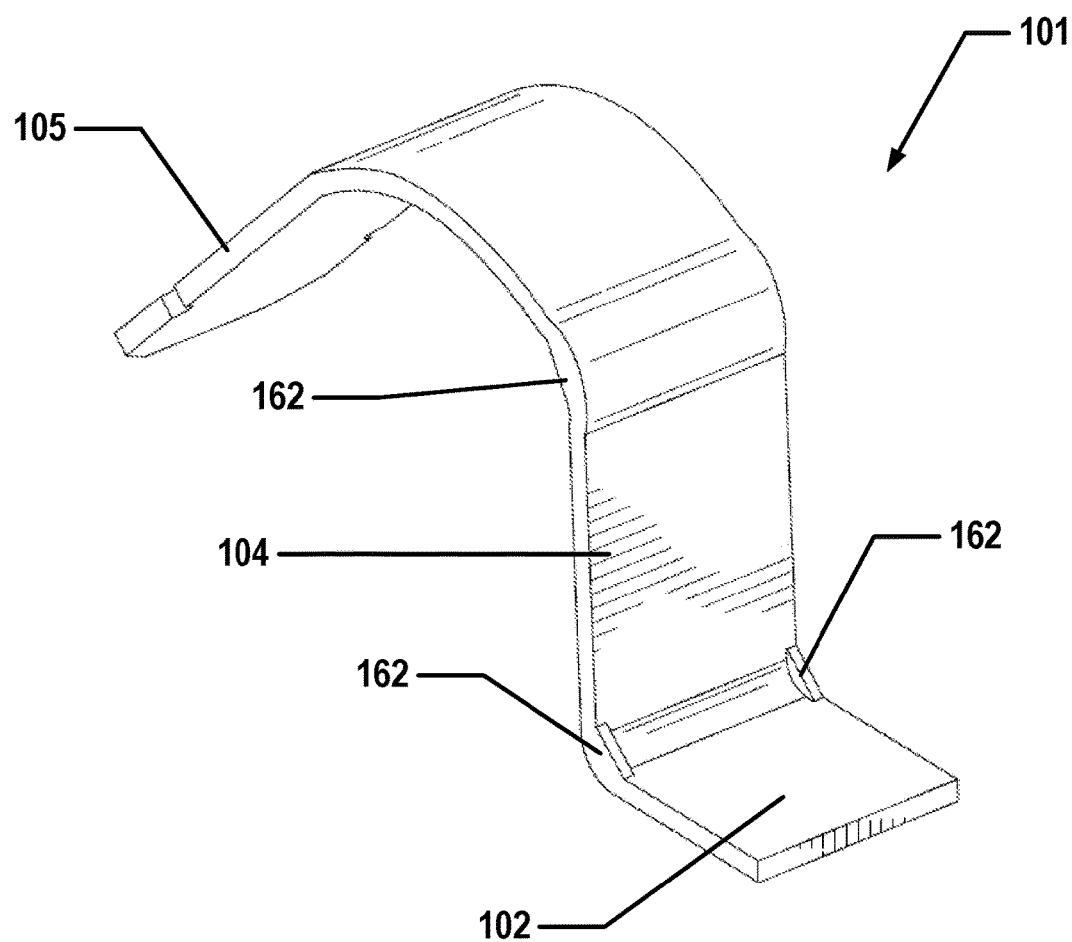
Figure 14D:
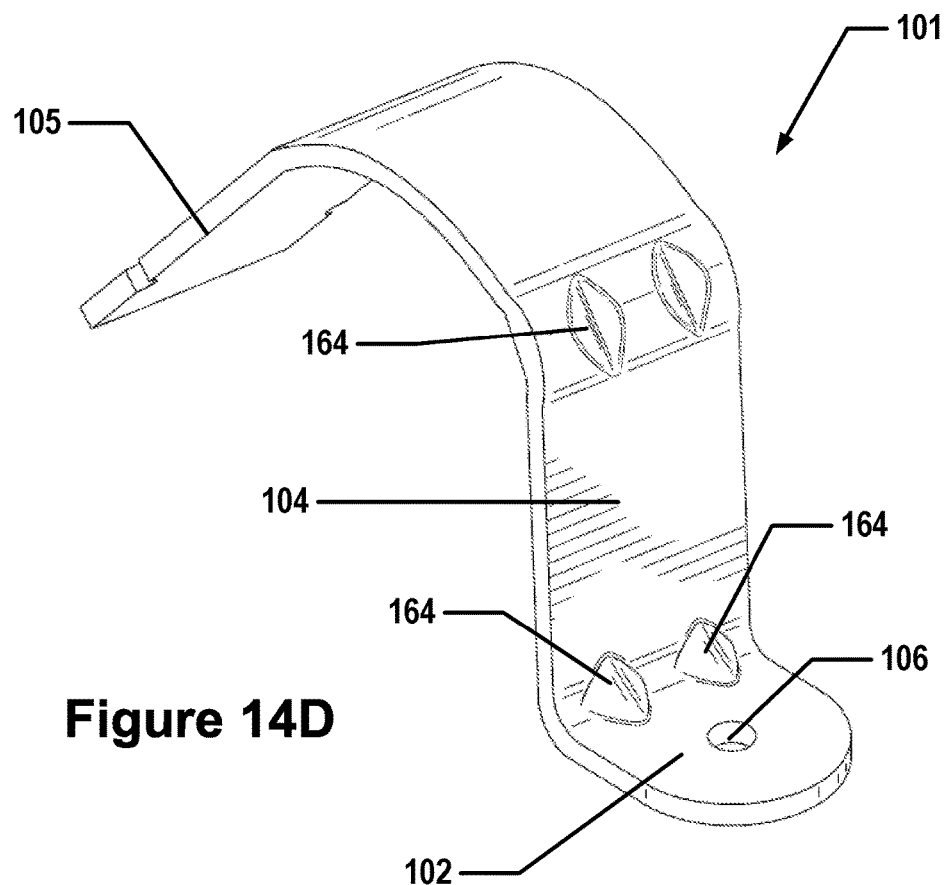
Figure 14E:
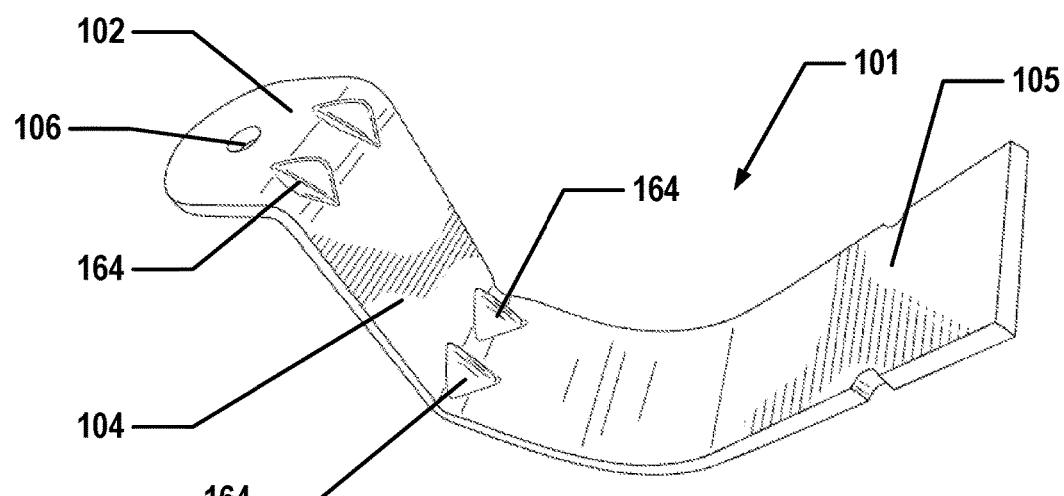

The securement member 101 can include various aspects. Referring to FIGS. 14A through 14C, in an embodiment, the securement member 101 can include gussets 162 defined at the edges of points where the securement member 101 bends or curves. The gussets 162 resist deformation of the securement member 101 at such bends or curves. Similarly, referring to FIGS. 14D and 14E, in an embodiment, the securement member 101 can include press ribs 164 at the points where the securement member 101 bends or curves. The press ribs resist deformation of the securement member 101 at such bends or curves.

In an embodiment, the goal securement system 200 cooperates with other aspects of the goal securement device to secure a goal to the ground. In an embodiment, the goal securement system 200 extends from the ground securement system 100 to define a space in which the ground bar can be secured between a structure of the goal securement system 200 and the ground. In an embodiment, the arm member 104 extends from the ground securement system 101 to form at least a portion of such structure of the goal securement system 200. Referring to FIG. 14B, in an embodiment, the arm member 104 can extend vertically from the ground base member 102 and then horizontally in a curved manner and wrap toward the ground to thereby define a space in which a ground bar 22 can be secured in between the arm member 104 and the ground.

Figure 10A:
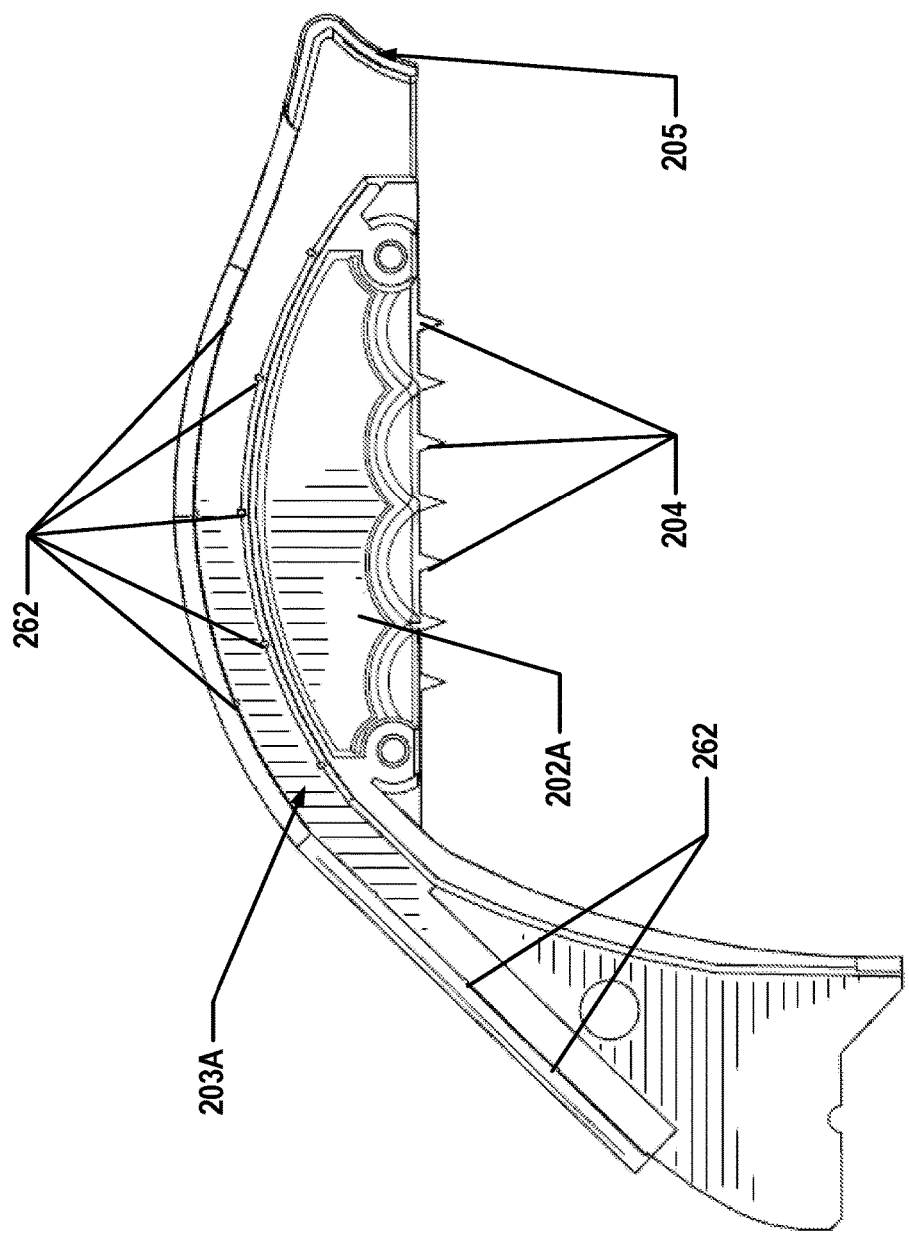
FIGS. 10A through 17B illustrate embodiments of various components of embodiments of a goal securement device.
Figure 10B:
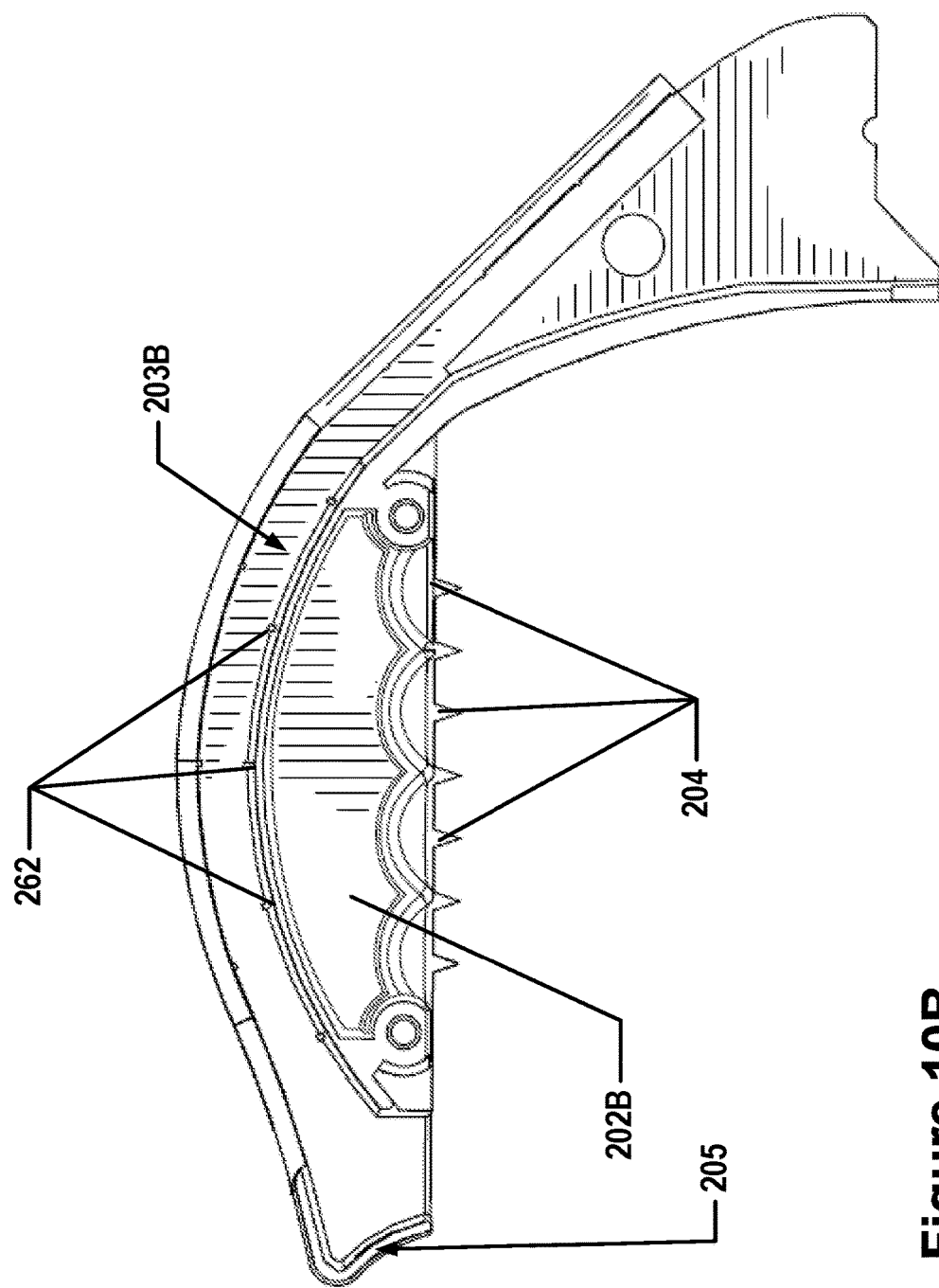
Figure 11A:
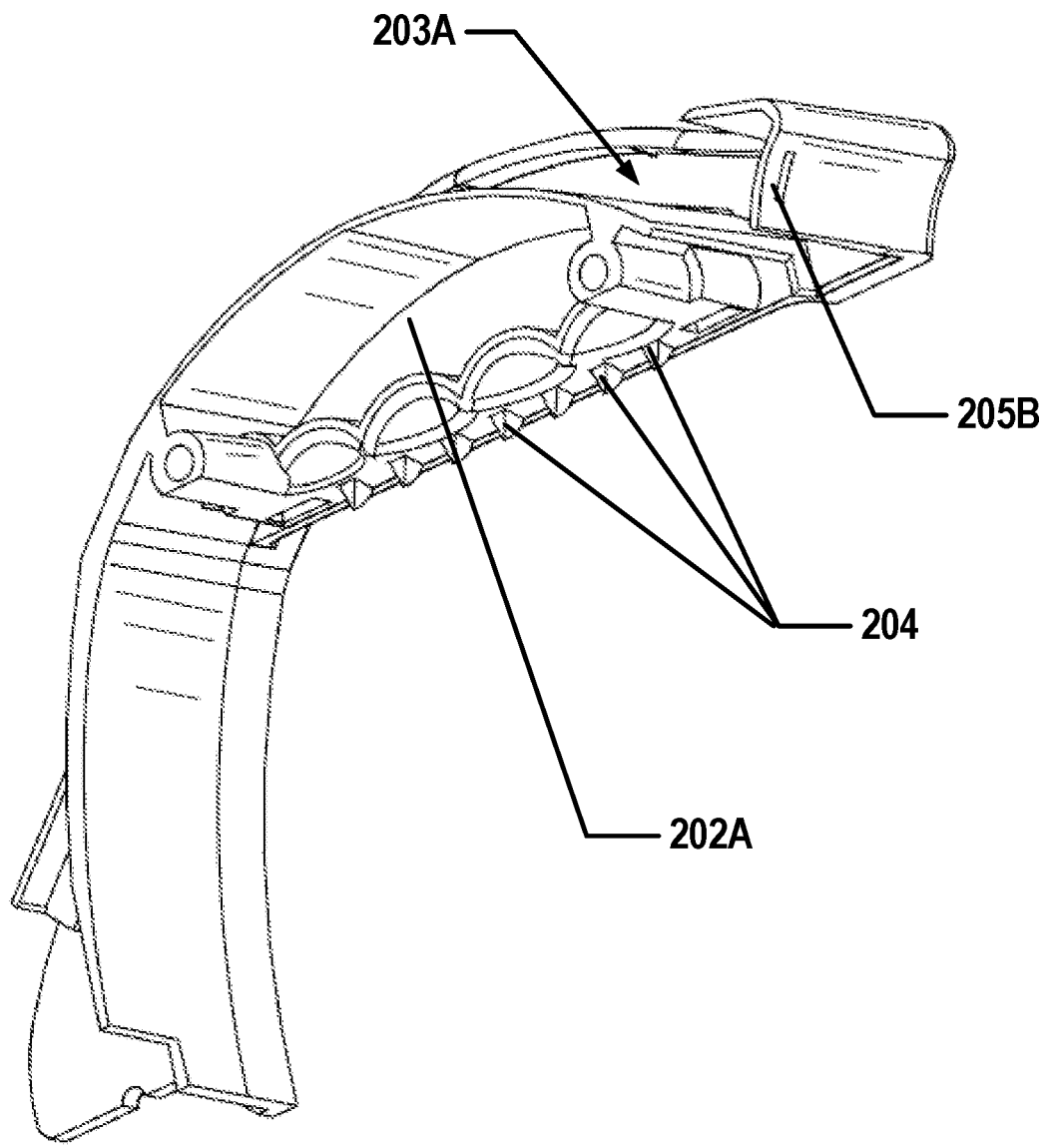
Figure 11B:
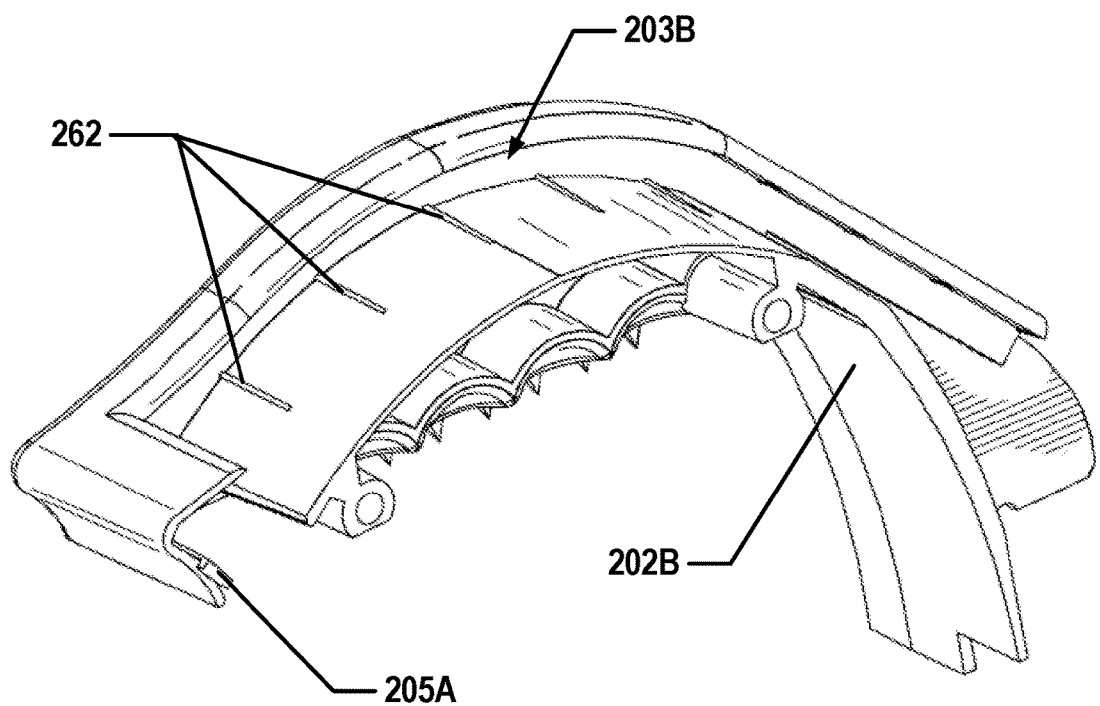

In an embodiment, the goal securement system 200 includes a securement housing 202 enclosing a portion of the arm member 104 under which the ground bar will be secured to the ground. Referring to FIGS. 10A through 11B, embodiments of securement housing 202 are shown. A securement housing 202 can include two opposing halves that join to form the housing. FIG. 10A depicts a half of a securement housing 202A that can join with the opposing half of a securement housing 202B depicted in FIG. 10B. FIG. 11A depicts a half of a securement housing 202A that can join with the opposing half of a securement housing 202B depicted in FIG. 11B. The halves of the securement housing depicted in FIGS. 11A and 11B may include a clip joint 205 to join the rear portion of the securement housing. The clip joint 205 can include a clip 205A and a clip receiver 205B. A securement housing 202 can include securement housing grooves 203A, 203B in which the edges of a portion of the securement member 101 are received. A portion of the securement member 101 can be enclosed in the securement housing 202 when the halves are joined together with the edges of the securement member 101 positioned in the respective securement housing grooves 203A.

In an embodiment, the securement housing grooves 203A, 203B can include crush ribs 262 defined therein. When the edges of the securement member 101 are inserted into the securement housing grooves 203A, 203B, the crush ribs 262 deform and conform to the shape of the edges of the securement member 101. The crush ribs 262 thereby improve the friction fit between the edges of the arm member 104 and the securement housing grooves 203A, 203B. Crush ribs 262 can be configured to be thinnest at the point of entry and increase in thickness, like a ramp, further from the point of entry.

The securement housing 202 can be positioned in contact with the ground bar 22 and operate to secure the ground bar 22 to the ground when the ground securement section 100 is secured to the ground. The bottom surface of the securement housing 202 may be configured to match or conform to the shape of the ground bar 22. For example, in an embodiment, the bottom of the securement housing 202 can include a substantially flat bottom surface to match a ground bar of generally rectangular shaped cross section that has a substantially flat top surface. Also, for example, in an embodiment, the bottom surface of the securement housing 202 can be rounded to conform to a ground bar having a cross section of generally circular shape. Other configurations of the securement housing 202 may be utilized. The securement housing 202 may include gripping structure, such as teeth or spikes 204, to facilitate sound contact between the securement housing and the ground bar. The teeth or spikes 204 may also perform a theft-deterrent function by deterring a thief from manually separating the goal securement housing 202 from the ground bar on which it is installed.

In an embodiment, the goal securement system 200 can include a resilient securement member 230. A resilient securement member can be constructed of a resilient or flexible material or structure that allows the resilient securement member 230 to conform to the shape of an object against which it is pressed. In an embodiment, a resilient securement member is used to conform the securement system 202 to various shapes and sizes of ground bars, which thereby allows the goal securement device to be compatible with various types and sizes of soccer goals.

An embodiment of a resilient securement member 230 is depicted in FIGS. 7A through 7D. Embodiments of a goal securement device that includes a goal securement system 200 having a resilient securement member 230 are depicted in FIGS. 1, 1A, 8A and 8B. In an embodiment, the resilient securement member 230 comprises a substantially cylindrical shaped tube 234, which can also be referred to herein as a resilient tube 234. The resilient tube 234 can be constructed of resilient, flexible material. Such material includes, for example, plastic, rubber, composite material, or combinations thereof. The resilient tube 234 can conform to the shape of the object to which it is pressed against and thereby conform the goal securement system 200 to various shapes and sizes of ground bars and allow the goal securement device to be compatible with various types of soccer goals. By way of example, when the resilient tube 234 is pressed against a ground bar of generally circular cross section, the tube can compress inwardly and flex outwardly to conform to the shape of the ground bar. FIGS. 29A through 29G illustrate another embodiment of a resilient tube as described above.

In an embodiment, the resilient securement member 230 further includes gripping structures to facilitate sound contact between the resilient securement member 230 and the ground bar. In an embodiment, the gripping structures of the resilient securement member 230 include fins protruding from the surface of the resilient securement member which contact the ground bar. In an embodiment, lateral fins 235 and vertical fins 236 cooperate to prevent lateral movement and non-uniform flexing of the resilient securement member 230 and thereby help maintain the integrity of the contact between the resilient securement member 230 and the ground bar. In an embodiment, the resilient securement member 230 may include a mounting bracket 232 from which the resilient securement member 230 is attached to the underside of the securement housing 202.

In an embodiment, the goal securement system 200 can include an adjustable member that can be positioned at multiple positions to conform the goal securement system to various sizes and shapes of ground bars. In an embodiment, the adjustable member can be positioned at various heights relative to the ground to conform the goal securement system 200 to various sizes of ground bars. In an embodiment, the adjustable member can be shaped to conform to the shape of the ground bar. In an embodiment, the adjustable member can be formed of a rigid material.

Figure 9:
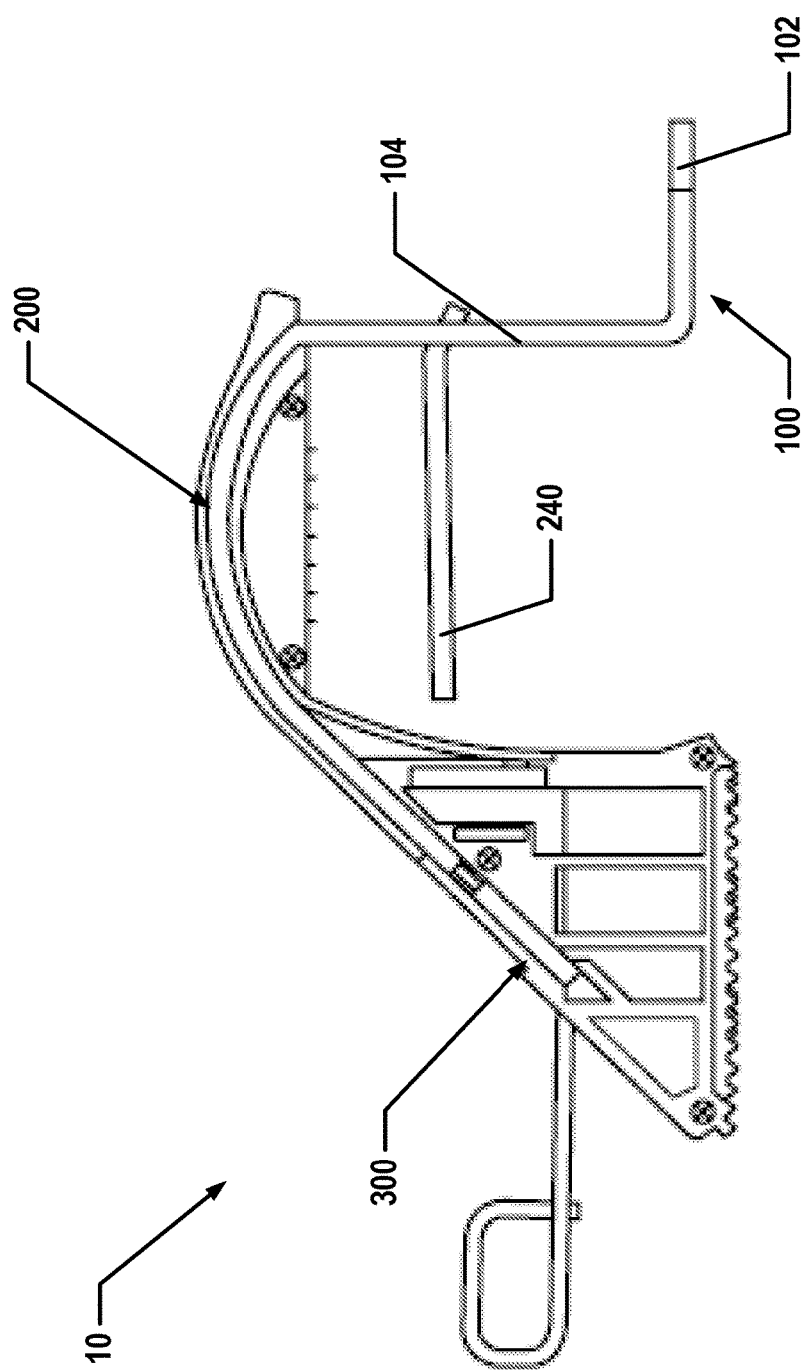
FIG. 9 illustrates a cross-sectional view of an embodiment of a goal securement device.

An embodiment of an adjustable member 240 is depicted in FIG. 9. The adjustable member 240 can be in the form of an adjustable bar 240 that is positionable at multiple heights relative to the ground to conform the goal securement system 200 to various sizes of ground bars. In an embodiment, the adjustable bar 240 can be positioned at multiple heights along the vertical height of the vertical portion of the arm member 104 by inserting the bar through multiple holes defined in the vertical portion of the arm member 104. In such example, the adjustable bar 240 may be adjusted up or down in order to conform to the size of a given ground bar. In an embodiment, a biasing member or spring may be utilized in conjunction with the adjustable bar 240 to bias the adjustable bar 240 against the ground bar and thereby conform the goal securement system to the size of the given goal.

In an embodiment, the goal securement device 10 includes a goal securement monitoring system 300. The goal securement monitoring system 300 may also be referred to herein as the goal monitoring system or the monitoring system. In an embodiment, the goal monitoring system 300 monitors the status and/or change of contact between the ground bar and the ground. In an embodiment, the goal monitoring system 300 monitors the status and/or change in securement of the goal and/or the goal securement device to the ground. Change in contact between the ground bar and the ground or change in securement of the goal to the ground can occur, for example, if the goal is tipped forward or if the goal securement device is disturbed after installation, such as for example if the securement of the ground engagement system 40 to the ground is compromised. In an embodiment, the goal monitoring system 300 may indicate that a ground bar has maintained securement the ground. In an embodiment, the goal monitoring system 300 may indicate that a ground bar has lost securement with the ground. In an embodiment, the goal monitoring system 300 may indicate whether the ground bar has maintained or lost securement with the ground. Such indications may be a visual indication, audible indication, or a combination of visual and audible indications. In an embodiment, the goal monitoring system 300 may maintain the indication that the ground bar has lost securement with the ground until the goal securement device has been re-secured and the indicator reset.

In an embodiment, the goal monitoring system 300 includes a pressure pad assembly for monitoring whether the ground bar has maintained or lost securement to the ground. In an embodiment, the pressure pad assembly can include a pressure pad housing 302, pressure pad base 312, pressure pad base plate 314, and pressure pad biasing element 318. Such pressure pad assembly 310 can be configured to move between a set position, as illustrated in FIGS. 18A1 and 19E1, and an extended position, as illustrated in FIGS. 18E1 and 19A1.

Figure 12A:
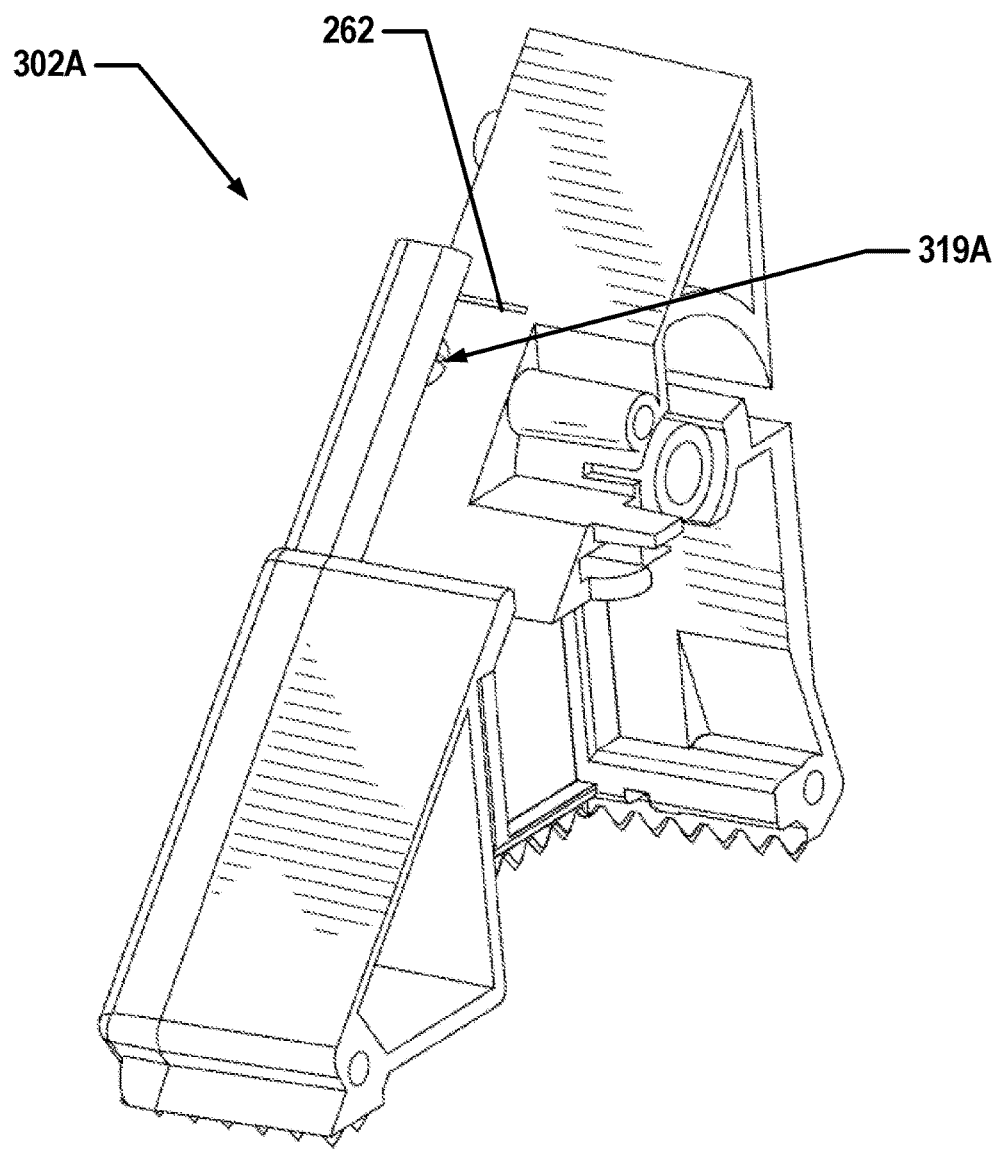
Figure 12B:
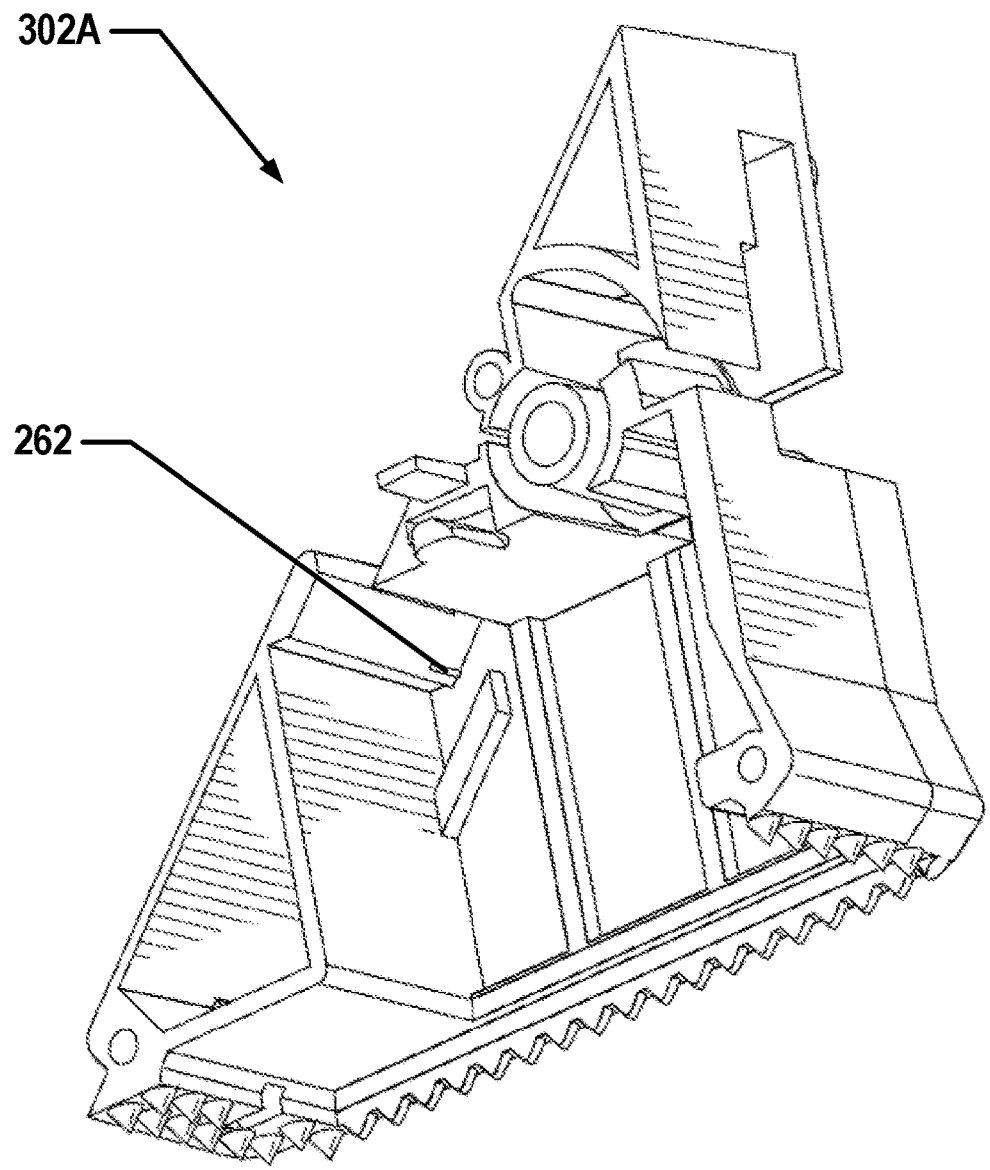
Figure 13A:
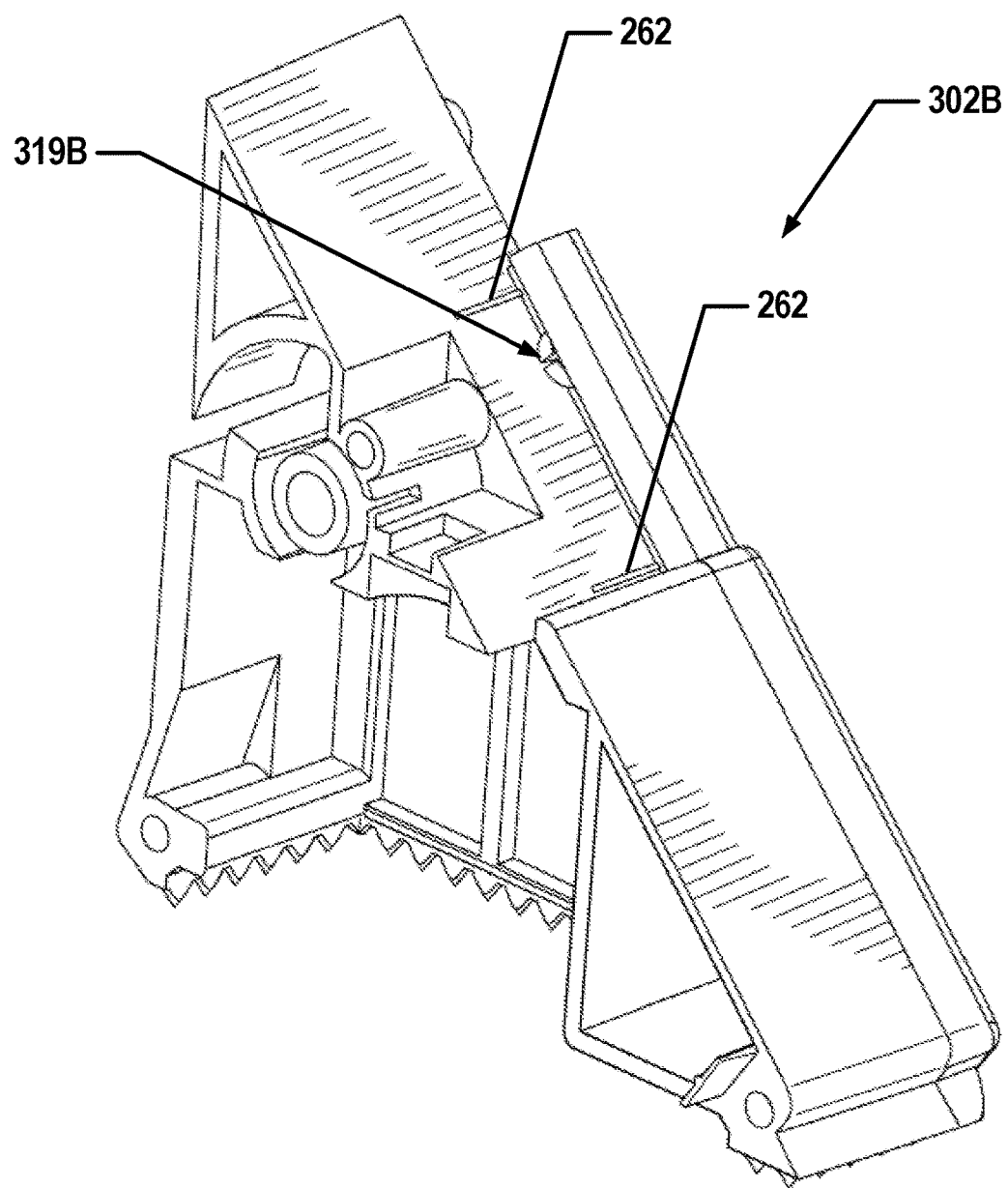
Figure 13B:
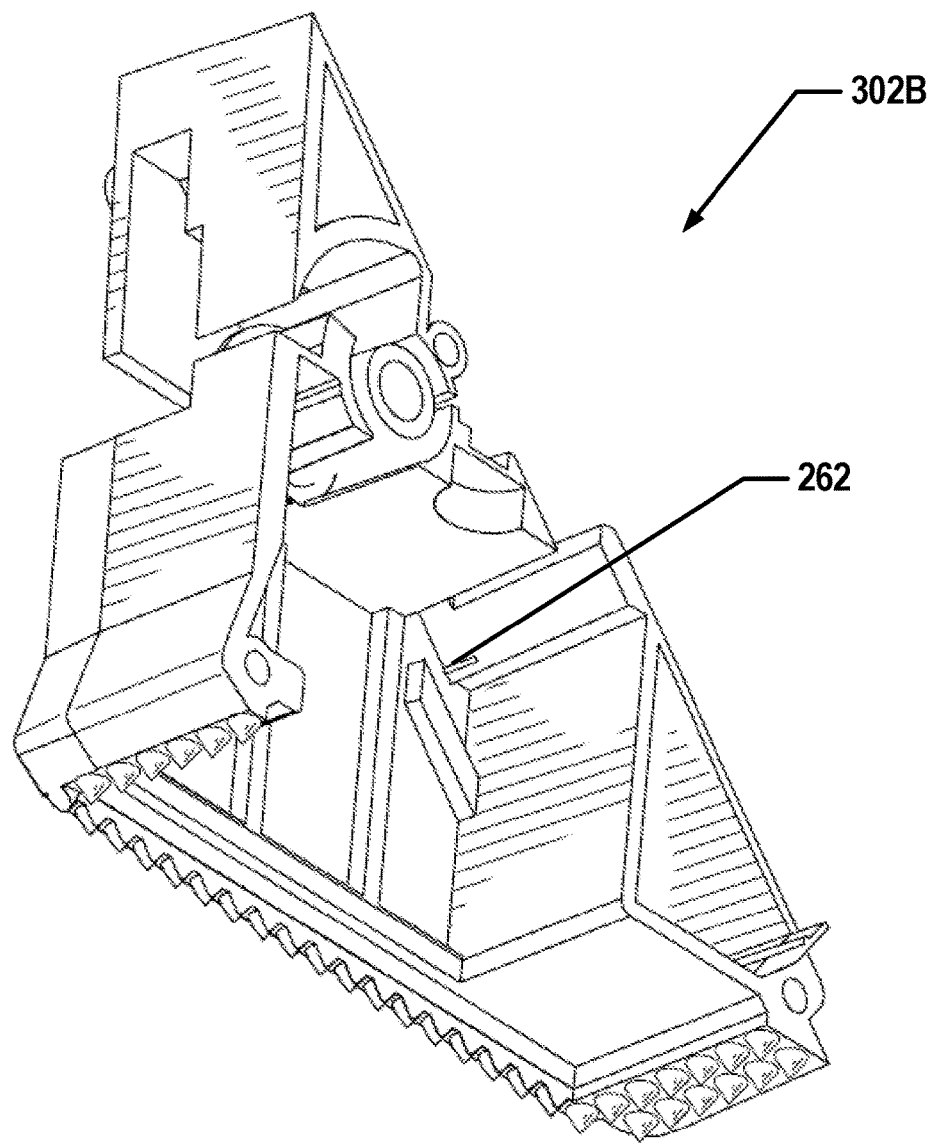
Figure 17A:
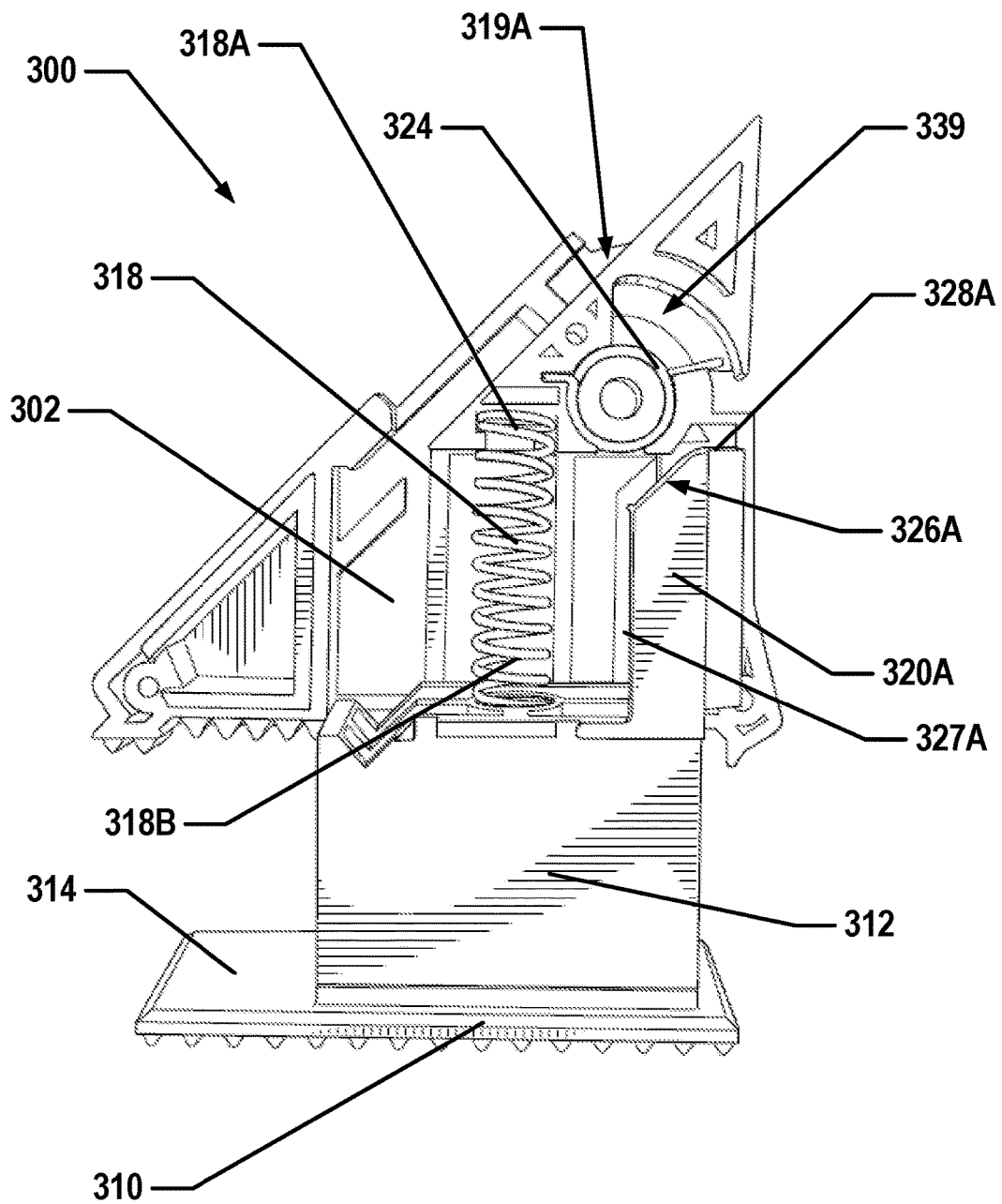
Figure 17B:
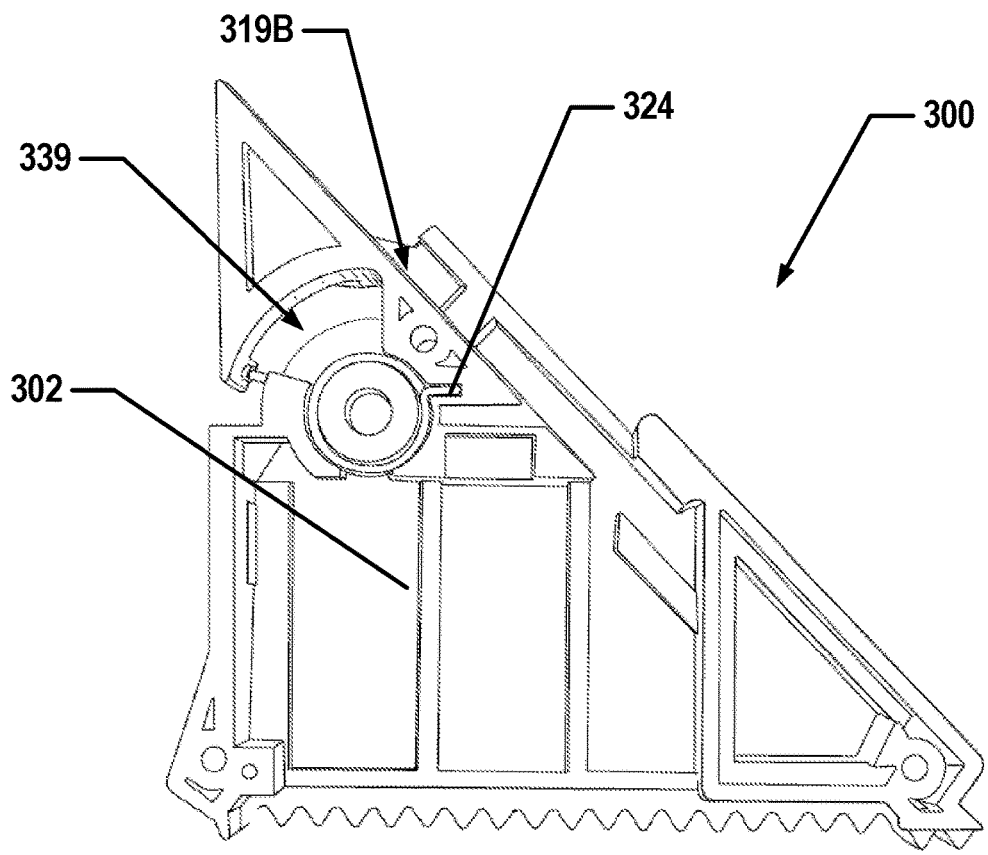

Referring to FIGS. 12A, 12B, 13A, 13B, 17A, 17B, a pressure pad housing 302 can include two opposing halves that join to make a complete housing. For example, an embodiment of a first half 302A of a pressure pad housing 302 is depicted in FIGS. 12A and 12B and an embodiment of a second half 302B of a pressure pad housing is depicted in FIGS. 13A and 13B. The first half 302A is complimentary to the second half 302B and can join to form a pressure pad housing 302. Similarly, an embodiment of a first half 302A of a pressure pad housing 302 is depicted in FIG. 17A and an embodiment of a complimentary second half 302B of a pressure pad housing is depicted in FIG. 17B. Referring to FIGS. 12A, 12B, 13A, and 13B, pressure pad housing halves 302A, 302B include grooves 319A, 319B for receiving the edges of a distal end 105 of a securement member 101. The grooves also include crush ribs 262.

Referring to FIG. 17A, in an embodiment, the pressure pad base 312 can be slidably coupled to the pressure pad housing 302, such that at least a portion of the pressure pad base 312 can slide into and out of the pressure pad housing 302. In an embodiment, the pressure pad base 312 can slide into the pressure pad housing 302 to arrive in the set position, as illustrated in FIG. 18A1, and out of the pressure pad housing 302 to arrive at the extended position, as illustrated in FIG. 18E1. In an embodiment shown in FIG. 17A, the pressure pad biasing element 318 may be a spring 318. The spring 318 can have a first end 318A positioned against a surface of the pressure pad housing 302 and a second end 318B positioned against an opposing surface of the pressure pad base 312. In such configuration, the spring 318 biases the pressure pad base 312 such that a portion of the pressure pad base 312 slides out of the pressure pad housing 302 and into an extended position. In turn, in such configuration, the pressure pad base 312 can be positioned in a set position by positioning the bottom surface of the pressure pad plate 314 on the ground and applying a sufficient amount of downward pressure or force to the pressure pad housing 302 to overcome the biasing pressure of the spring 318 and thereby cause the pressure pad base 312 to slide into the pressure pad housing 302. If the downward pressure on the pressure pad housing 302 becomes less than the biasing pressure of the spring 318, the spring 318 will bias the pressure pad base 312 to extend out of the pressure pad housing 302 toward the extended position and, therefore, out of the set position. In an embodiment, the biasing element or spring 318 has a biasing pressure of about 22 pounds of force. In an embodiment, the biasing element or spring has a biasing pressure in the range of about 10 to about 50 pounds of force. The term "about" as used herein with regarding to pounds of force means plus or minus 10% of the provided value of pounds of force. A wider range of biasing pressure may be appropriate in view of the particular application of the device.

Figure 2A:
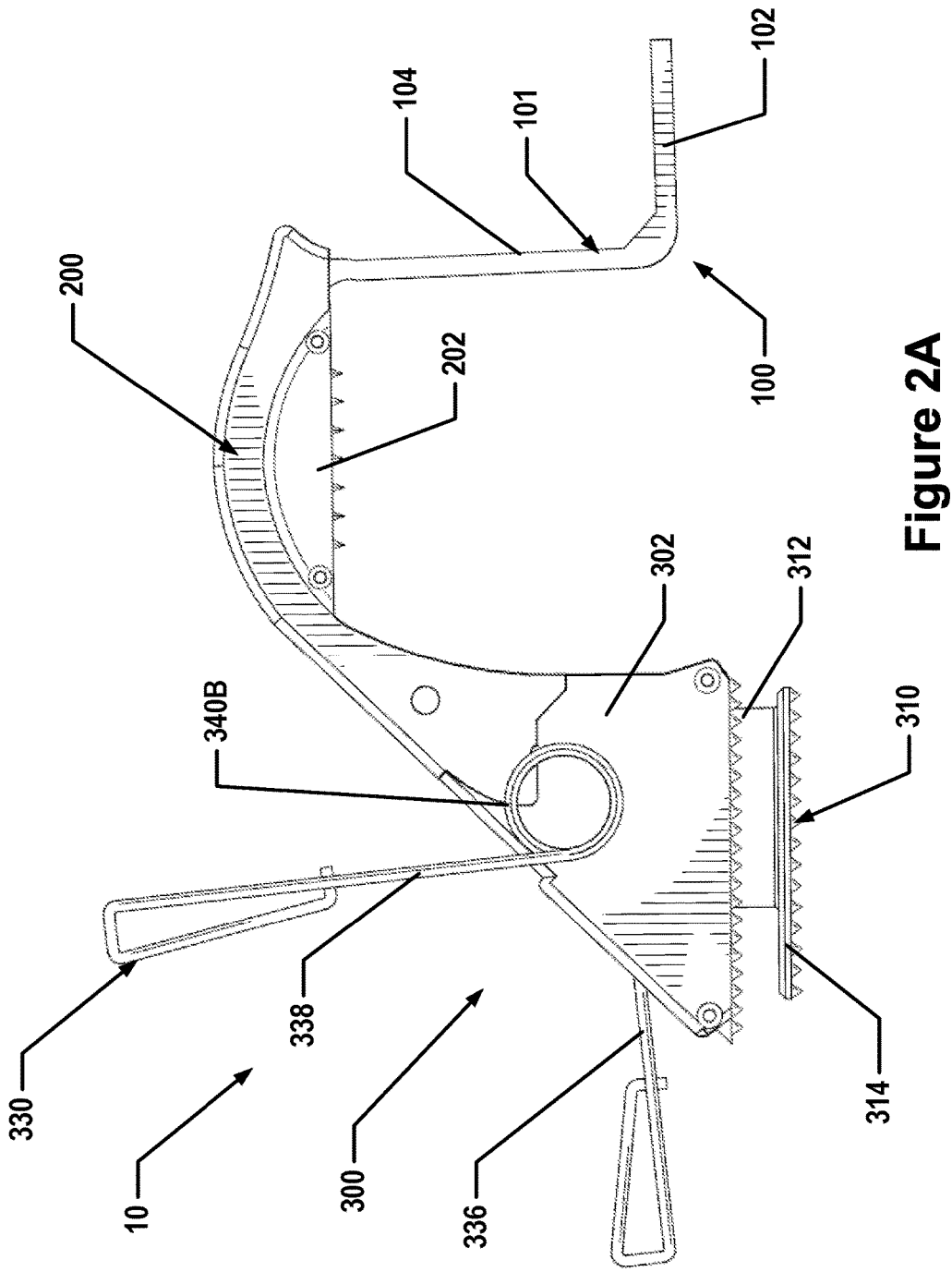
FIGS. 2A through 6 illustrate an embodiment of a goal securement device.
Figure 2B:
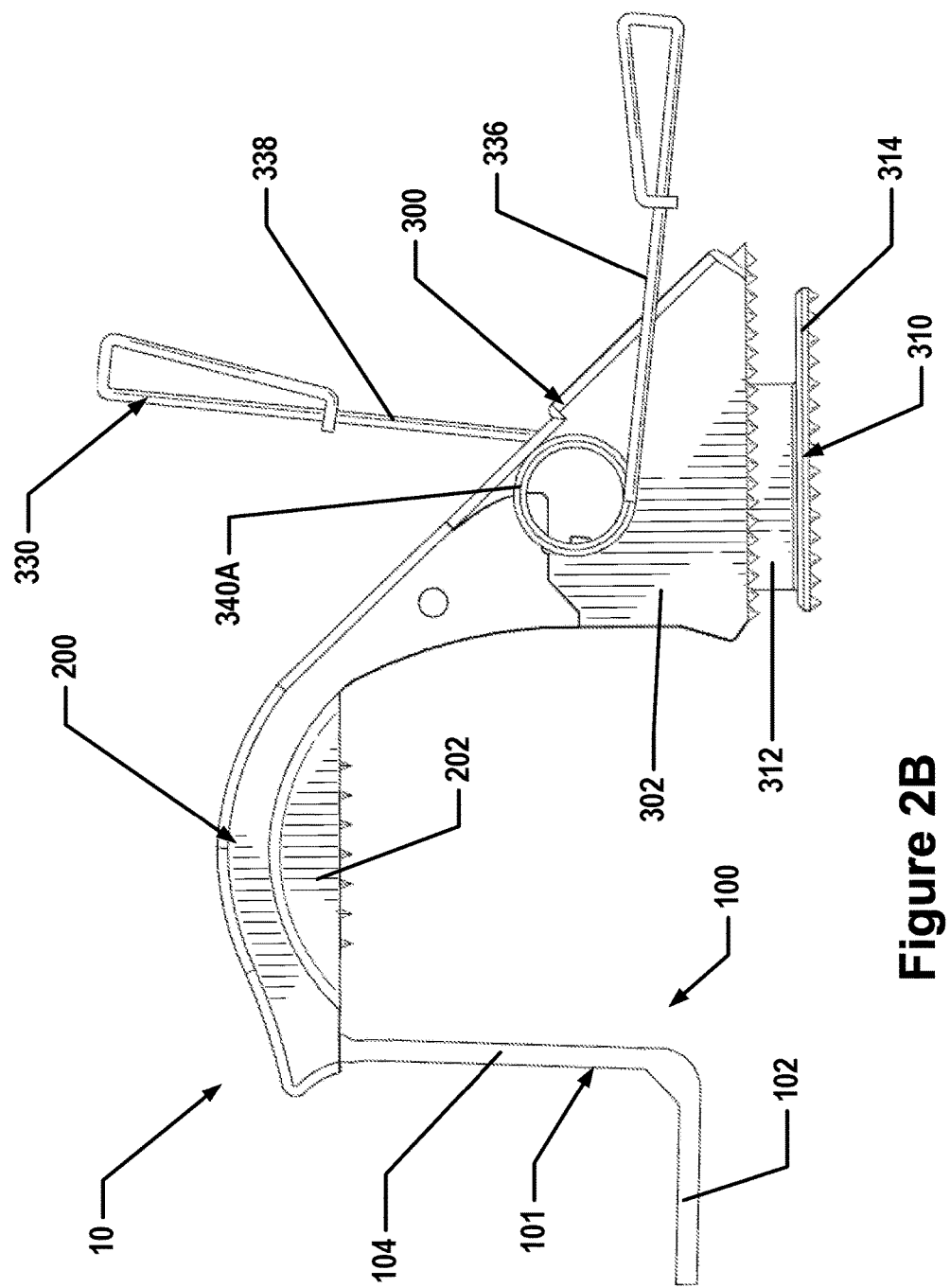
Figure 2C:
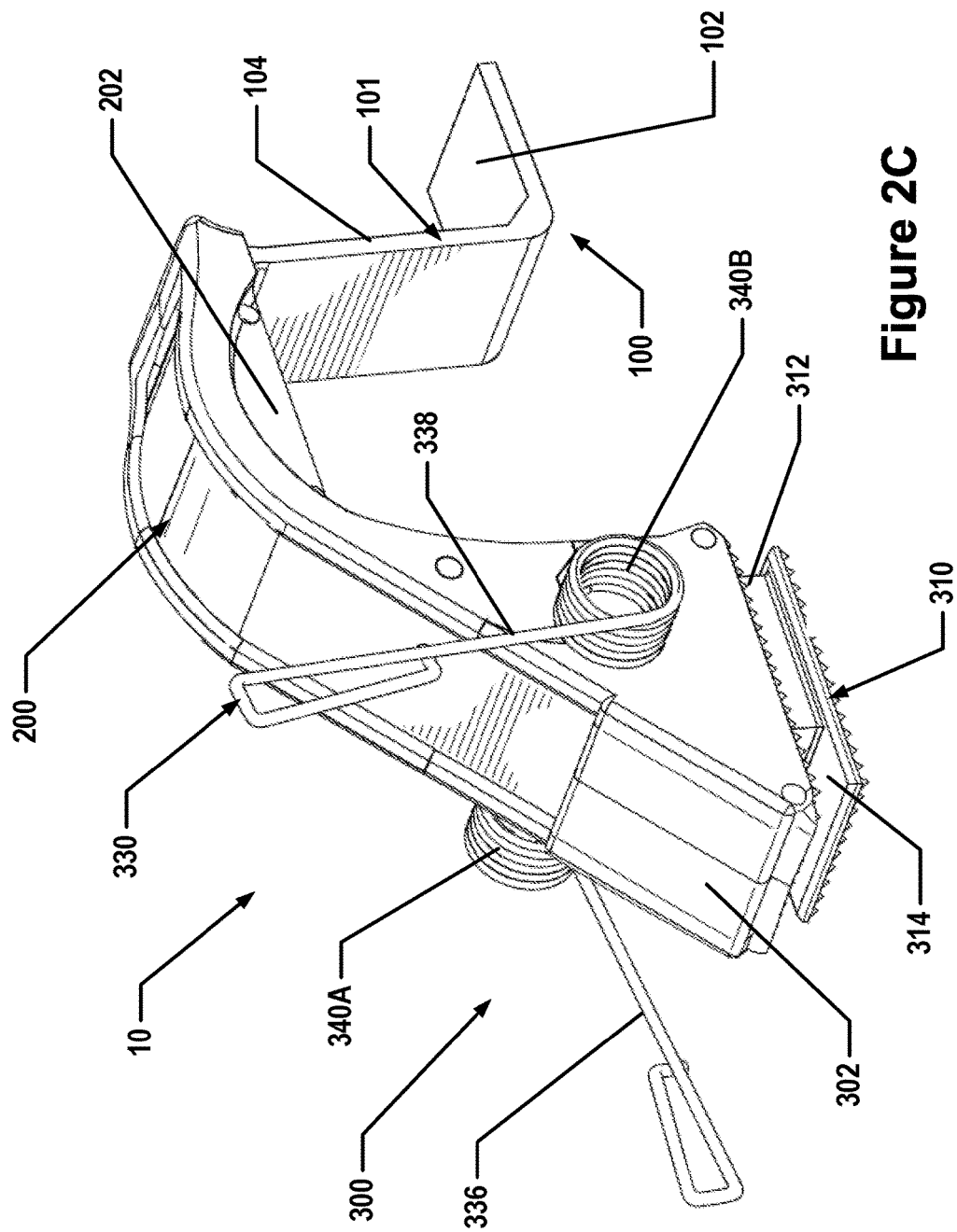
Figure 3:
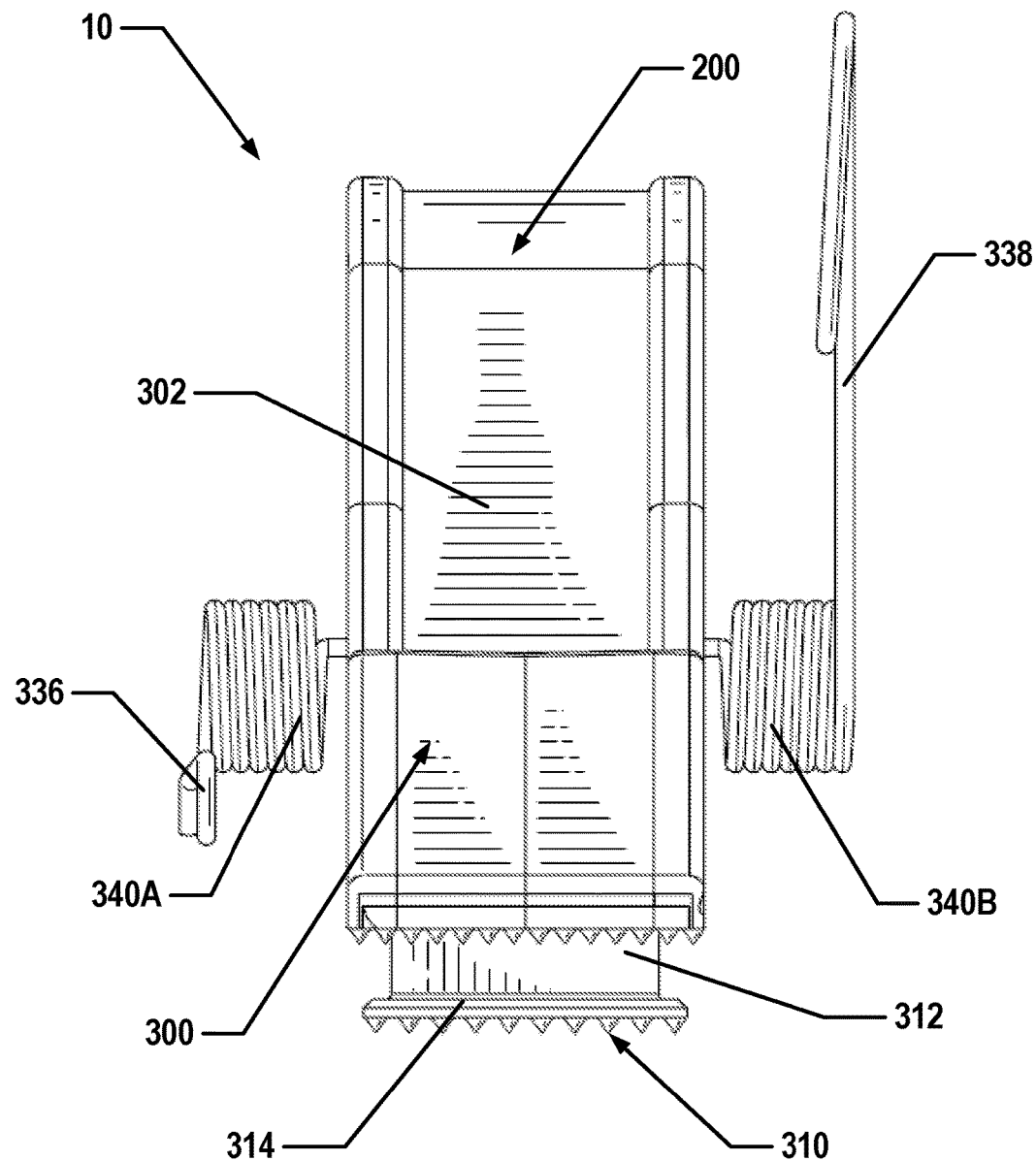
Figure 4:
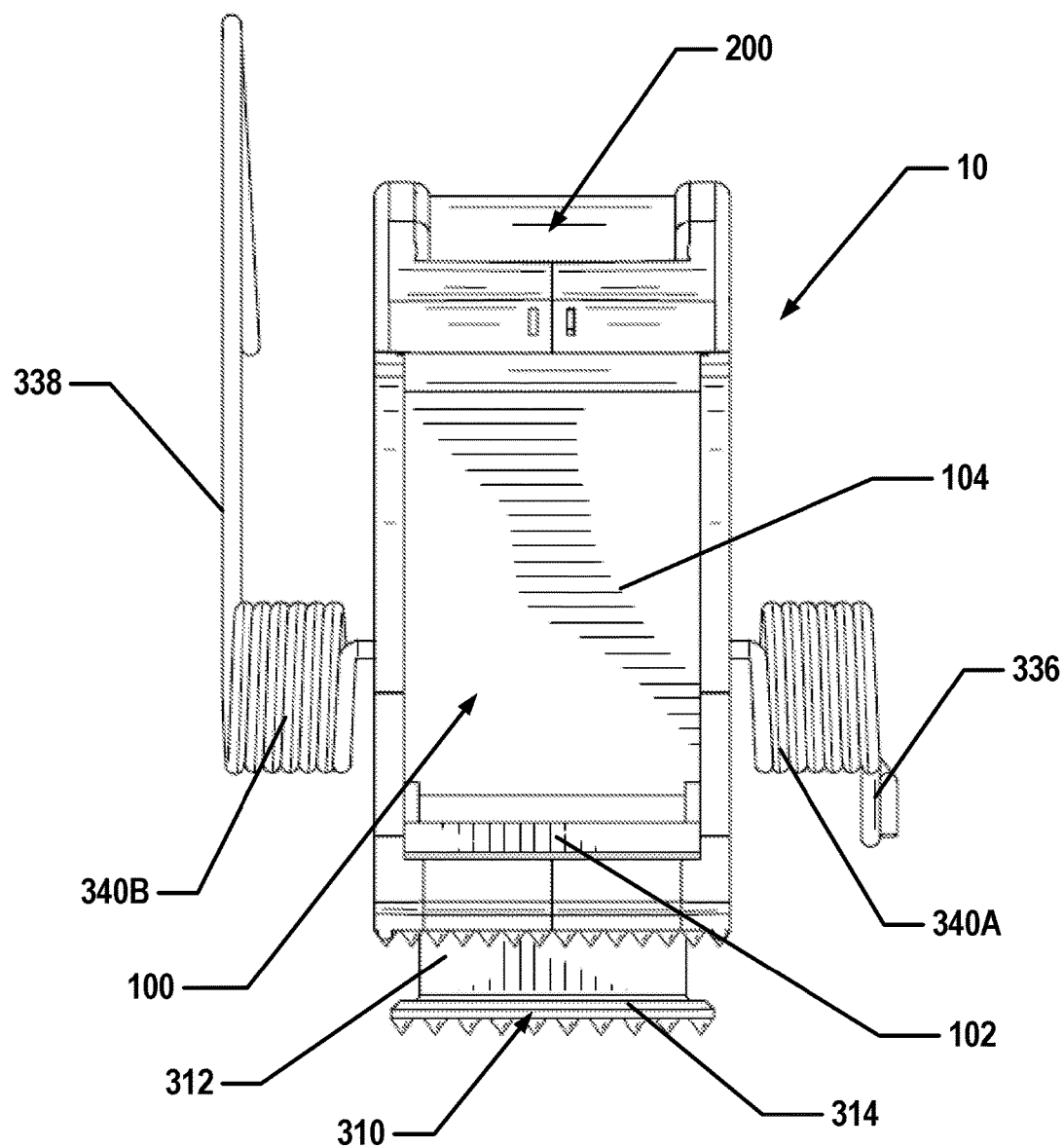
Figure 5:
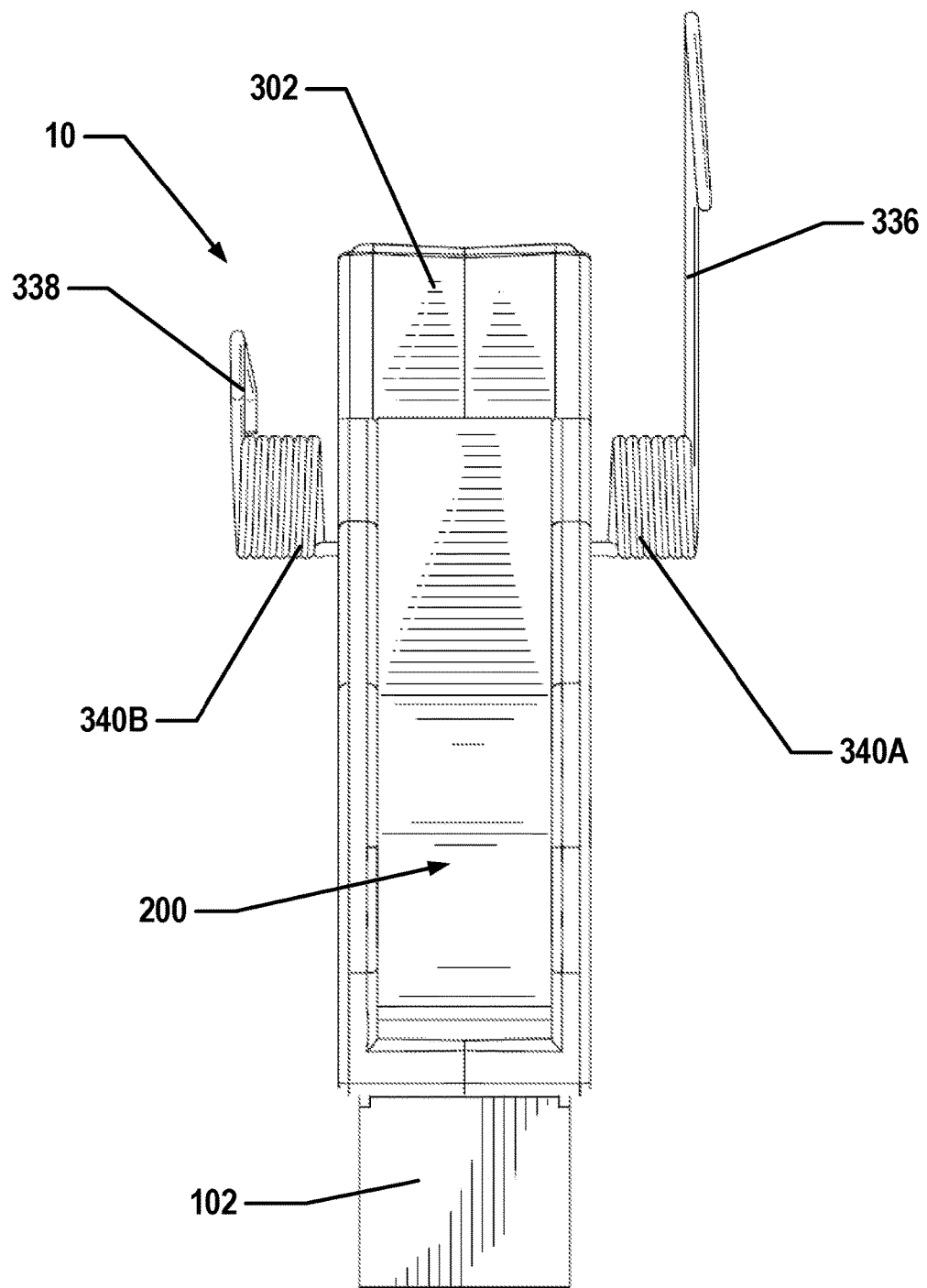
Figure 6:
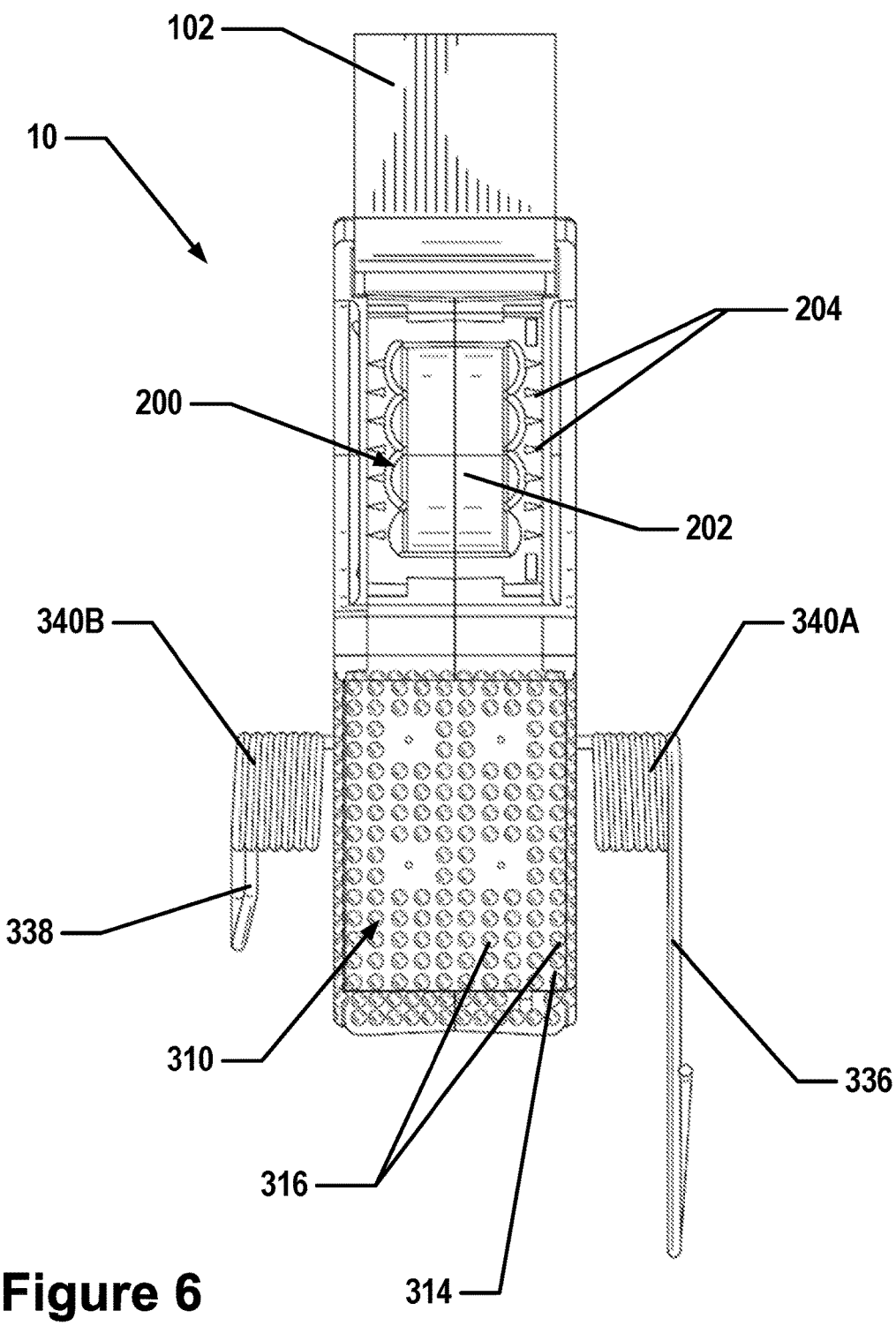
Figure 7A:
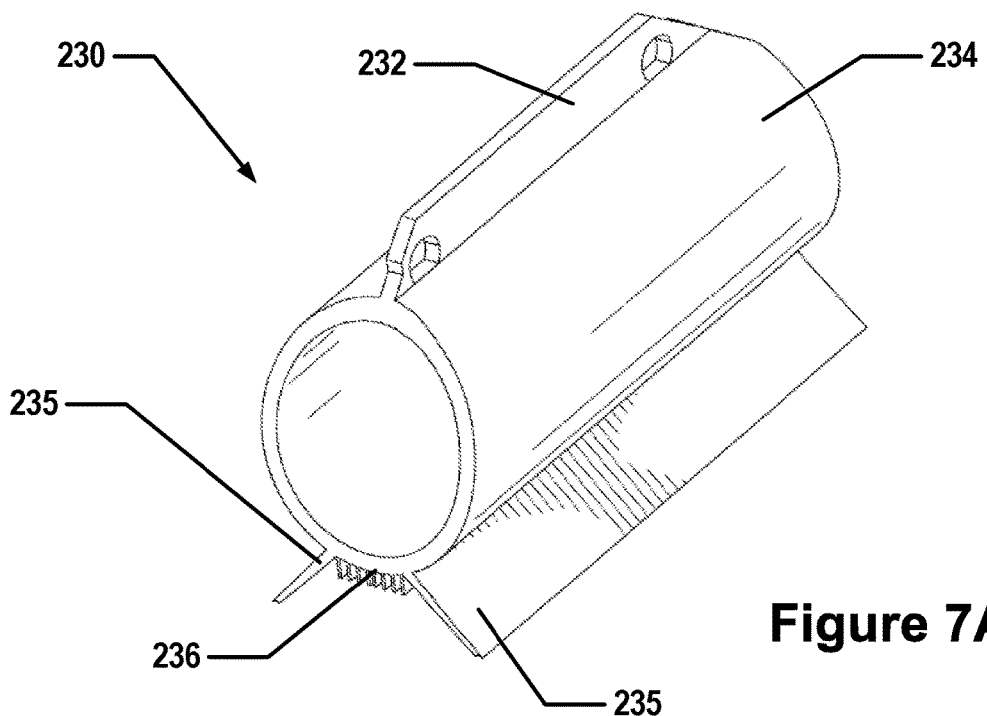
FIGS. 7A through 7D illustrate an embodiment of a component of an embodiment of a goal securement device.
Figure 7B:
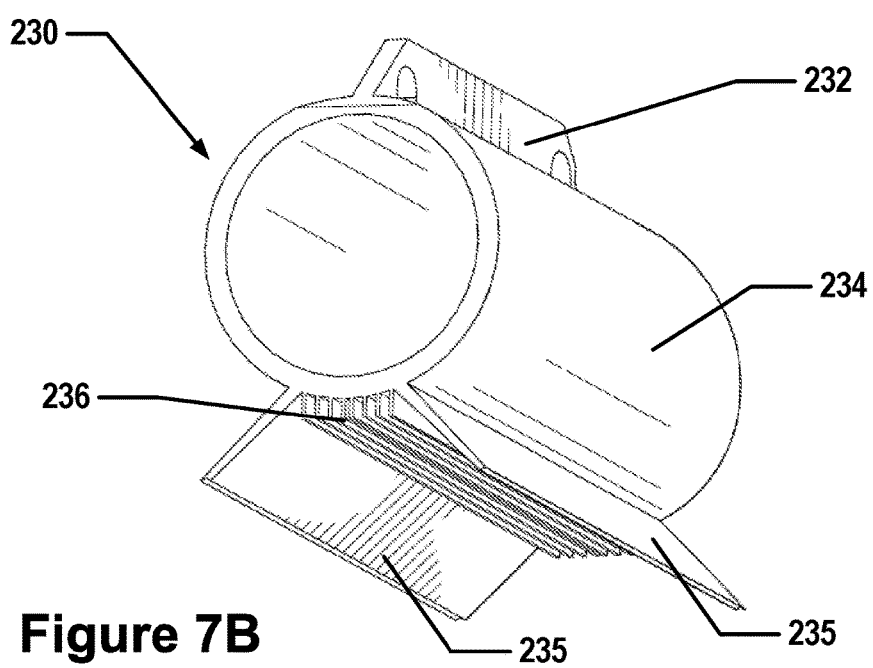
Figure 7C:
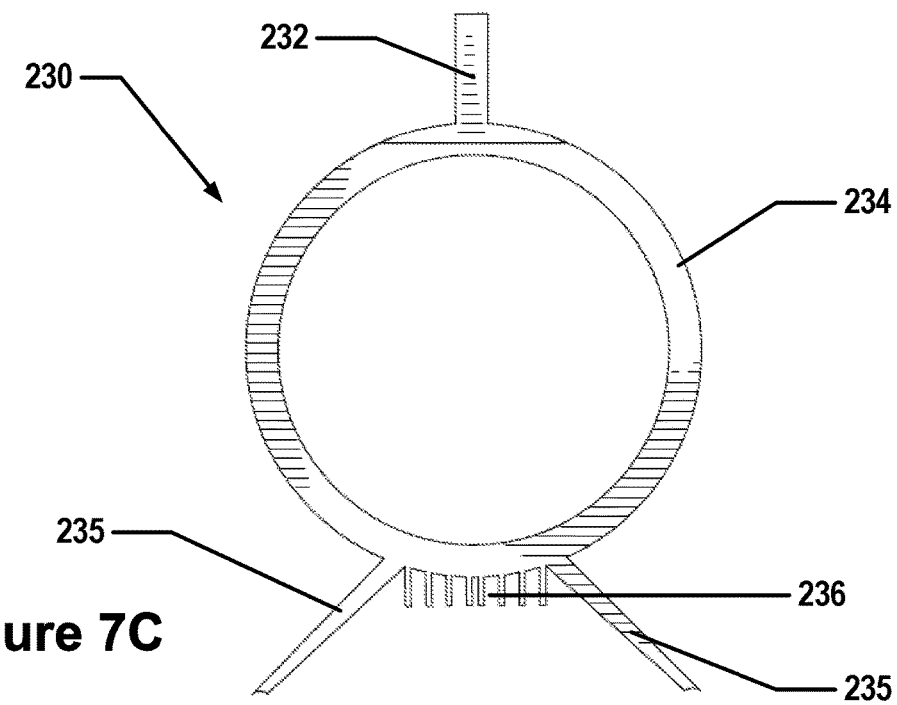
Figure 7D:
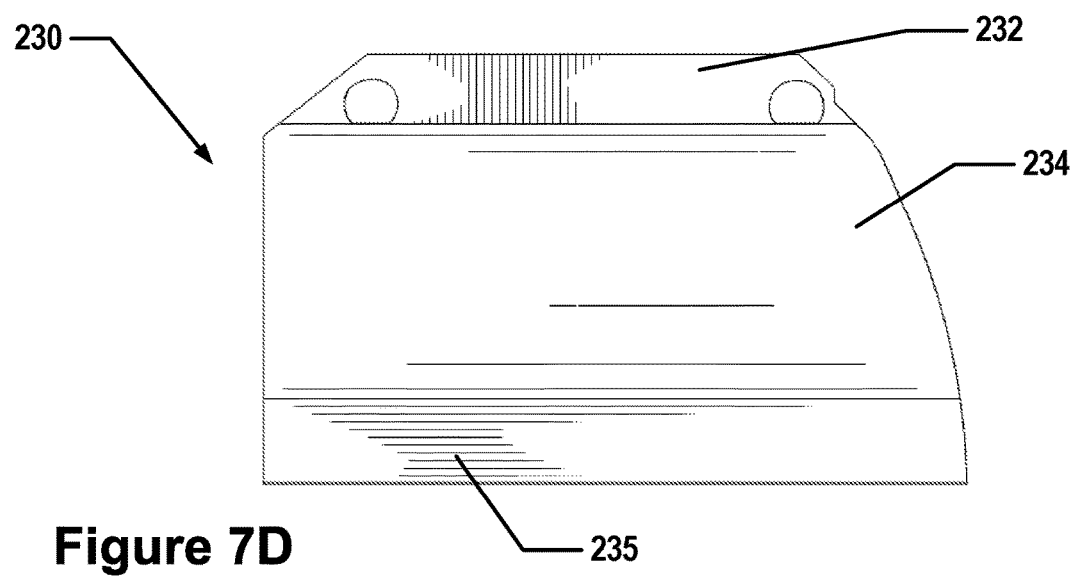
Figure 8A:
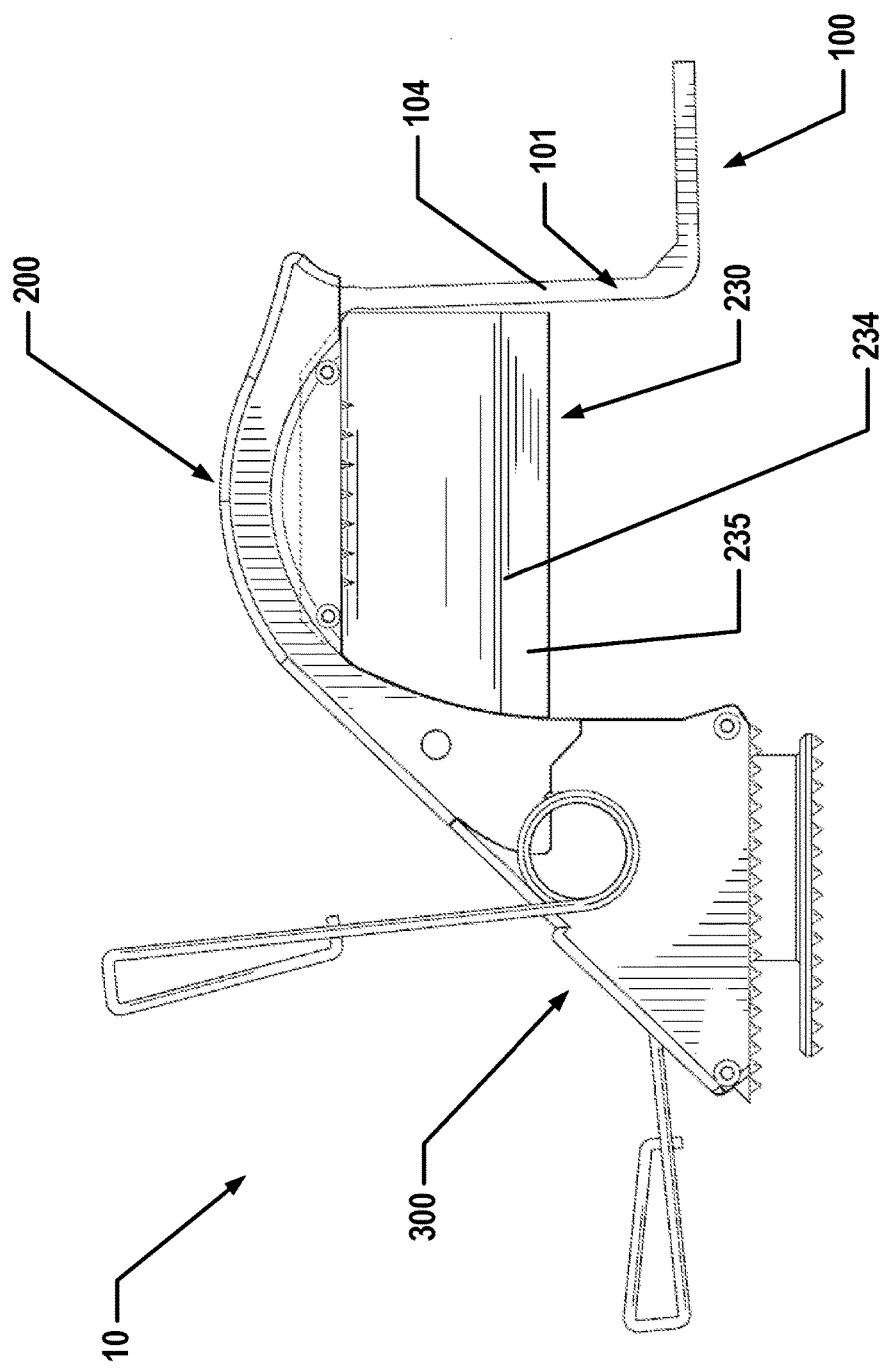
FIGS. 8A and 8B illustrate an embodiment of a goal securement device.
Figure 8B:
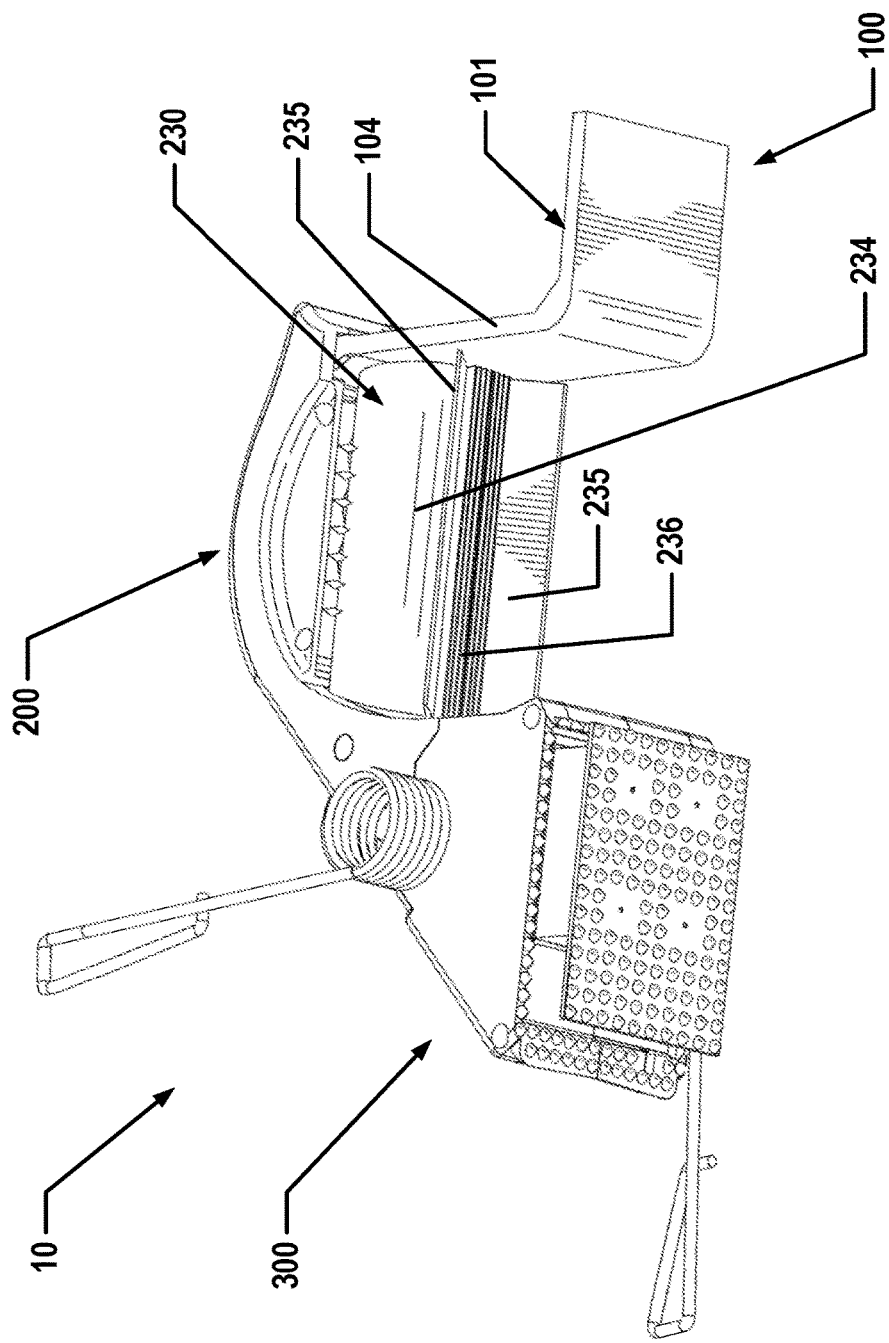

In an embodiment, a portion of the securement member 101 is integrated into the goal securement monitoring system 300. Referring to FIGS. 17A and 17B, in an embodiment, the pressure pad housing 302 can include grooves 319A, 319B defined therein. The edges of the distal end 105 of the securement member 101 can be inserted in the grooves in tongue and groove fashion to join the pressure pad housing and the distal end 105. Referring to FIGS. 18A1 and 18A2, in an embodiment, the distal end 105 of the securement member 101 is shown integrated into the pressure pad housing 302. In such an arrangement, the distal end 105 can apply downward pressure on the pressure pad housing 302 when the securement member 101 is secured to the ground, and thereby maintain the pressure pad base in the set position. If the securement member 101 becomes unsecured and the downward pressure on the pressure pad housing 302 is relieved, the biasing element 318 biases the pressure pad base 312 to extend out of the pressure pad housing 302 toward the extended position. The securement member can become unsecured by, for example, if the goal is tipped forward enough to dislodge the device from sound engagement with the ground.

Figure 15A:
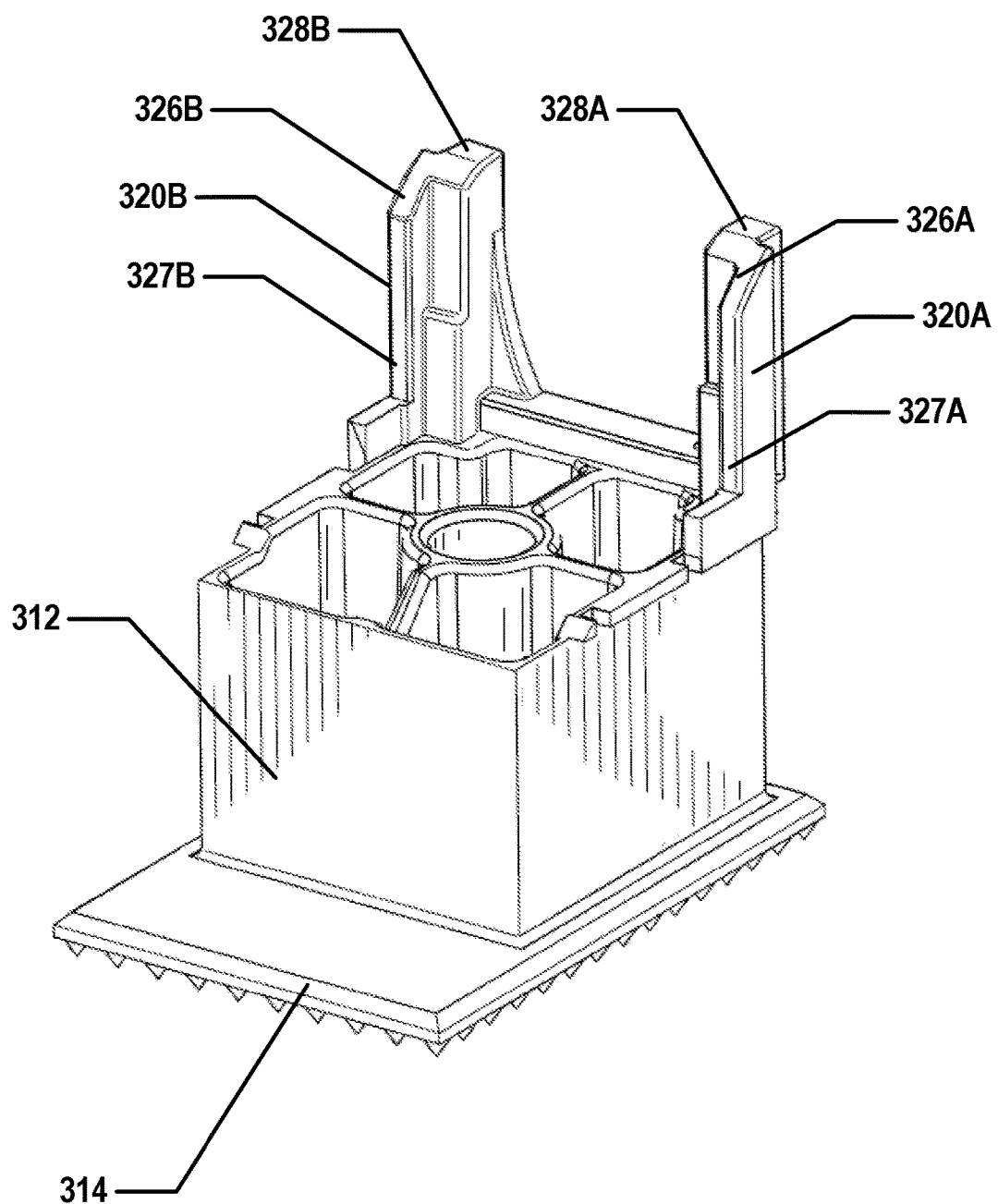
Figure 15B:
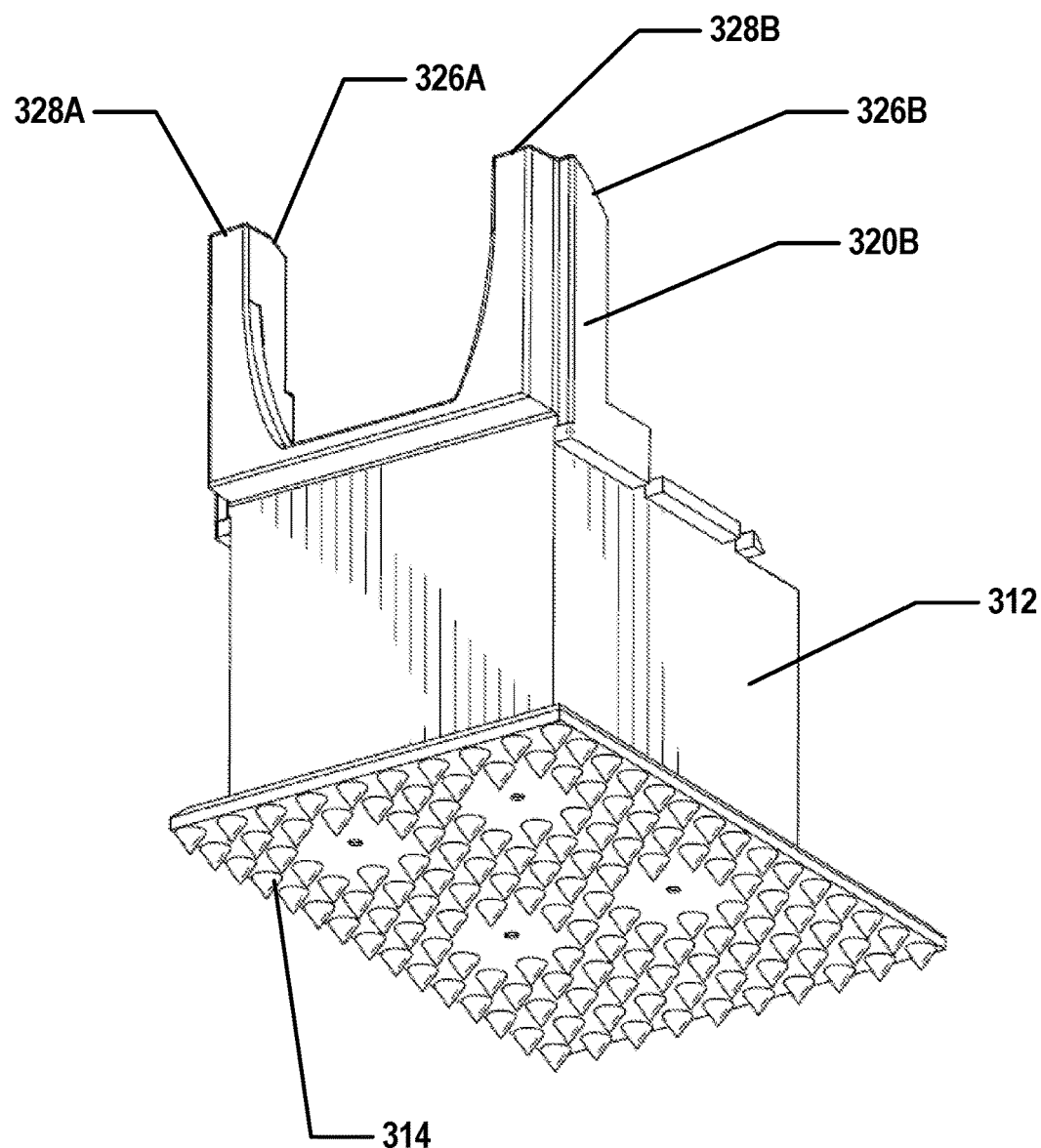
Figure 16A:
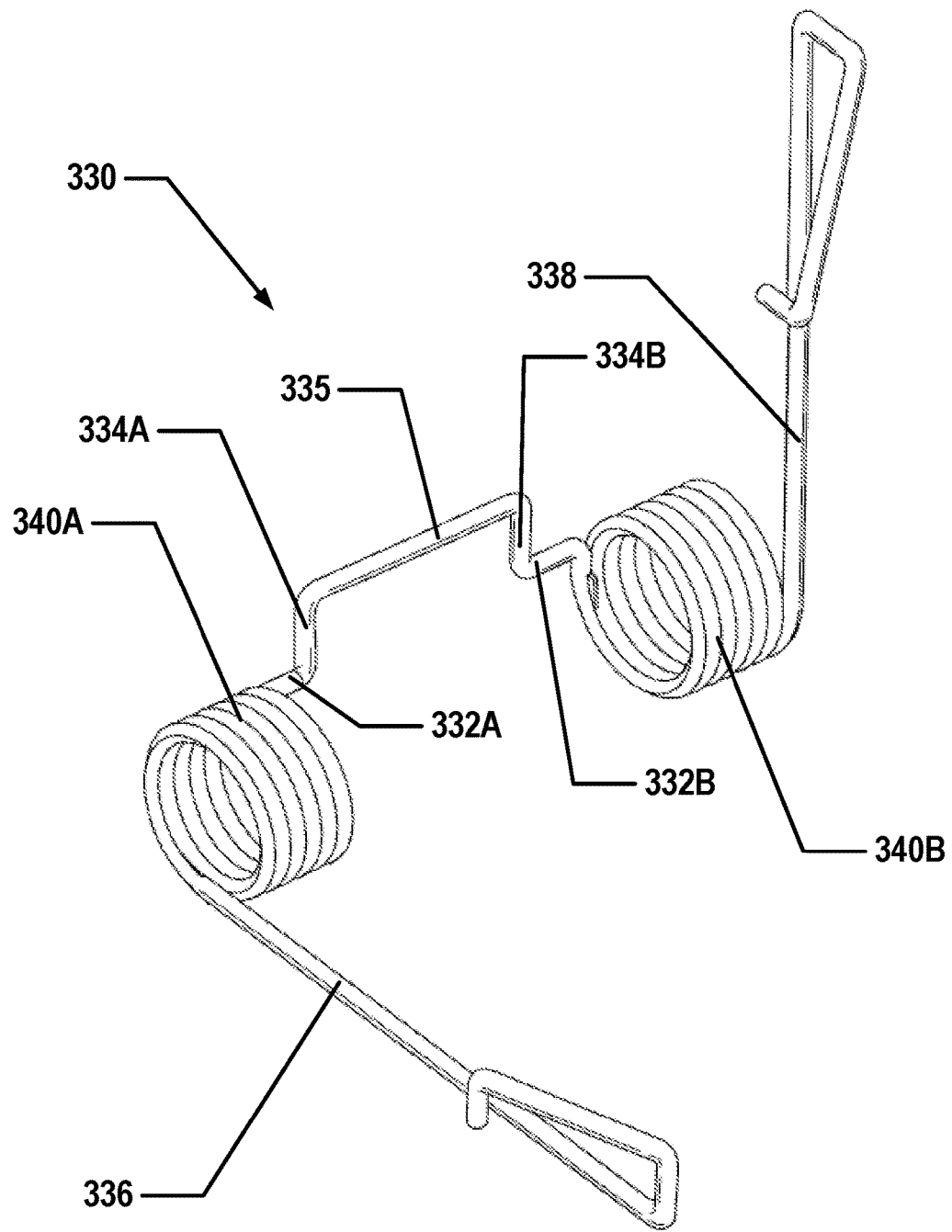
Figure 16B:
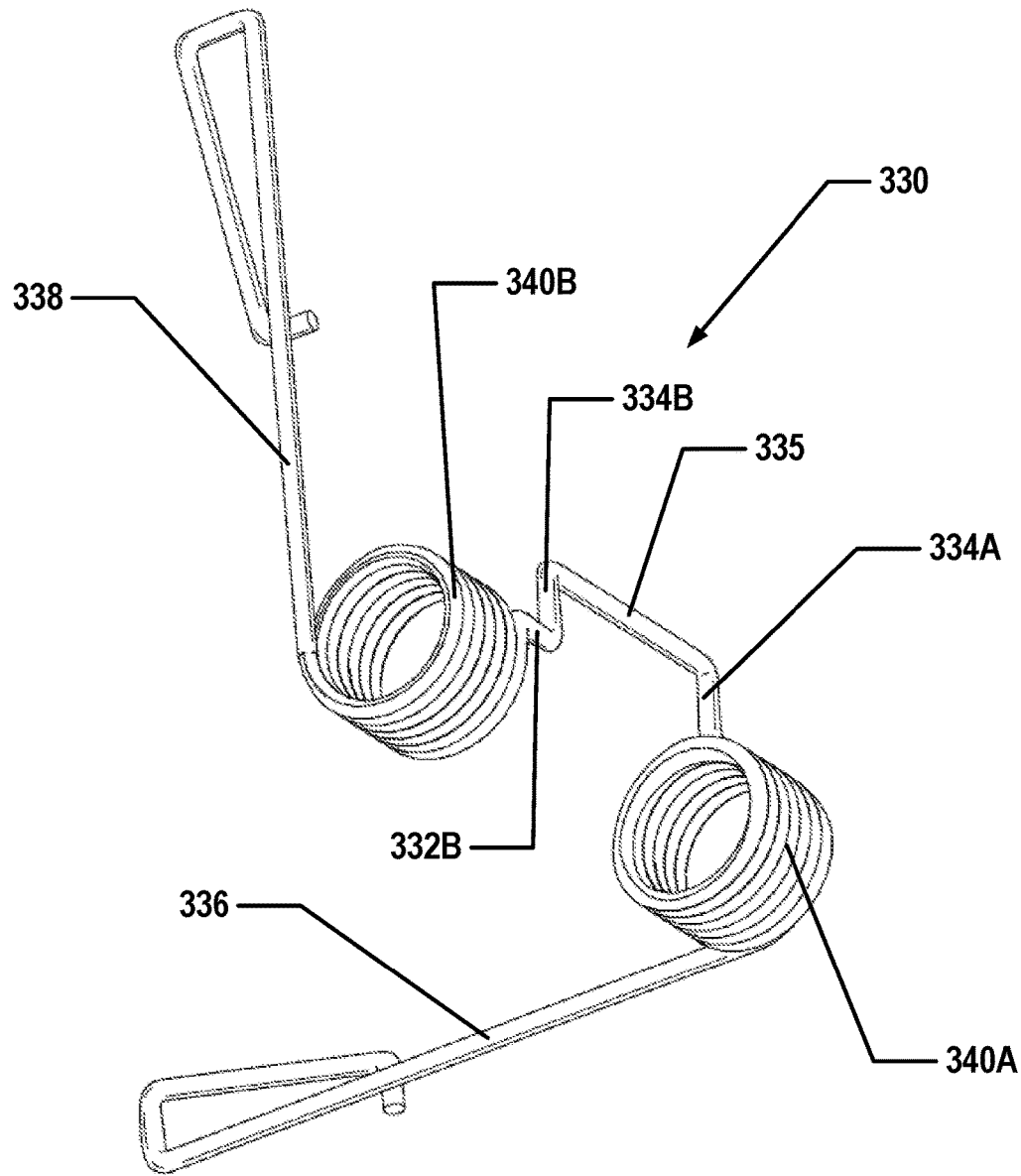

In an embodiment, the goal securement monitoring system 300 includes an indicator assembly to indicate whether the ground bar has maintained or lost securement with the ground. In an embodiment, an indicator assembly 330 is integrated with the pressure pad assembly 310. In an embodiment, an indicator assembly 330 includes an indicator arm system 330. Referring to FIGS. 16A and 16B, in an embodiment, an indicator arm system 330 includes a first indicator arm 336 and a second indicator arm 338. The first and second indicator arms 336, 338 can include indicator arm axels 332A, 332B, indicator arm coils 340A, 340B, and indicator arm lever beams 334A, 334B. The first and second indicator arms 336, 338 can be connected by an indicator arm lever bar 335. The first indicator arm 336 can be arranged substantially perpendicular to the second indicator arm 338. Referring to FIGS. 15A, 15B, and 17A, in an embodiment, the pressure pad base 312 includes aspects of an indicator assembly 330, including vertical posts 320A and 320B. Each vertical post includes a distal top edge 328A, 328B and distal sloped edge 326A, 326B. Referring to FIGS. 17A and 17B, in an embodiment, the pressure pad housing 320 includes an indicator arm biasing element 324 configured to bias the indicator arm system by biasing the indicator arm lever bar 335 within an indicator arm lever channel 339.

Referring to FIGS. 19A1 through 19E2, an example of indicator movement coinciding with movement of the pressure pad assembly 310 from an extended position to a set position is shown. In FIG. 19A1, the pressure pad base 312 is extended from the pressure pad housing 302 and is in the extended position. The extended position is indicative of lack of securement of the goal securement device to the ground. In the extended position, the first indicator arm 336 is upright and the second indicator arm 338 (not shown), being perpendicular to the first indicator arm 336, is horizontal and less visible to persons in the field of play. In the extended position, the first indicator arm 336, being upright and more visible to persons in the field of play, can include an indication, such as a red flag or stop sign, to indicate that goal securement device is not adequately secured to the ground. In an embodiment, the indicator arm biasing element 324 biases the indicator arm system 330 toward the position shown in FIGS. 19A1 and 19A2. Referring to FIG. 19A2, the indicator arm lever beams 334A, 334B and indicator arm lever bar 335 are perpendicular to the first indicator arm 336. The distal top edges 328A, 328B are in contact with the indicator arm lever bar 335. Referring to FIGS. 19B1 and 19B2, as pressure is exerted to secure the device to the ground, the pressure pad base 312 begins to slide into the pressure pad housing 302. Such movement causes the pressure pad posts 320A, 320B to move upward relative to the housing, which causes contact between the pressure pad posts 320A, 320B and the indicator arms to transition from the distal top edges 326A, 326B and the indicator arm lever bar 335 to the distal sloped edges 326A, 326B and the indicator arm lever beams 334A, 334B, and causes the indicator arms 336, 338 to begin to rotate about the indicator arm axels 332A, 332B. Continued movement of the pressure pad base 312 into the pressure pad housing 302 causes continued rotation of the indicator arms, as shown in FIGS. 19C2 through 19D2. Referring to FIGS. 19E1 and 19E2, when the pressure pad base 312 reaches the set position, the indicator arms have completed their rotation to where the first indicator arm 336 is horizontal and the second indicator arm 338 is upright (not shown). The indicator arms are prevented from rotating by contact between the indicator arm lever beams 334A, 334B and the planar edges 327A, 327B of the pressure pad posts 320A, 320B. The set position is indicative of securement of the goal securement device, and therefore the goal, to the ground. The second indicator arm 338 (not shown) can include an indication, such as a green flag or safe-to-play sign, to indicate that the goal securement device and the goal are adequately secured to the ground.

Referring to FIGS. 18A1 through 18E2, an example of indicator arm movement coinciding with movement of the pressure pad assembly 310 from a set position to an extended position is shown. In FIG. 18A1, the pressure pad base 312 is pressed fully into the pressure pad housing 302 and is in the set position. The set position is indicative of securement of the goal securement device to the ground. In the set position, the second indicator arm is upright (not shown) and the first indicator arm is horizontal. In the set position, the second indicator arm 338, being upright and more visible to persons in the field of play, can include an indication, such as a green flag or safe-to-play sign, to indicate that the goal securement device and the goal are adequately secured to the ground. In an embodiment, the indicator arm biasing element 324 biases the indicator arm system 330 toward the position shown in FIGS. 18E1 and 18E2. However, when in the set position, contact between the indicator arm lever beams 334A, 334B and the planar edges 327A, 327B of the pressure pad posts 320A, 320B prevents rotation of the indicator arm system from the position shown in FIGS. 18A1 and 18A2 to the position shown in FIGS. 18E1 and 18E2. Referring to FIGS. 18B1 and 18B2, as pressure is released from the engagement between the goal securement device and the ground or as the goal securement device is separated from contact with the ground, the pressure pad base 312 begins to extend from the pressure pad housing 302. Such movement causes the pressure pad posts 320A, 320B to move downward relative to the housing, but contact is maintained between the planar edges 327A, 327B of the pressure pad posts 320A, 320B and the indicator arm lever beams 334A, 334B so rotation of the indicator arms about the indicator arm axels 332A, 332B is prevented. Such feature prevents minor upsets of the goal securement device to lead to false indications of lack of securement. Referring to FIGS. 18C1 through 18D2, as further pressure is released, the pressure pad base 312 continues to extend from the pressure pad housing 302 and contact between the indicator arms and pressure pad posts 320A, 320B transitions from the indicator arm lever beams 334A, 334B and planar edges 327A, 327B to the indicator arm lever beams 334A, 334B and the distal sloped edges 326A, 327B, which thereby allows the indicator arms to rotate about the indicator arm axels 332A, 334B. Referring to FIGS. 18E1 and 18E2, when the pressure pad base 312 reaches the extended position, the indicator arms have completed their rotation to where the first indicator arm 336 is upright and the second indicator arm 338 is horizontal (not shown). In the extended position, the indicator arms are prevented from rotating back to the position shown in FIGS. 18A1 and 18A2 by the indicator arm biasing element 324. The extended position is indicative of lack of securement of the goal securement device to the ground. In the extended position, the first indicator arm 336, being upright and more visible to persons in the field of play, can include an indication, such as a red flag or stop sign, to indicate that goal securement device is not adequately secured to the ground.

Figure 20:
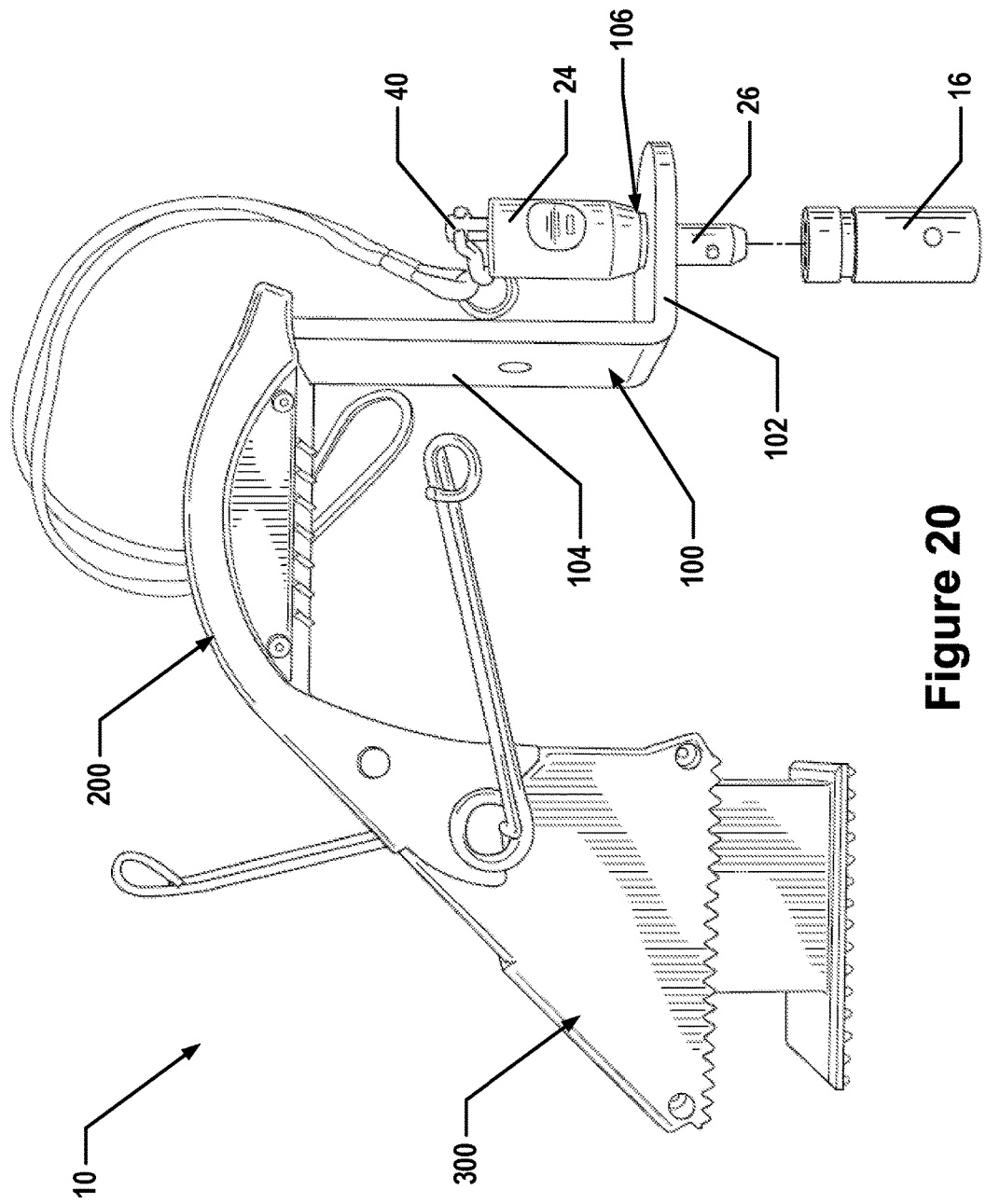
FIGS. 20 and 21 illustrate embodiments of a goal securement device.
Figure 21:
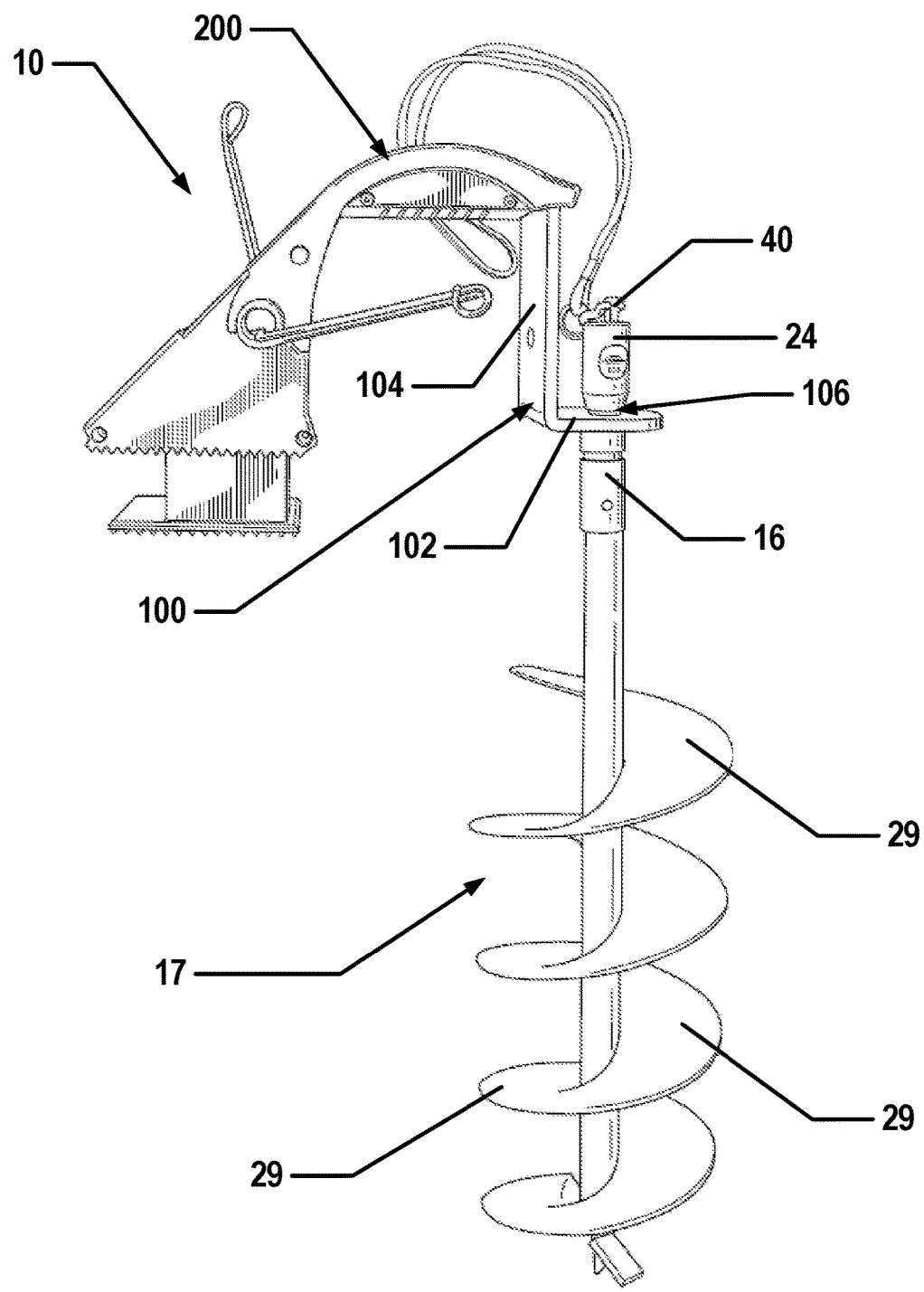

In an embodiment, the securement member 101 is secured to the ground with a ground engagement system 40. A ground engagement system 40 can utilize various methods and systems to engage the ground, included stakes, augers, anchors, and the like. Referring to FIGS. 20 and 21, an example embodiment of a ground engagement system 40 is disclosed, which includes an auger 17 having auger blades 29, a lock pin 26, lock pin housing 24, and a lock pin receiver 16 attached to a proximate end of the auger 17. Such system engages the ground by driving the auger into the ground until the lock pin receiver opening 44 is about flush with the ground. The securement member 101 is secured to the ground by inserting the lock pin 26 through an aperture 106 defined in the ground base member 102 of the securement member 101 and then inserting the lock pin 26 into the lock pin receiver 16 until the pin is received into a pin groove 48 of desired depth. The pin can then be locked in place with a lock pin key 40 so that the securement member 101 cannot be detached from the ground engagement system 40. In an embodiment the lock pin 26 can be unlocked only when active pressure is applied to the lock pin key 40; if the lock pin key 40 is passive and without pressure being applied to it, the lock pin key 40 cannot unlock the lock pin 26. In an embodiment the pin groove 48 is below the level of the ground (underground) and the engagement between the lock pin 26 and the pin groove 48 is below grade (underground). Referring to FIG. 24, an embodiment of a lock pin receiver 16 having three pin grooves 48 at multiple depths from the receiver opening 44 is depicted. Such embodiment also depicts a driver coupling 42 of hexagon shape for driving the auger 17 into the ground and a receiver drainage hole 62.

Figure 25:
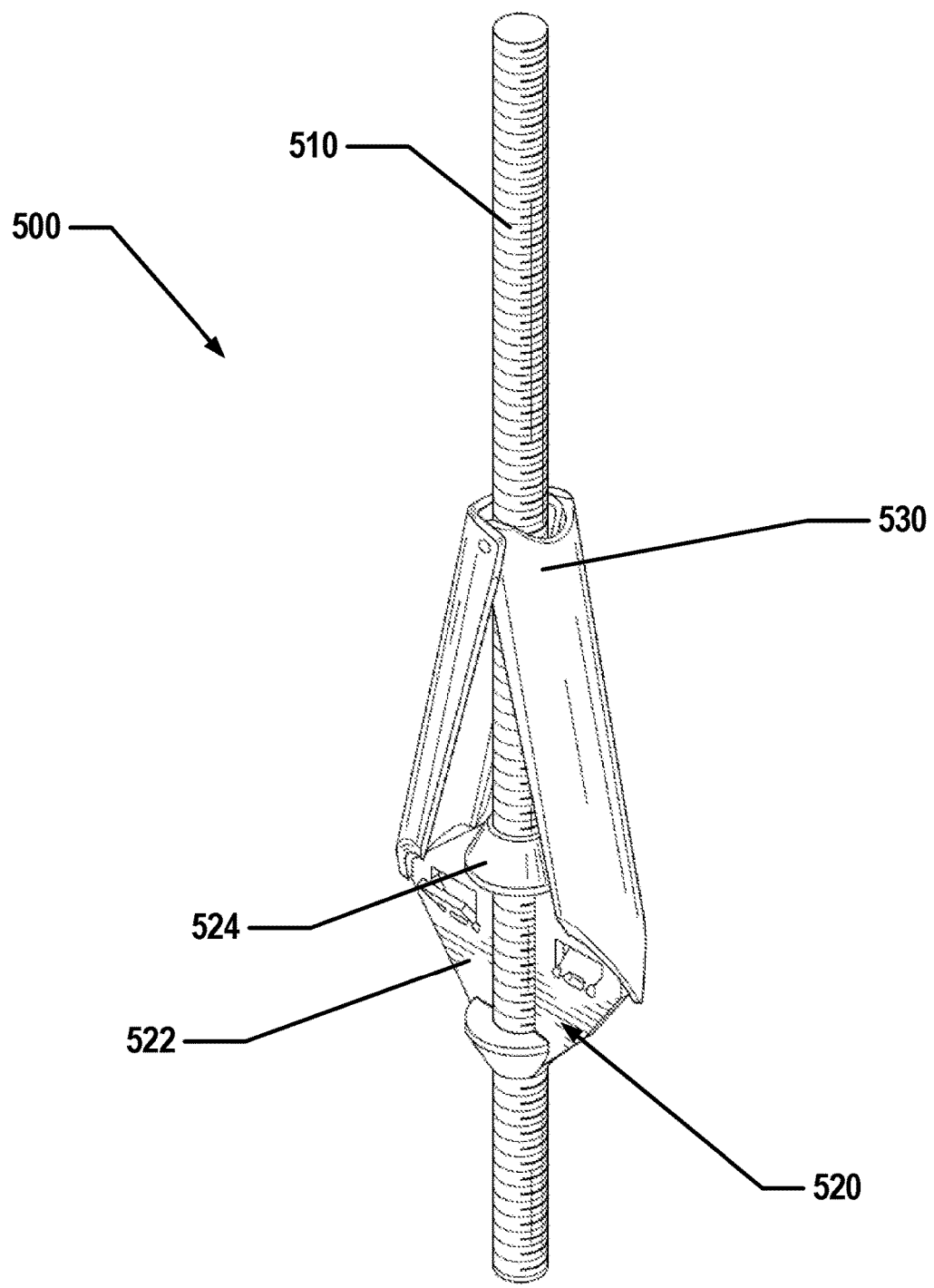
Figure 28A:
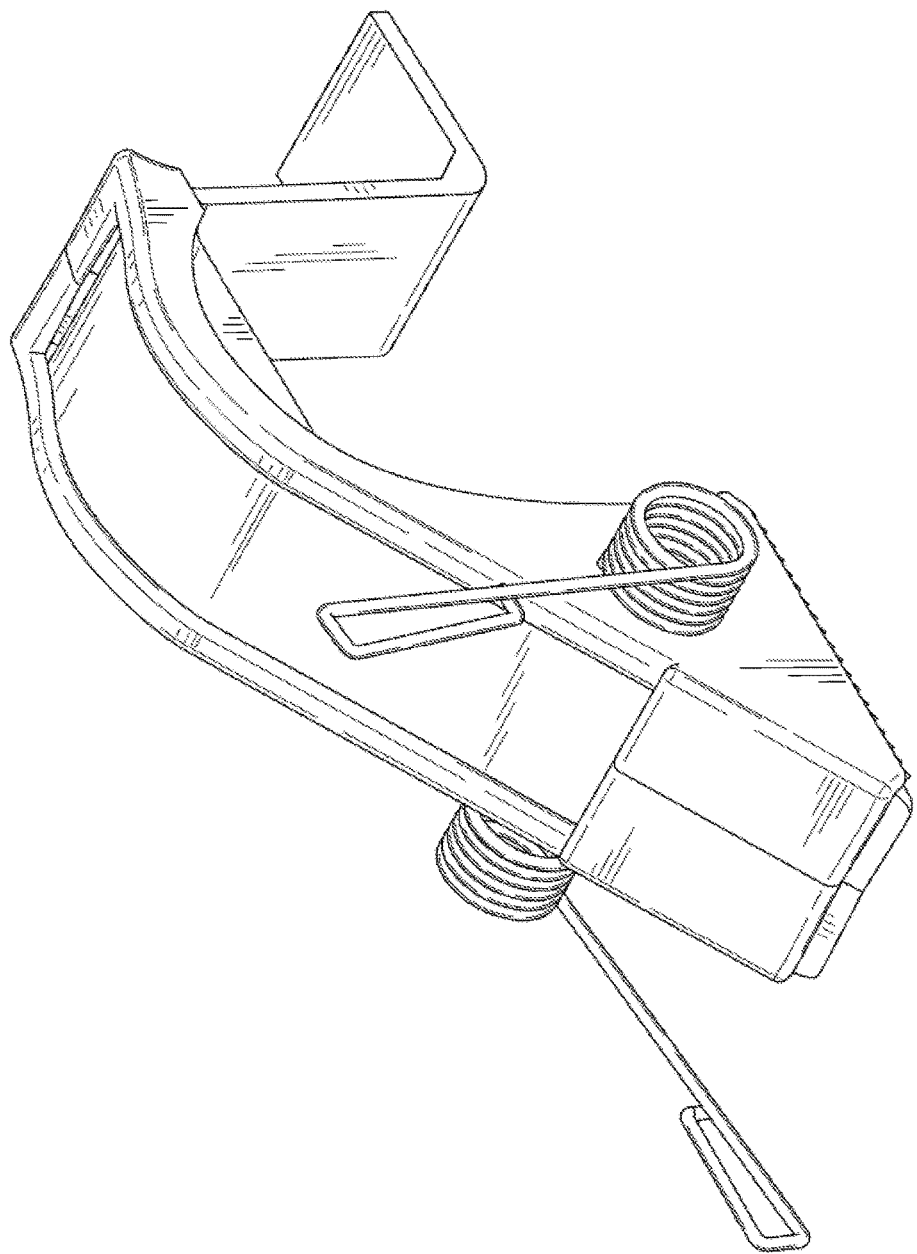
FIG. 28A is a top, front, right perspective view of an embodiment of a goal securement device.
Figure 28B:
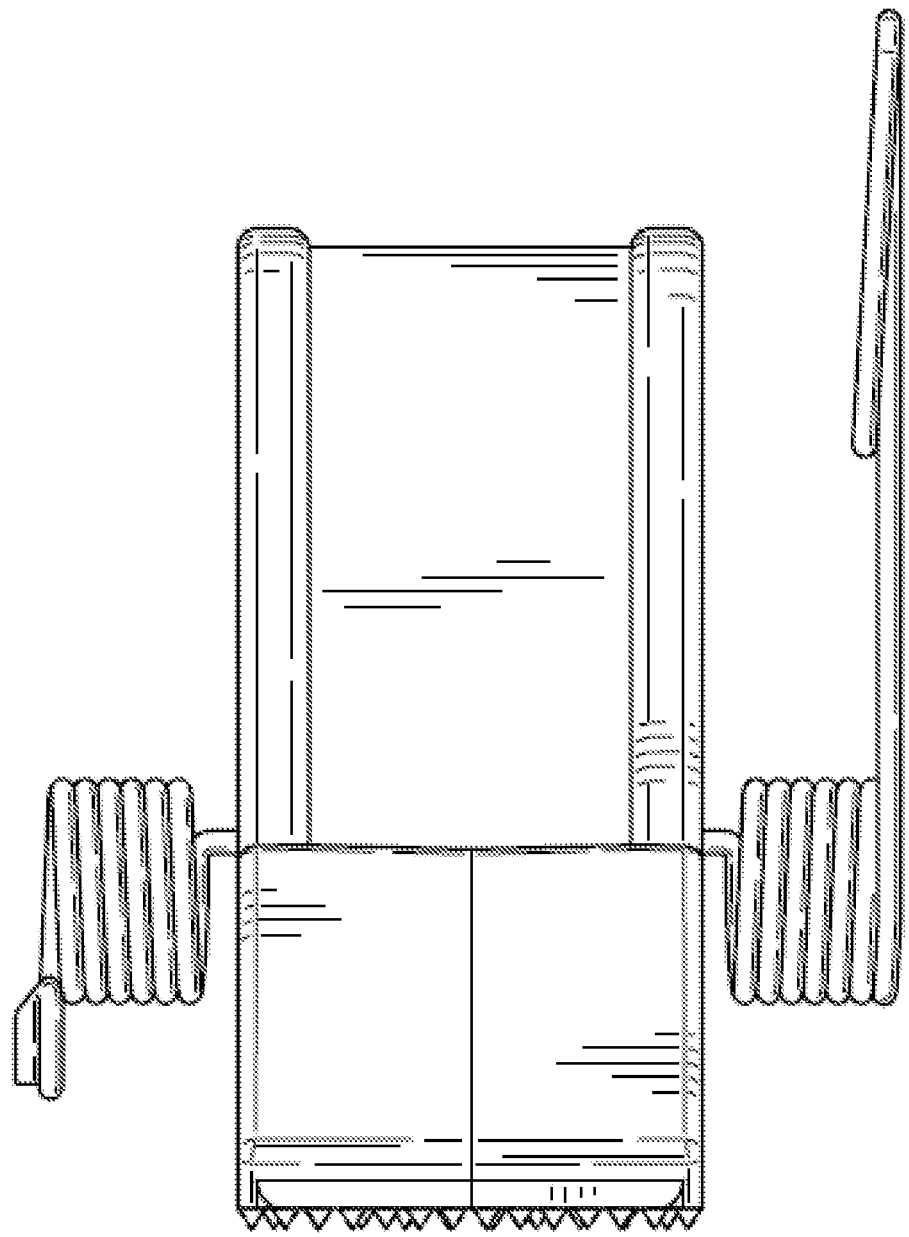
FIG. 28B is a front view of the device of FIG. 28A.
Figure 28C:
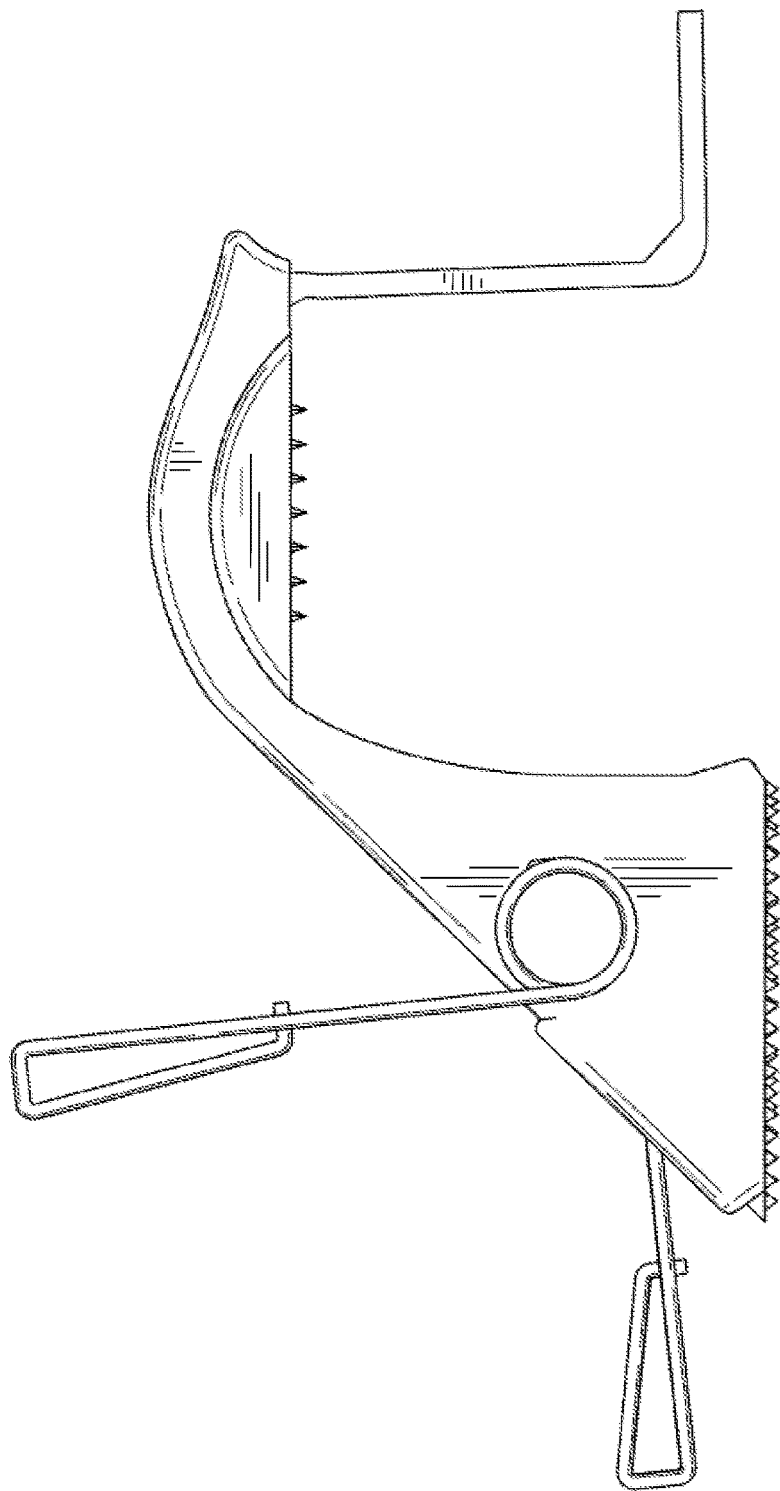
FIG. 28C is a right side view of the device of FIG. 28A.
Figure 28D:
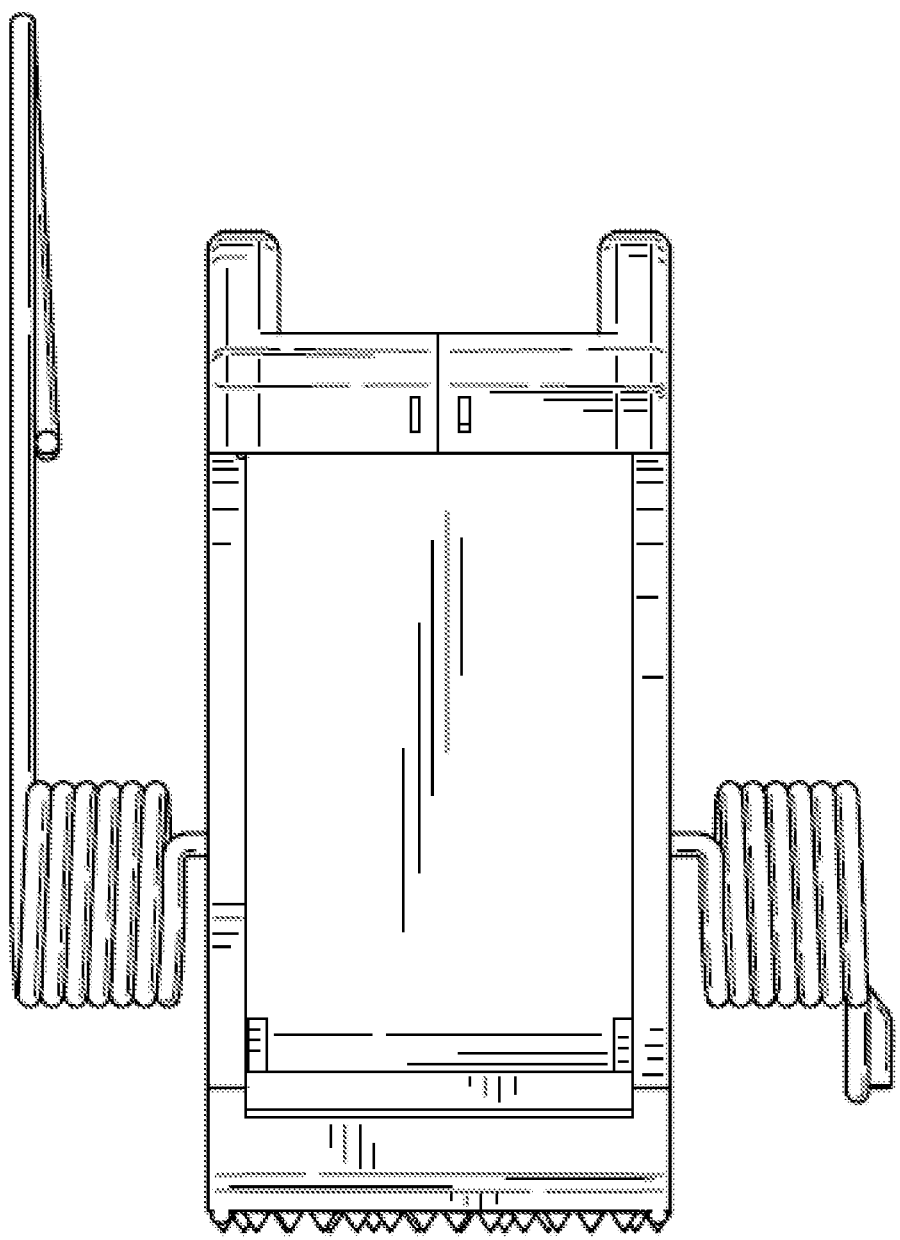
FIG. 28D is a rear view of the device of FIG. 28A.
Figure 28E:
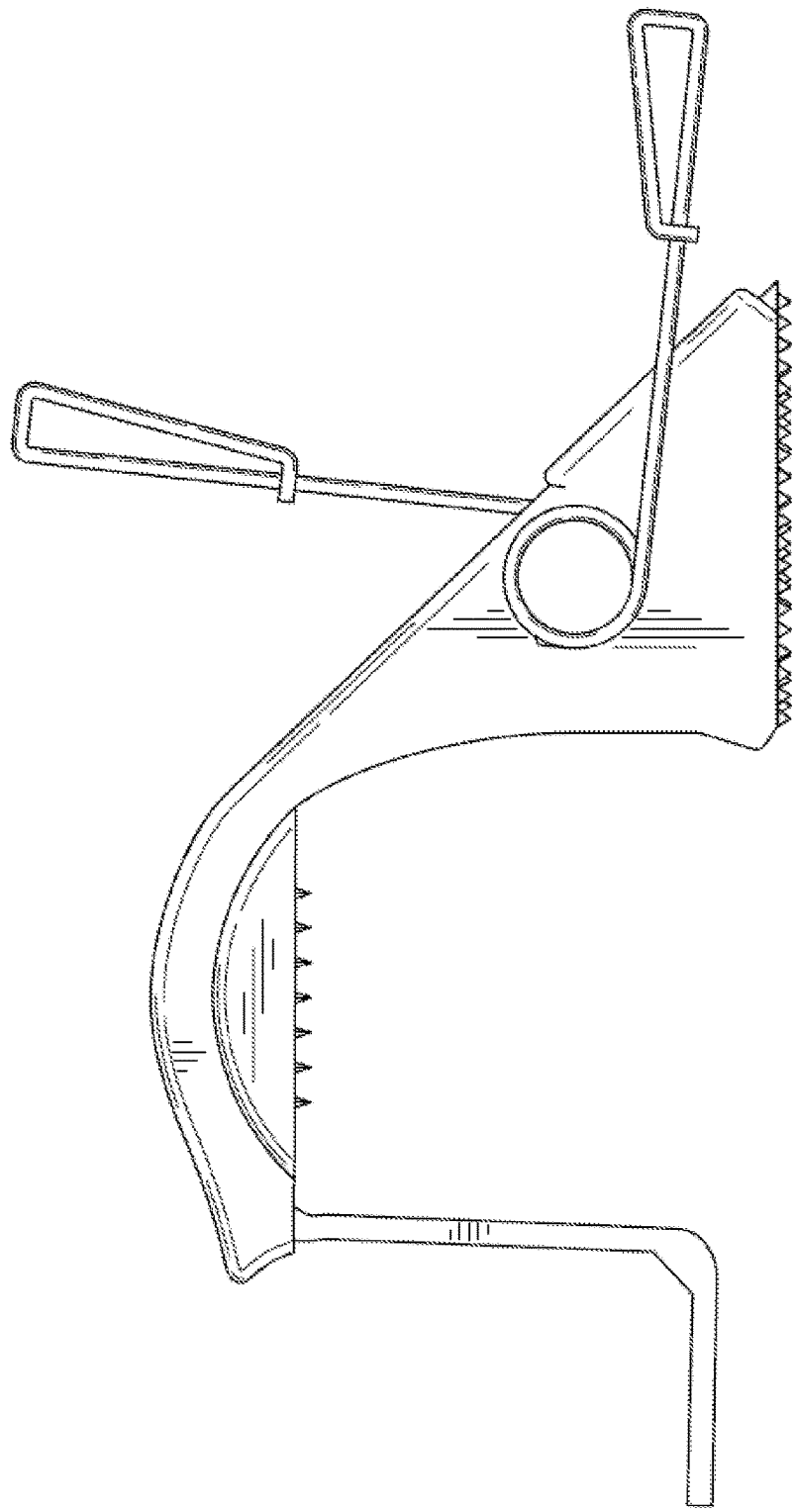
FIG. 28E is a left side view of the device of FIG. 28A.
Figure 28F:
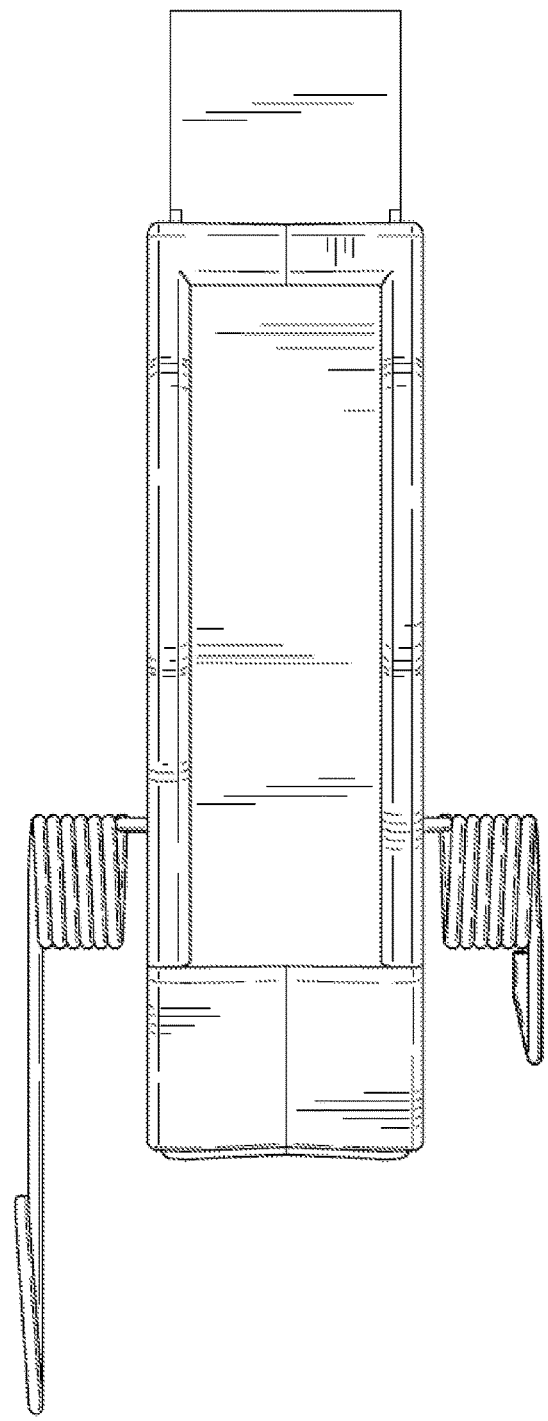
FIG. 28F is a top view of the device of FIG. 28A.
Figure 28G:
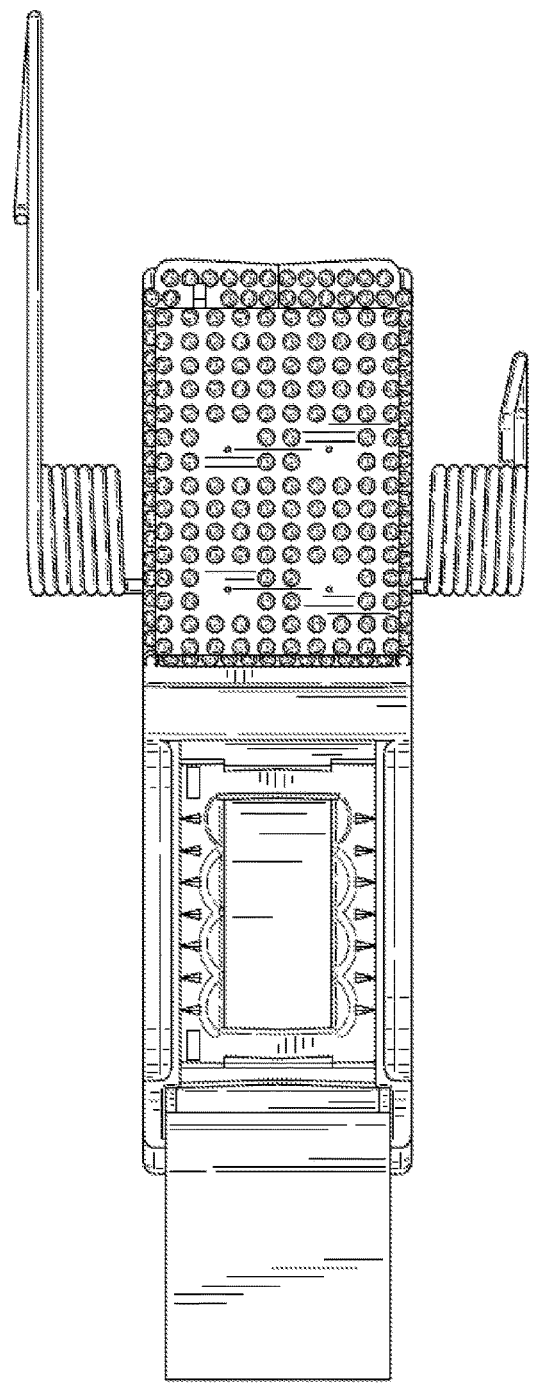
FIG. 28G is a bottom view of the device of FIG. 28A.
Figure 28H:
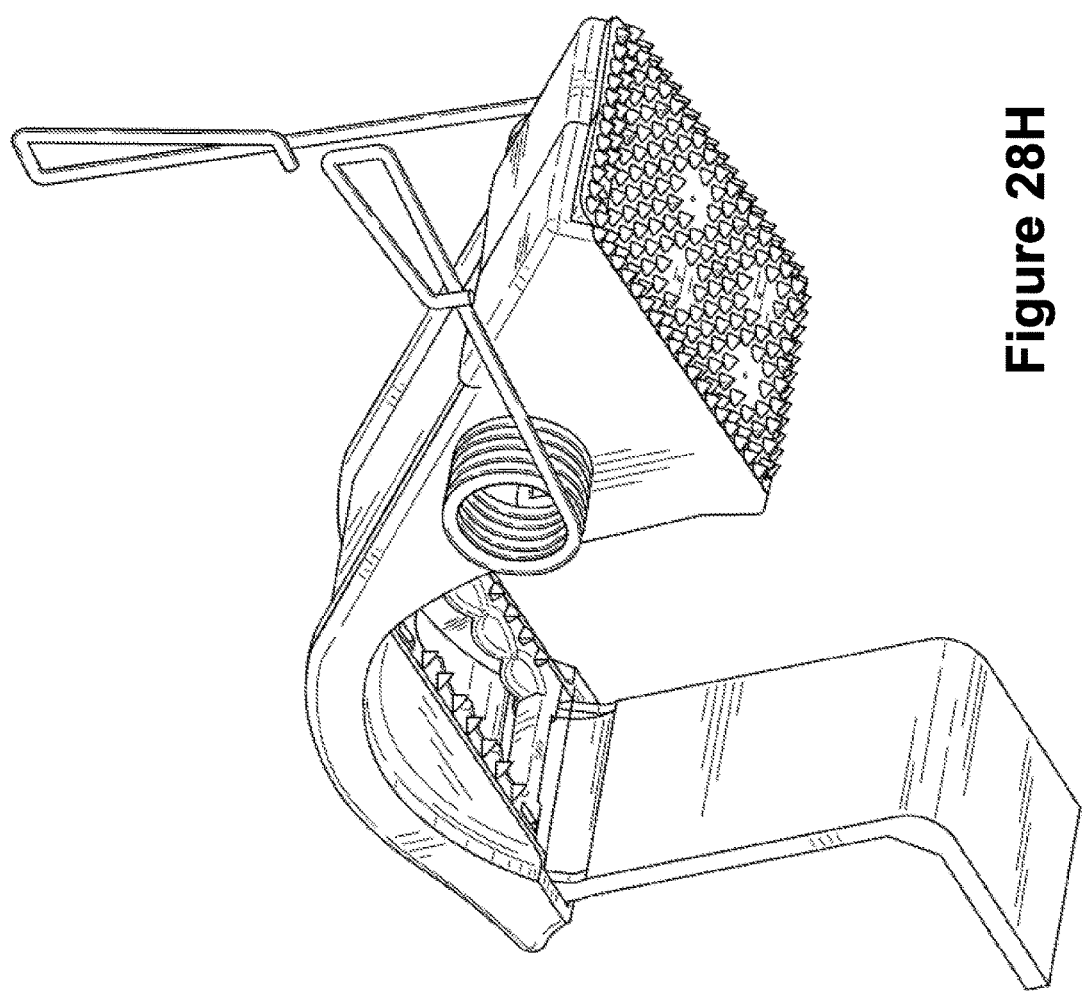
FIG. 28H is a bottom, front, left perspective view of the device of FIG. 28A.
Figure 29A:
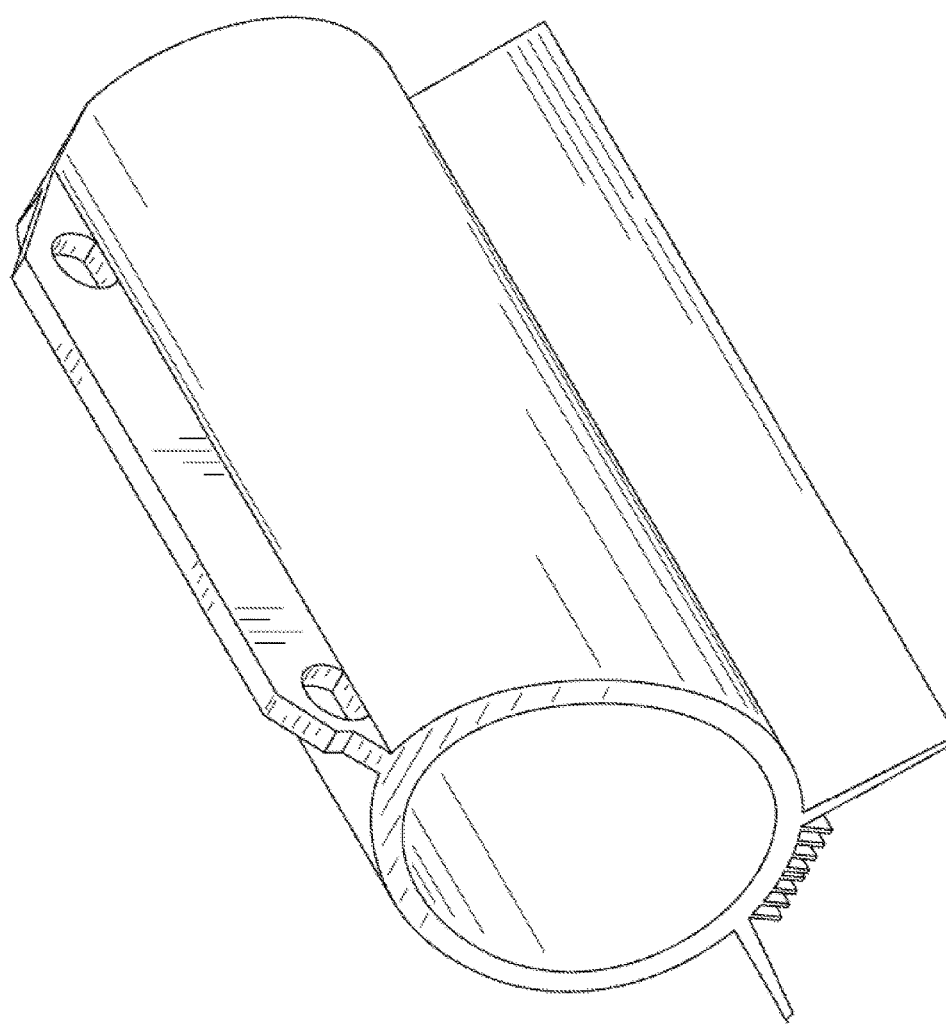
FIG. 29A is a top, front, right perspective view of an embodiment of a resilient tube.
Figure 29B:
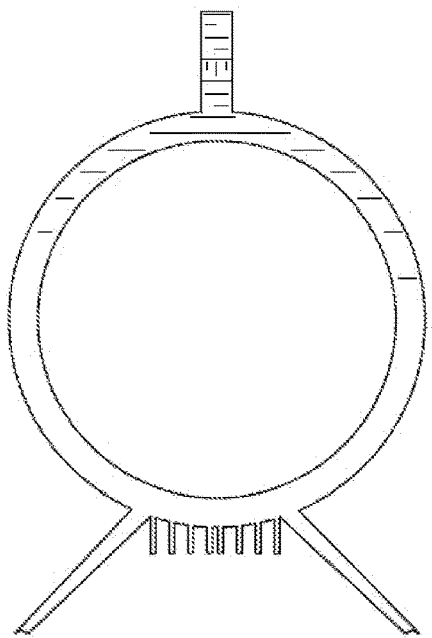
FIG. 29B is a front view of the device of FIG. 29A.
Figure 29C:
FIG. 29C is a right side view of the device of FIG. 29A.
Figure 29D:
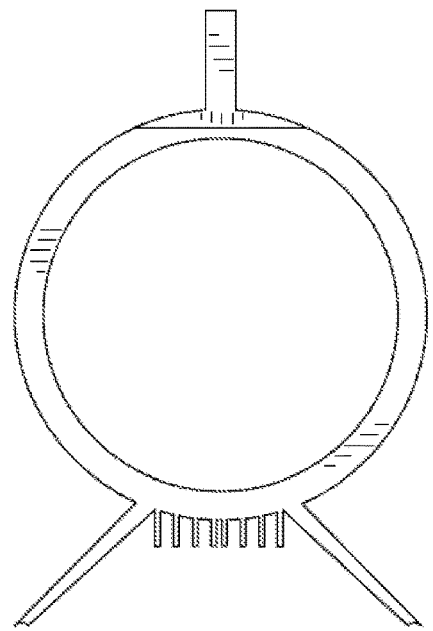
FIG. 29D is a rear view of the device of FIG. 29A.
Figure 29E:
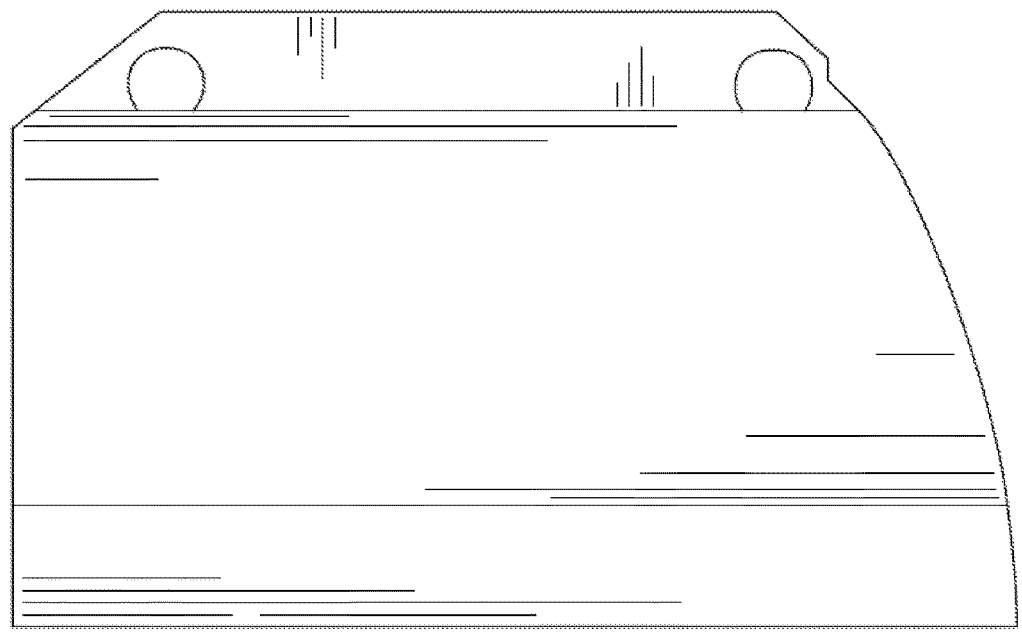
FIG. 29E is a left side view of the device of FIG. 29A.

Referring to FIGS. 25 through 27, an embodiment of an anchor 500 is depicted. Anchor 500 can be used to secure the ground securement system 100 to the ground. Anchor 500 can include a lock pin receiver 16 attached to a proximate end of the anchor 500. The lock pin receiver 16 can engage a lock pin 26 of lock pin housing 24 as described herein or otherwise. The anchor 500 can include a central rod 510, a spreading nut 520, and spreading arms 530. The spreading arms 530 may be configured to hold the anchor 500 in the ground. As illustrated in FIG. 25, the central rod 510 may include threads throughout the entire longitudinal axis of the rod. In an embodiment, the central rod 510 may include threads that do not include the entire longitudinal axis of the rod. The threads may be configured to cooperate with the spreading nut 520 such that when the central rod 510 is turned, the spreading nut 520 advances either upward or downward on the central rod 510, depending on the direction the central rod 510 is turned. On the top end of the central rod 510, there may be a connection in order to rotate the central rod 510 into the ground. The top of the central rod may be shaped to cooperate with a standard drive system applicable to standard power tools and couplings. The central rod 510 could have virtually any size and shape selected to cooperate with a given more standard or unique drive tool. Referring to FIG. 25, the spreading nut 520 is configured to be screwed onto and held onto the central rod 510. The spreading nut 520 may include a body 522 and a spreading cone 524. The body 522 may be of various shapes. In an embodiment, the body 522 of the spreading nut 520 may be flat shaped, such that when the body 522 is inserted into the ground, the body will not rotate when the central rod 510 is turned. The spreading nut 520 may also have a spreading cone 524 located at an upper portion of the body 522 of the spreading nut 520. The spreading cone 524 may be sized and shaped to spread the spreading arms 530 when the spreading cone 524 is engaged with the spreading arms 530.

Referring to FIGS. 25 through 27, the spreading arms 530 may be located on the central rod 510. The spreading arms 530 may be fixedly located on the central rod 510, such that when the central rod 510 turns, the spreading arms 530 move with the central rod 510. The spreading arms 530 may be in the shape of a thicker piece attached to the central rod 510, with a thin end furthest away from the central rod 510. As the spreading arms 530 extract outward into the ground, the shape of the spreading arms 530 may help to hold the anchor 500 in the ground. FIGS. 26A through 27 illustrate the anchor 500 being inserted into the ground. Referring to FIG. 26A, the anchor 500 may be pounded or inserted into the ground in such orientation. As discussed above, the anchor 500 may be flat or a small enough profile to be inserted into the ground with minimal force or requirements for a hole. When inserted into the ground, the anchor 500 may have the spreading arms 530 located closely to the central rod 510. As depicted in FIG. 26B, the central rod 510 is rotated or turned. As the central rod 510 is turned, the spreading nut 520 stays located and locked into the ground. The central rod 510 turns through the spreading nut 520 and moves downward. When the central rod 510 turns downward, the spreading arms 530 start to engage the outward portions of the spreading nut 520 and body 524 and begin to expand outwardly in the ground. As depicted in FIG. 27, as the central rod 510 turns, the spreading cone 524 engages the spreading arms 530 further, thereby expanding them outwardly to an almost horizontal position. With the spreading arms 530 in the horizontal position, the anchor 500 is held firmly in the ground. In an embodiment the spreading nut 520 moves with the central rod 510 and the spreading arms 530 do not move. In an embodiment the central rod turns but does not move downwardly or upwardly in relation to the earth. In an embodiment the spreading nut 520 and the spreading arms 530 can be reversed so that the spreading nut 520 is above the spreading arms 530. In this embodiment, as the central rod 510 turns downward, the spreading arms 530 begin to expand outwardly in the ground in the shape of the letter "v". The spreading arms 530 can be stationary in relation to the central rod 510 and the spreading nut 520 can move as the central rod 510 moves; in an alternate embodiment, the spreading nut 520 can be stationary in relation to the central rod 510 and the spreading arms 530 can move as the central rod 510 moves.

FIGS. 28A through 28H represent views of an embodiment of a goal securement device. The description, details, and reference numbers of the goal securement device as described above may be utilized for the embodiment of the goal securement device illustrated in FIGS. 28A through 28H. FIGS. 29A through 29G represent views of an embodiment of a resilient tube. The description, details, and references numbers of the resilient tube as described above may be utilized for the embodiment of the resilient tube illustrated in FIGS. 29A through 29G.

The housing components disclosed herein may be formed by injection molding. Manufacturing of such components is improved by the practice of drafting and coring. The integrity of the components is also improved by applying the practice of drafting and coring to the manufacture and design of the components. Drafting includes the practice of imparting a slight taper to the side walls of a component part to reduce the resistance of removing the injected molded part from the mold. In an embodiment, the draft angle used for parts disclosed herein ranges from about 0.5 to about 2.0 degrees. Coring includes the practice of removing material from an otherwise thick portion of a design in favor of walls and ribs which provide enough strength and mating surfaces for other parts in the assembly. A part having portions of substantially non-uniform thickness can be subject to excess shrink, sink, internal bubbles, voids, and poor cosmetics. In embodiments disclosed herein, portions of the housing components can be subject to coring.

While the invention has been described with respect to specific examples including presently preferred modes of carrying out the invention, those skilled in the art will appreciate there are numerous variations and permutations of the above described systems and methods. Thus, the spirit and scope of the invention should be construed broadly as set forth in the claims.

We claim:

1. A ground engagement system, comprising:
   a ground securement element;
   an anchor wherein the anchor further includes:
   a lock pin receiver attached to a proximate end of the anchor,
   a central rod, wherein the central rod further includes threads on a longitudinal axis of the central rod,
   a spreading nut configured to be screwed onto and held onto the central rod, and
   at least two spreading arms configured to hold the anchor in the ground,
   wherein the spreading nut is further configured to advance upwards or downwards on the central rod when the central rod is turned,
   wherein the spreading arms are configured to hold the anchor in the ground when the central rod turns in one direction expanding the spreading arms outwardly into the ground securing the anchor in the ground,
   wherein the anchor is configured to secure the ground securement element to the ground, and
   a pressure pad assembly,
   wherein the pressure pad assembly is operably connected to the ground securement element, wherein the pressure pad assembly is configure to indicate whether the ground securement element is secured to the ground by the anchor, the pressure pad assembly having an indicator, and wherein the ground securement element and the anchor are operably connected and configured to secure a ground bar of a goal to the ground.

2. The system of claim 1, wherein the spreading nut further includes a body and a spreading cone.

3. The system of claim 2, wherein the spreading cone is located at an upper portion of the body of the spreading nut.

4. The system of claim 3, wherein the spreading nut is flat shaped, and wherein the spreading nut is configured not to rotate when the central rod is turned.

5. The system of claim 2, wherein the spreading cone is configured to spread the spreading arms when the spreading cone is engaged with the spreading arms.

6. The system of claim 1, wherein the spreading arms are located on the central rod.

7. The system of claim 6, wherein the spreading arms are configured to extract outward into the ground, and wherein the shape of the spreading arms hold the anchor in the ground when the central rod turns.

8. The system of claim 7, wherein the spreading arms expand outwardly into the ground when the central rod turns in one direction, and wherein the spreading arms contract when the central rod turns in an opposite direction.

9. The system of claim 1, wherein the central rod is further configured to turn but does not move downwardly or upwardly in relation to the earth.

10. The system of claim 1, wherein the spreading nut is configured above the spreading arms, and wherein the spreading arms expand outwardly in the ground as the central rod turns downwardly.

11. The system of claim 1, wherein the anchor is held in the ground with the spreading arms in a substantially horizontal position.

12. The system of claim 1, wherein the indicator is an indicator arm system comprising a first indicator arm and a second indicator arm.

13. The system of claim 1, wherein the indicator is configured to provide at least one of a visual indication or an audible indication.

14. A method of securing a ground bar of a goal to the ground comprising:

configuring a ground anchor to secure a ground bar of a goal to the ground, providing the anchor a lock pin receiver to attach to a proximate end of the anchor;

providing the anchor a central rod, wherein the central rod further includes threads on a longitudinal axis of the central rod;

providing the anchor a spreading nut configured to be screwed onto and held onto the central rod;

providing the anchor at least two spreading arms configured to hold the anchor in the ground, and wherein the spreading nut is further configured to advance upwards or downwards on the central rod when the central rod is turned, wherein the spreading arms are configured to hold the anchor in the ground when the central rod turns in one direction expanding the spreading arms outwardly into the ground securing the anchor in the ground, wherein the anchor and a ground securement element are operably connected and configured to secure a ground bar of a goal to the ground, and providing a pressure pad assembly wherein the pressure pad assembly is operably connected to the ground securement element and wherein the pressure pad assembly is configured to indicate whether the ground securement element is secured to the ground by the anchor, the pressure pad assembly having an indicator.

15. The method of claim 14 further comprising:
configuring the pressure pad assembly to move from a set position when the ground securement element is secure to the ground, to an extended position when the ground securement element is not secure to the ground.

16. The method of claim 14, further comprising:
configuring the indicator to provide at least one of a visual indication or an audible indication.

17. The method of claim 14, further comprising:
configuring the spreading arms to expand outwardly into the ground when the central rod turns in one direction, and wherein the spreading arms contract when the central rod turns in an opposite direction; and configuring the anchor to be held in the ground with the spreading arms expanded outwardly in a substantially horizontal position.

18. A ground engagement system, comprising:
an anchor;
a ground securement element; and
a pressure pad assembly;
wherein the anchor further includes a lock pin receiver attached to a proximate end of the anchor, a central rod, a spreading nut configured to be screwed onto and held onto the central rod, and at least two spreading arms configured to expand outwardly into the ground when the central rod turns in one direction securing the anchor in the ground;

wherein the pressure pad assembly is operably connected to the ground securement element, wherein the pressure pad assembly is configured to indicate whether the ground securement element is secured to the ground by the anchor, the pressure pad assembly having an indicator; and wherein the ground securement element and the anchor are operably connected and configured to secure a ground bar of a goal to the ground.

19. The system of claim 18, wherein the pressure pad assembly is further configured to move from a set position when the ground securement element is secured to the ground, to an extended position when the ground securement element is not secured to the ground.

20. The system of claim 18, wherein the indicator is configured to provide at least one of a visual indication or an audible indication.

* * * * *